US012770011B2

(12) United States Patent
Lindsey et al.

(10) Patent No.: US 12,770,011 B2
(45) Date of Patent: Oct. 20, 2026

(54) ONLINE ACTIVE LEARNING WITH CORRECTIVE AND ITERATIVE FEEDBACK FOR STREAMING DATA CLASSIFICATION

(71) Applicant: Hillcroft LLC, Jamaica Plain, MA (US)

(72) Inventors: Mark Lindsey, Falls Church, VA (US); G. Francis Kubala, Jamaica Plain, MA (US)

(73) Assignee: Hillcroft LLC, Jamaica Plain (MA)

( * ) Notice: Subject to any disclaimer, the term of this patent is extended or adjusted under 35 U.S.C. 154(b) by 0 days.

(21) Appl. No.: 19/638,469

(22) Filed: Apr. 3, 2026

(65) Prior Publication Data

US 2026/0310979 A1 Oct. 8, 2026

Related U.S. Application Data

(60) Provisional application No. 63/902,170, filed on Oct. 20, 2025, provisional application No. 63/866,431, (Continued)

(51) Int. Cl.
*G06N 3/091* (2023.01)
*G06F 18/241* (2023.01)

(52) U.S. Cl.
CPC .......... *G06N 3/091* (2023.01); *G06F 18/241* (2023.01)

(58) Field of Classification Search
CPC .............................. G06N 3/091; G06F 18/241
See application file for complete search history.

(56) References Cited

U.S. PATENT DOCUMENTS 6,988,736 B2 * 1/2006 Lee ........................ B62B 7/142 280/30
10,540,370 B2 * 1/2020 Ashwood-Smith ..... G06F 16/27
(Continued)

OTHER PUBLICATIONS

R. Ardila, M. Branson, K. Davis, M. Henretty, M. Kohler, J. Meyer, R. Morais, L. Saunders, F. M. Tyers, and G. Weber, "Common Voice: A Massively-multilingual Speech Corpus," arXiv preprint arXiv:1912.06670, 2019.
(Continued)

*Primary Examiner* — David E Choi
(74) *Attorney, Agent, or Firm* — Kaufman & Canoles, P.C.

(57) ABSTRACT

Systems and methods of online active learning with corrective and iterative feedback for streaming data classification are provided. In one exemplary embodiment, a method includes initializing trainable parameters of a detection model based on verified samples including a representation of a target event and receiving unverified samples from a client network node device. The method further includes iteratively ranking the unverified samples based on an informativeness criterion, selecting a query subset based on an adaptive query budget, obtaining HITL verification responses for the query subset, and updating the detection model based on the HITL verification responses. The method also includes applying the updated detection model to remaining unverified samples, identifying a positive predicted subset, obtaining HITL verification responses for the positive predicted subset to identify true positive and false positive subsets, and updating the detection model based on the true positive subset and the false positive subset.

20 Claims, 21 Drawing Sheets

Related U.S. Application Data filed on Aug. 19, 2025, provisional application No. 63/783,520, filed on Apr. 4, 2025.

(56) References Cited

U.S. PATENT DOCUMENTS

| | | | | |
|---|---|---|---|---|
| 10,742,486 | B2 * | 8/2020 | Mermoud | H04L 41/0631 |
| 11,095,728 | B2 * | 8/2021 | Morrison | G06F 7/50 |
| 11,349,727 | B1 * | 5/2022 | Rubarkh | H04L 41/5032 |
| 11,727,249 | B2 * | 8/2023 | Wilson | G06N 3/02 705/26.7 |
| 12,373,497 | B1 * | 7/2025 | Fletcher | G06F 9/45533 |
| 12,538,261 | B2 * | 1/2026 | Parker | H04W 64/00 |
| D1,125,182 | S * | 5/2026 | Johnson | D14/486 |
| 12,634,152 | B1 * | 5/2026 | Bhat | H04L 9/3247 |
| 2005/0221586 | A1 * | 10/2005 | Mulligan | B23K 26/12 257/E21.252 |
| 2007/0248906 | A1 * | 10/2007 | Seojima | G03C 1/853 430/217 |
| 2023/0419645 | A1 * | 12/2023 | Kim | G06V 10/774 |
| 2024/0013099 | A1 * | 1/2024 | Verma | G06N 3/09 |
| 2025/0291554 | A1 * | 9/2025 | Schornig | G06F 11/3604 |
| 2025/0307860 | A1 * | 10/2025 | Duque | G06Q 30/0206 |
| 2026/0023788 | A1 * | 1/2026 | Fletcher | G06F 16/2471 |
| 2026/0094307 | A1 * | 4/2026 | Austin | G06T 11/00 |

OTHER PUBLICATIONS

L. Yuan, B. Xie, and S. Li, "Robust Test-time Adaptation in Dynamic Scenarios," in Proceedings of the IEEE/CVF Conference on Computer Vision and Pattern Recognition, 2023, pp. 15 922-15 932.

M. Lindsey, T. Vuong, and R. M. Stern, "Unsupervised Voice Type Discrimination Score Adaptation Using X-Vector Clusters," in ICASSP 2023—2023 IEEE International Conference on Acoustics, Speech and Signal Processing (ICASSP), 2023, pp. 1-5.

B. Desplanques, J. Thienpondt, and K. Demuynck, "ECAPA-TDNN: Emphasized Channel Attention, Propagation and Aggregation in TDNN Based Speaker Verification," arXiv preprint arXiv:2005.07143, 2020.

J. Valk and T. Alum ae, "VoxLingua107: a Dataset for Spoken Language Recognition," in Proc. IEEE SLT Workshop, 2021.

D. Snyder, D. Garcia-Romero, G. Sell, D. Povey, and S. Khudanpur, "X-vectors: Robust DNN Embeddings for Speaker Recognition," in 2018 IEEE International Conference on Acoustics, Speech and Signal Processing (ICASSP). IEEE, 2018, pp. 5329-5333.

S. Chen, C. Wang, Z. Chen, Y. Wu, S. Liu, Z. Chen, J. Li, N. Kanda, T. Yoshioka, X. Xiao et al., "WavLM: Large-scale Self-supervised Pretraining for Full Stack Speech Processing," IEEE Journal of Selected Topics in Signal Processing, vol. 16, No. 6, pp. 1505-1518, 2022.

R. Hadsell, S. Chopra, and Y. LeCun, "Dimensionality Reduction by Learning an Invariant Mapping," in 2006 IEEE Computer Society Conference on Computer Vision and Pattern Recognition (CVPR'06), vol. 2, 2006, pp. 1735-1742.

G. King and L. Zeng, "Logistic Regression in Rare Events Data," Political analysis, vol. 9, No. 2, pp. 137-163, 2001.

S. Ertekin, J. Huang, and C. L. Giles, "Active Learning for Class Imbalance Problem," in Proceedings of the 30th Annual International ACM SIGIR Conference on Research and Development in Information Retrieval, 2007, pp. 823-824.

S. Ertekin, J. Huang, L. Bottou, and L. Giles, "Learning on the Border: Active Learning in Imbalanced Data Classification," in Proceedings of the Sixteenth ACM Conference on Information and Knowledge Management, 2007, pp. 127-136.

F. Wilcoxon, "Individual Comparisons by Ranking Methods," Biometrics Bulletin, vol. 1, No. 6, pp. 80-83, 1945.

N. Lu, G. Zhang, and J. Lu, "Concept Drift Detection via Competence Models,"28, 2014.

A. Bifet and R. Gavalda, "Learning from Time-changing Data with Adaptive Windowing," in Proceedings of the 2007 SIAM international conference on data mining. SIAM, 2007, pp. 443-448.

G. Ditzler and R. Polikar, "Hellinger Distance Based Drift Detection for Nonstationary Environments," in 2011 IEEE Symposium on Computational Intelligence in Dynamic and Uncertain Environments (CIDUE), 2011, pp. 41-48.

D. D. Lewis, "A Sequential Algorithm for Training Text Classifiers: Corrigendum and Additional Data," in ACM SIGIR Forum, vol. 29, No. 2. ACM New York, NY, USA, 1995, pp. 13-19.

M. Sensoy, L. Kaplan, and M. Kandemir, "Evidential Deep Learning to Quantify Classification Uncertainty," Advances in neural information processing systems, vol. 31, 2018.

D. Delgado, K. Walker, S. Strassel, K. S. Jones, C. Caruso, and D. Graff, "The SAFE-T Corpus: A New Resource for Simulated Public Safety Communications," in Proceedings of the Twelfth Language Resources and Evaluation Conference, 2020, pp. 6450-6457.

T. Vuong, Y. Xia, and R. M. Stern, "Learnable Spectro-temporal Receptive Fields for Robust Voice Type Discrimination," in Interspeech 2020. ISCA, Oct. 2020, pp. 1957-1961.

M. Lindsey, "Online Active Learning with Corrective Feedback: A New Paradigm Applied to Streaming Audio," Ph.D. dissertation, Carnegie Mellon University, 2024.

T. Brown, B. Mann, N. Ryder, M. Subbiah, J. D. Kaplan, P. Dhariwal, A. Neelakantan, P. Shyam, G. Sastry, A. Askell et al., "Language Models are Few-shot Learners," Advances in neural information processing systems, vol. 33, pp. 1877-1901, 2020.

A. Ramesh, P. Dhariwal, A. Nichol, C. Chu, and M. Chen, "Hierarchical Text-Conditional Image Generation with Clip Latents," arXiv preprint arXiv:2204.06125, vol. 1, No. 2, p. 3, 2022.

C. Wang, S. Chen, Y. Wu, Z. Zhang, L. Zhou, S. Liu, Z. Chen, Y. Liu, H. Wang, J. Li et al., "Neural Codec Language Models are Zero-Shot Text to Speech Synthesizers," arXiv preprint arXiv:2301.02111, 2023.

J. Devlin, M.-W. Chang, K. Lee, and K. Toutanova, "BERT: Pre-training of Deep Bidirectional Transformers for Language Understanding," arXiv preprint arXiv:1810.04805, 2018.

S. S. Paul, "Active and Passive Learning: A Comparison," GRD Journal for Engineering, vol. 2, No. 9, pp. 27-29, 2017.

D. Cacciarelli and M. Kulahci, "Active Learning for Data Streams: a Survey," Machine Learning, vol. 113, No. 1, pp. 185-239, 2024.

J. Gama, P. Medas, G. Castillo, and P. Rodrigues, "Learning with Drift Detection," in Advances in Artificial Intelligence—SBIA 2004: 17th Brazilian Symposium on Artificial Intelligence, Sao Luis, Maranhao, Brazil, Sep. 29-Oct. 1, 2004. Proceedings 17. Springer, 2004, pp. 286-295.

D. Sculley, "Online Active Learning Methods for Fast Label-efficient Spam Filtering," in CEAS, vol. 7, 2007, p. 143.

J. Kranjc, J. Smailovi´ c, V. Podpe˘ can, M. Gr˘ car, M.˘ Znidar r˘ si˘ c, and N. Lavra˘ c, "Active Learning for Sentiment Analysis on Data Streams: Methodology and Workflow Implementation in the ClowdFlows Platform," Information Processing & Management, vol. 51, No. 2, pp. 187-203, 2015.

A. Narr, R. Triebel, and D. Cremers, "Stream-based Active Learning for Efficient and Adaptive Classification of 3D Objects," in 2016 IEEE International Conference on Robotics and Automation (ICRA), 2016, pp. 227-233.

D. Manjah, D. Cacciarelli, B. Standaert, M. Benkedadra, G. R. De Hertaing, B. Macq, S. Galland, and C. De Vleeschouwer, "Stream-based Active Distillation for Scalable Model Deployment," in Proceedings of the IEEE/CVF Conference on Computer Vision and Pattern Recognition, 2023, pp. 4999-5007.

S. Ghiasi, G. Pazzi, C. D. Grosso, G. D. Magistris, and G. Veneri, "Combining Thermodynamics-based Model of the Centrifugal Compressors and Active Machine Learning for Enhanced Industrial Design Optimization," 2023. [Online]. Available: https://arxiv.org/abs/2309.02818.

X. Yan, M. Sarkar, B. Lartey, B. Gebru, A. Homaifar, A. Karimoddini, and E. Tunstel, "An Online Learning Framework for Sensor Fault Diagnosis Analysis in Autonomous Cars," IEEE Transactions on Intelligent Transportation Systems, vol. 24, No. 12, pp. 14 467-14 479, 2023.

(56) References Cited

OTHER PUBLICATIONS

R. Schmitt, P. Jatzkowski, and M. Peterek, "Traceable Measurements Using Machine Tools," in Laser metrology and machine performance X: 10th international conference and exhibition on laser metrology, machine tool, CMM & robotic performance, Lamdamap, 2013, pp. 20-21.
N. Beck, S. Kothawade, P. Shenoy, and R. Iyer, "Streamline: Streaming Active Learning for Realistic Multi-Distributional Settings," 2023. [Online]. Available: https://arxiv.org/abs/2305.10643.
M. Lindsey, N. R. Robinson, F. Kubala, and R. M. Stern, "Reducing the Cost of Spoof Detection Labeling using Mixed-Strategy Active Learning and Pretrained Models," in 2023 IEEE Automatic Speech Recognition and Understanding Workshop (ASRU), 2023, pp. 1-7.
J. Lu, A. Liu, F. Dong, F. Gu, J. Gama, and G. Zhang, "Learning Under Concept Drift: A Review," IEEE transactions on knowledge and data engineering, vol. 31, No. 12, pp. 2346-2363, 2018.
G. J. Aguiar and A. Cano, "Dynamic Budget Allocation for Sparsely Labeled Drifting Data Streams," Information Sciences, vol. 654, p. 119821, 2024.
Z. Wu, H. Wang, J. Guo, Q. Yang, and J. Shao, "Learning Evolving Prototypes for Imbalanced Data Stream Classification with Limited Labels," Information Sciences, p. 120979, 2024.
B. Krawczyk, B. Pfahringer, and M. Wozniak, "Combining Active Learning with Concept Drift Detection for Data Stream Mining," in 2018 IEEE International Conference on Big Data (Big Data), 2018, pp. 2239-2244.
W. Xu, F. Zhao, and Z. Lu, "Active Learning over Evolving Data Streams Using Paired Ensemble Framework," in 2016 eighth international conference on advanced computational intelligence (ICACI). IEEE, 2016, pp. 180-185.
Y. Chen and H. Jin, "Rare Sound Event Detection Using Deep Learning and Data Augmentation," in Interspeech, 2019, pp. 619-623.
Ł. Korycki and B. Krawczyk, "Online Oversampling for Sparsely Labeled Imbalanced and Non-stationary Data Streams," in 2020 international joint conference on neural networks (IJCNN). IEEE, 2020, pp. 1-8.
Ł. Korycki and B. Krawczyk, , "Low-dimensional Representation Learning from Imbalanced Data Streams," in Pacific-Asia conference on knowledge discovery and data mining. Springer, 2021, pp. 629-641.
M. Lindsey, A. Shah, F. Kubala, and R. M. Stern, "Online Active Learning For Sound Event Detection," 2023. [Online]. Available: https://arxiv.org/abs/2309.14460.
S. Hao, P. Hu, P. Zhao, S. C. Hoi, and C. Miao, "Online Active Learning with Expert Advice," ACM Transactions on Knowledge Discovery from Data (TKDD), vol. 12, No. 5, pp. 1-22, 2018.
P. Donmez and J. G. Carbonell, "Proactive Learning: Cost-sensitive Active Learning with Multiple Imperfect Oracles," in Proceedings of the 17th ACM conference on Information and knowledge management, 2008, pp. 619-628.
A. Castellani, S. Schmitt, and B. Hammer, "Stream-based Active Learning with Verification Latency in Non-Stationary Environments," in International Conference on Artificial Neural Networks. Springer, 2022, pp. 260-272.
E. Mosqueira-Rey, E. Hernandez-Pereira, D. Alonso-Rios, J. Bobes-Bascaran, and A. Fernandez-Leal, "Human-in-the-loop Machine Learning: A State of the Art," Artificial Intelligence Review, vol. 56, No. 4, pp. 3005-3054, 2023.
B. Settles, "Active Learning Literature Survey," 2009.
J. J. Dudley and P. O. Kristensson, "A Review of User Interface Design for Interactive Machine Learning," ACM Transactions on Interactive Intelligent Systems (TiiS), vol. 8, No. 2, pp. 1-37, 2018.
M. Ware, E. Frank, G. Holmes, M. Hall, and I. H. Witten, "Interactive Machine Learning: Letting Users Build Classifiers," International Journal of Human-Computer Studies, vol. 55, No. 3, pp. 281-292, 2001.
J. Bernard, M. Hutter, M. Zeppelzauer, D. Fellner, and M. Sedlmair, "Comparing Visual-Interactive Labeling with Active Learning: An Experimental Study," IEEE transactions on visualization and computer graphics, vol. 24, No. 1, pp. 298-308, 2017.
T. Ishibashi, Y. Nakao, and Y. Sugano, "Investigating Audio Data Visualization for Interactive Sound Recognition," in Proceedings of the 25th International Conference on Intelligent User Interfaces, 2020, pp. 67-77.
L. Begeja, B. Renger, D. Gibbon, Z. Liu, and B. Shahraray, "Interactive Machine Learning Techniques for Improving SLU Models," in Proceedings of the HLT-NAACL 2004 Workshop on Spoken Language Understanding for Conversational Systems and Higher Level Linguistic Information for Speech Processing, 2004, pp. 10-16.
J. Talbot, B. Lee, A. Kapoor, and D. S. Tan, "EnsembleMatrix: Interactive Visualization to Support Machine Learning with Multiple Classifiers," in Proceedings of the SIGCHI conference on human factors in computing systems, 2009, pp. 1283-1292.
J. A. Fails and D. R. Olsen Jr, "Interactive Machine Learning," in Proceedings of the 8th international conference on Intelligent user interfaces, 2003, pp. 39-45.
A. Kumar, A. Gupta, and S. Levine, "DisCor: Corrective Feedback in Reinforcement Learning via Distribution Correction," Advances in Neural Information Processing Systems, vol. 33, pp. 18 560-18 572, 2020.
C. Celemin, J. Ruiz-del Solar, and J. Kober, "A Fast Hybrid Reinforcement Learning Framework with Human Corrective Feedback," Autonomous Robots, vol. 43, pp. 1173-1186, 2019.
R. Perez-Dattari, C. Celemin, J. Ruiz-del Solar, and J. Kober, "Interactive Learning with Corrective Feedback for Policies Based on Deep Neural Networks," in Proceedings of the 2018 International Symposium on Experimental Robotics. Springer, 2020, pp. 353-363.
A. Y. Ng, S. Russell et al., "Algorithms for Inverse Reinforcement Learning," in Icml, vol. 1, 2000, p. 2.
L. Shani, T. Zahavy, and S. Mannor, "Online Apprenticeship Learning," in Proceedings of the AAAI conference on artificial intelligence, vol. 36, 2022, pp. 8240-8248.
M. Lindsey, F. Kubala, and R. M. Stern, "A Unified Metric for Simultaneous Evaluation of Error Rate and Annotation Cost," in ICASSP 2025—2025 IEEE International Conference on Acoustics, Speech and Signal Processing (ICASSP), 2025.
A. Martin and M. Przybocki, "The NIST 1999 Speaker Recognition Evaluation—An Overview," Digital Signal Processing, vol. 10, No. 1, pp. 1-18, 2000. [Online]. Available: https://www.sciencedirect.com/ science/article/pii/S105120049990355X.
F. Byers, J. Fiscus, Seyed, G. Sanders, and M. Przybocki, "Open Speech Analytic Technologies Pilot Evaluation OpenSAT Pilot," Feb. 27, 2019 2019.
J. Gama, R. Sebastiao, and P. P. Rodrigues, "Issues in Evaluation of Stream Learning Algorithms," in Proceedings of the 15th ACM SIGKDD international conference on Knowledge discovery and data mining, 2009, pp. 329-338.
M. Khannouz and T. Glatard, "Dynamic Ensemble Size Adjustment for Memory Constrained Mondrian Forest," in 2022 IEEE International Conference on Big Data (Big Data), 2022, pp. 3358-3363.
C. M, A. Mandal, and S. Mukherjee, "Study of ECAPA-TDNN Models for Spoken Language Identification Task," in 2023 IEEE World Conference on Applied Intelligence and Computing (AIC), 2023, pp. 233-237.
J. Yamagishi, M. Todisco, M. Sahidullah, H. Delgado, X. Wang, N. Evans, T. Kinnunen, K. A. Lee, V. Vestman, and A. Nautsch, "ASVspoof 2019: Automatic Speaker Verification Spoofing and Countermeasures Challenge Evaluation Plan," ASV Spoof, 2019.

* cited by examiner

800

900

1200

1300

1400

1500

1600

2200

ONLINE ACTIVE LEARNING WITH CORRECTIVE AND ITERATIVE FEEDBACK FOR STREAMING DATA CLASSIFICATION

CROSS-REFERENCE TO RELATED APPLICATIONS

This application claims the benefit of U.S. Provisional Patent Application No. 63/783,520, filed Apr. 4, 2025; U.S. Provisional Patent Application No. 63/866,431, filed Aug. 19, 2025; and U.S. Provisional Patent Application No. 63/902,170, filed Oct. 20, 2025, the entire contents of each of which are incorporated herein by reference.

BACKGROUND

Machine learning systems are increasingly used to detect events of interest in streaming data such as audio, video, and sensor signals; however, conventional approaches, including passive machine learning techniques trained on static datasets, often struggle to maintain performance in real-world environments characterized by evolving data distributions, class imbalance, and limited labeled data. In many applications, human-in-the-loop (HITL) verification is required to confirm whether a detected event is present, which can impose significant review burden and annotation cost. Existing active learning approaches attempt to reduce this burden by selectively querying a human operator for labels, but such approaches may fail to efficiently leverage feedback available during normal review workflows and may not adequately adapt to changing conditions or rare event detection scenarios. Accordingly, there remains a need for improved systems and methods that integrate machine-driven sample selection with human feedback in a manner that reduces detection error while minimizing HITL verification effort in streaming environments.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
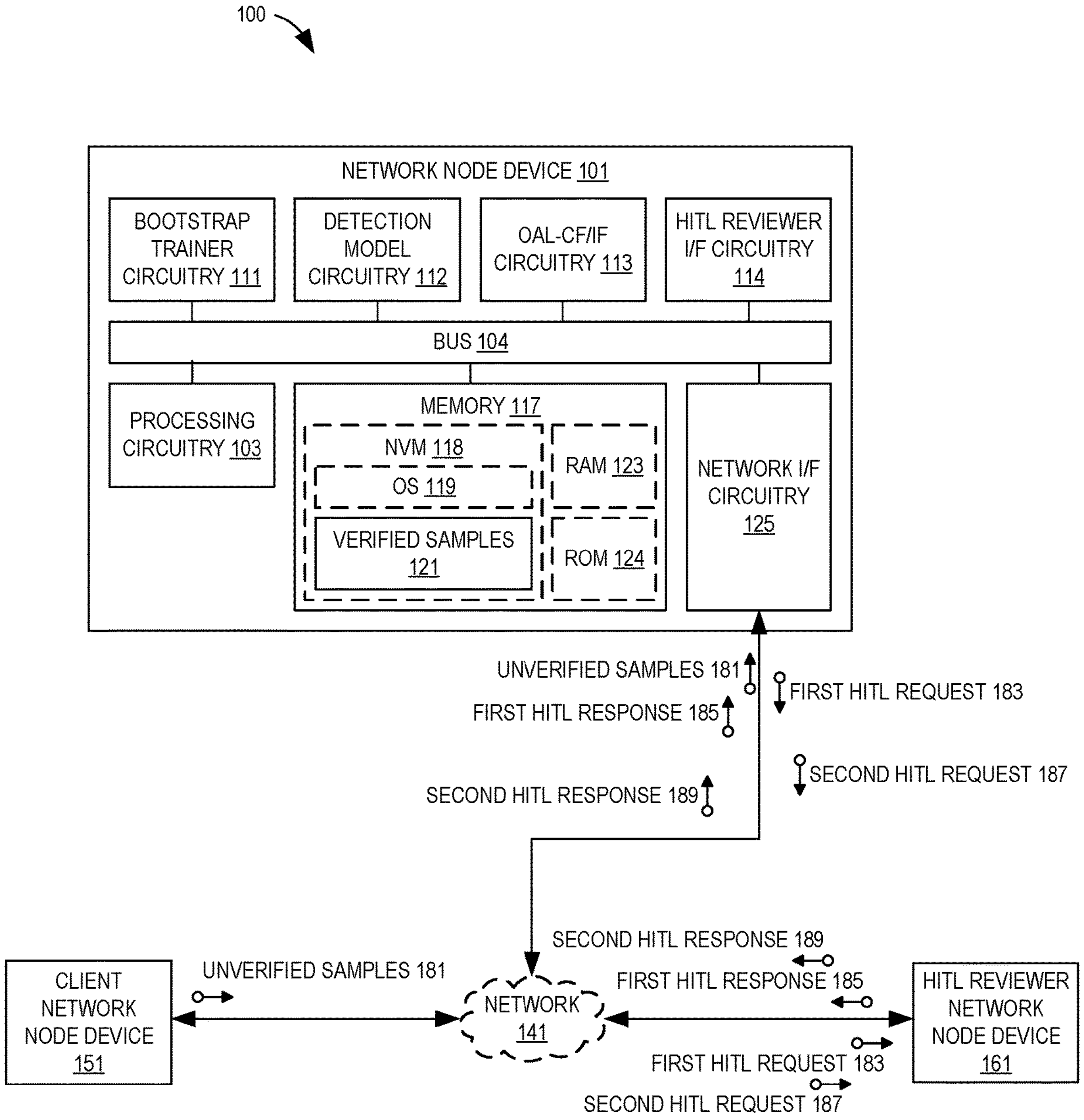
FIG. 1 illustrates one embodiment of a system of performing online active learning with corrective and iterative feedback for streaming data classification in a distributed network in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Machine learning systems are increasingly deployed to detect events of interest within streaming data, including audio, video, and other sensor-derived media samples. Conventional approaches, such as passive machine learning techniques trained on static datasets, often exhibit degraded performance when applied to real world environments characterized by evolving data distributions, class imbalance, limited labeled data, and concept drift. In many practical deployments, HITL verification is required to confirm whether a detected event is present within a given media sample. While such human verification can improve accuracy, it introduces substantial operational burden, as human reviewers may be required to evaluate large volumes of data, including both relevant and irrelevant samples.

Existing active learning approaches attempt to reduce this burden by selectively querying a human operator for labels associated with samples that are predicted to be informative for training. However, such approaches typically rely solely on machine initiated queries and do not fully leverage information available from the human reviewer's natural workflow. In particular, when a machine learning model generates predictions, human reviewers often review at least a subset of those predictions, such as predicted positive samples, and inherently generate corrective information, such as identification of false positives, that is not efficiently incorporated into model updates in conventional systems. As a result, existing systems may fail to optimally balance detection accuracy and human verification effort. Further, in conventional systems, active learning is typically performed only once per batch, which can limit the ability of the system to recover missed target events within the same batch and can delay incorporation of newly obtained feedback until a later batch.

The present disclosure addresses these deficiencies by introducing a machine learning framework that integrates active learning with corrective feedback obtained from HITL interactions. In particular, the disclosed systems and methods implement an online active learning with corrective feedback paradigm and, in some embodiments, an online active learning with iterative feedback paradigm in which a detection model is iteratively trained using two complementary information channels: (1) machine-selected query samples for explicit human labeling and (2) human-provided corrective feedback associated with model predictions. By leveraging both query-based annotations and corrective feedback derived from review of predicted samples, the system is able to improve detection performance while reducing overall annotation cost and human verification effort. In some embodiments, active learning queries, prediction generation, corrective feedback acquisition, and model updating are performed multiple times within a same batch of streaming data prior to loading a subsequent batch, thereby enabling within-batch refinement of the detection model and recovery of missed target events.

In one aspect, the present disclosure is directed to a computer-implemented method for training a detection model to detect a target event in streaming data. The method includes initializing trainable parameters of the detection model based on a set of verified samples that includes representations of the target event, receiving a set of unverified samples, and iteratively performing operations including: ranking the unverified samples based on an informativeness criterion, selecting a query subset for human review based on an adaptive query budget, receiving human verification responses for the query subset, and updating the detection model accordingly. The method further includes applying the updated detection model to remaining unverified samples to obtain prediction results, identifying a positive predicted subset indicating a predicted presence of the target event, obtaining human verification responses for the positive predicted subset to distinguish true positive samples from false positive samples, and updating the detection model based on such corrective feedback. The iterative process continues until a stopping criterion is satisfied. In some embodiments, the iterative process is performed for each of a plurality of iterations within a same batch until the stopping criterion is satisfied, after which a subsequent batch is loaded. In some embodiments, the stopping criterion includes a fixed number of iterations. In some embodiments, the stopping criterion includes determining that no additional true positive samples were detected during a most recent corrective feedback operation. In some embodiments, the adaptive query budget is adjusted across iterations so as to limit annotation cost while preserving recovery of target samples. In some embodiments, the adaptive query budget is reduced for a batch predicted not to include target samples. In some embodiments, active learning queries are limited after an initial iteration while corrective feedback continues for one or more subsequent iterations.

In another aspect, the present disclosure is directed to a network node device and corresponding system configured to implement the foregoing method. The system includes processing circuitry, memory, and network interface circuitry configured to communicate with a client network node device that provides streaming media samples and one or more HITL reviewer network node devices that provide verification responses. The system further includes circuitry configured to perform initialization, sample ranking, query selection, model updating, prediction, identification of positive predicted samples, and corrective updating based on human feedback. In some embodiments, the system is configured to repeatedly perform query selection, classifier updating, prediction generation, and corrective feedback processing within a same batch prior to proceeding to a next batch. In some embodiments, the system is configured to apply one or more query-budget limiting modes, including a mode in which corrective feedback is iterated while active learning queries are limited, and a mode in which a reduced number of active learning queries is used for a batch predicted to omit target samples.

Exemplary embodiments of the present disclosure include implementations in which the media samples comprise audio clips, video segments, or multimodal data, and in which the target event may correspond to any detectable event of interest specified by a human operator, such as the presence of a particular language, a specific acoustic pattern, or a defined activity within a video stream. In some embodiments, the informativeness criterion used for ranking samples may include uncertainty-based metrics, diversity-based selection, or expected model improvement. In other embodiments, the adaptive query budget may be dynamically adjusted based on model performance, annotation cost, or system constraints. In further embodiments, multiple HITL reviewer devices may be used, with requests routed based on reviewer expertise or system load. In some embodiments directed to spoken language verification, the system operates on batches of audio samples and uses iterative feedback to improve detection of low-prevalence target languages. In some embodiments, the detection model includes a feature extractor and classifier architecture that processes numerical representations of respective samples and contextual information from neighboring samples. In some embodiments, the system stores and tracks performance using one or more metrics including an interactive machine learning metric and a detection cost function across successive batches and successive within-batch iterations.

By combining machine-driven selection of informative samples with human-provided corrective feedback derived from normal review processes, the disclosed systems and methods provide a technical improvement over conventional approaches by enabling efficient adaptation to streaming data environments, reducing annotation overhead, and improving detection accuracy. The present disclosure thus provides a scalable and flexible framework for training and deploying detection models in real-world operational settings. In embodiments employing online active learning with iterative feedback, the disclosed systems and methods further provide technical improvements by enabling multiple rounds of active learning and corrective feedback within a same batch, improving recovery of missed target events, reducing false negative error, accelerating convergence, and providing more stable learning over time while allowing adaptive control of annotation cost through stopping criteria and query-budget management.

The disclosed systems and methods provide concrete technological improvements in operation of streaming detection systems, adaptive machine learning systems, and distributed HITL verification systems. In particular, the disclosed OAL-CF and OAL-IF configurations improve machine operation in non-stationary streaming environments by reducing missed target events within an active batch, reducing lag between acquisition of HITL feedback and application of that feedback, and improving adaptation of the detection model to changing data distributions without requiring full retraining on a static corpus.

In some embodiments, the disclosed iterative feedback processing improves operation of a batch-based streaming classifier by causing the classifier to execute multiple update-and-prediction cycles for the same batch before the next batch is loaded. This changes the manner in which the computing system processes the batch itself, because the system is not limited to a single-pass query/update/predict sequence. Instead, the system uses intermediate classifier outputs, HITL verification responses, and iteration state data to control additional within-batch processing, thereby recovering target samples that would otherwise remain undetected until a later batch or remain undetected entirely.

In some embodiments, the disclosed adaptive query budget controls improve machine operation by reducing unnecessary HITL communications and annotation overhead while preserving recovery of scarce target events. For example, when a batch is preliminarily predicted not to contain target samples, the system can automatically reduce a quantity of active learning queries, thereby reducing network traffic, reviewer burden, and model update cost, while still preserving a limited query capacity for detection of unexpected target occurrences. In other embodiments, the system permits only one active learning query cycle while allowing multiple corrective feedback cycles, thereby preserving adaptation capability without allowing annotation cost to scale linearly with iteration count.

In some embodiments, the disclosed stopping criterion logic improves machine operation by preventing uncontrolled iterative processing and by causing the system to terminate within-batch adaptation responsive to measured iteration conditions. Such conditions may include a fixed iteration count, an absence of newly confirmed true positive samples, convergence of one or more model outputs, stabilization of a prediction distribution, exhaustion of a query budget, or diminishing improvement in one or more evaluation metrics. By controlling when iteration continues and when iteration stops, the system improves computational efficiency, latency, and resource utilization in streaming environments.

Accordingly, the disclosed subject matter is not directed merely to organizing human review or to a mental process of evaluating samples. Rather, the disclosed subject matter changes the way a computer system trains, updates, and applies a detection model to streaming data by introducing a machine controlled within-batch iterative adaptation loop, adaptive budgeting logic, and stopping logic that collectively improve false negative recovery, model convergence speed, and stability of learning over time in a streaming operational environment.

FIG. 1 illustrates one embodiment of a system 100 of performing online active learning with corrective and iterative feedback for streaming data classification in a distributed network in accordance with various aspects as described herein. In FIG. 1, the system 100 includes a network node device 101 configured to communicate over a network 141 with a client network node device 151 and at least one HITL reviewer network node device 161. The network node device 101 can include processing circuitry 103 operatively coupled to a memory subsystem and network interface circuitry 125 via a bus 104. The processing circuitry 103 may include one or more processors, such as central processing units (CPUs), graphics processing units (GPUs), tensor processing units (TPUs), digital signal processors (DSPs), or application-specific integrated circuits (ASICs). In some embodiments, the processing circuitry 103 can execute instructions stored in the memory to perform operations associated with training and applying a detection model, coordinating HITL review, and managing data flow within the system 100.

The memory of the network node device 101 may include one or more memory components, including random access memory (RAM) 123, read-only memory (ROM) 124, and non-volatile memory (NVM) 118. The RAM 123 may store temporary data and runtime variables, while the ROM 124 may store firmware or boot instructions. The NVM 118 may store persistent data, including trained model parameters, datasets, and system configuration data.

The memory further includes an operating system (OS) 119 configured to manage system resources and support execution of application programs and circuits. The memory also stores verified samples 121, which may include labeled data samples that have been verified by a human operator to contain or not contain a target event. These verified samples 121 may be used to initialize and update a detection model.

In FIG. 1, the network node device 101 can further include bootstrap trainer circuitry 111, detection model circuitry 112, online active learning with corrective feedback (OAL-CF) or iterative feedback (OAL-IF) circuitry 113, and HITL reviewer interface circuitry 114. The bootstrap trainer circuitry 111 can be configured to initialize trainable parameters of the detection model using the verified samples 121. In some embodiments, the bootstrap trainer circuitry 111 can generate an initial model using a small set of labeled samples. In other embodiments, the bootstrap trainer circuitry 111 can perform transfer learning from a pre-trained model and can fine-tune the model using the verified samples 121.

The detection model circuitry 112 can be configured to implement a detection model that processes input samples and generates prediction results. In some embodiments, the detection model can include a neural network, such as a convolutional neural network (CNN), recurrent neural network (RNN), transformer-based model, or a combination thereof. In other embodiments, the detection model circuitry 112 can include a contrastive learning component and a classifier component configured to distinguish between target and non-target samples.

As used herein, a sample refers to any unit, segment, portion, instance, or representation of data that is capable of being processed, analyzed, classified, or otherwise evaluated by a detection model. A sample may correspond to raw data, preprocessed data, feature data, or any derived numerical representation thereof, and may be defined with respect to time, space, sequence position, logical grouping, or any other segmentation criterion. A sample may be a standalone data unit or may be part of a larger data stream, dataset, or sequence, and may be fixed-length or variable-length.

In some embodiments, a sample includes an audio segment, such as a clip of audio of predetermined duration (e.g., approximately five seconds), a sliding window of audio data, or an audio segment defined by detected activity or silence boundaries. In other embodiments, a sample includes a video segment, such as a sequence of frames, a portion of a video stream, a group of images, or a region-of-interest within one or more frames. In still other embodiments, a sample includes sensor data, such as measurements from environmental sensors, industrial sensors, wearable devices, or Internet-of-Things (IoT) devices, including timeseries data, event-triggered data, or aggregated sensor readings.

In further embodiments, a sample may comprise text data, such as a sentence, phrase, document segment, or token sequence; image data, such as a single image, a cropped region, or a feature map; or multimodal data combining two or more data types, such as synchronized audio and video segments or sensor data aligned with contextual metadata. A sample may also correspond to a portion of a larger data unit, such as a temporal subsection of a media file, a spatial subsection of an image, or a subset of features within a feature vector.

In some embodiments, a sample may be represented as a numerical representation derived from raw data, including feature vectors, numerical representations, transformed signals, or other representations generated by preprocessing pipelines or machine learning models. For example, a sample may include a fixed-length feature vector representing an audio segment, a concatenation of feature vectors associated with neighboring segments to incorporate contextual information, or a reduced dimensional representation of a sequence obtained through averaging, pooling, or other transformation.

In certain embodiments, a sample may be associated with one or more labels, annotations, or predictions, including indications of whether the sample contains a target event. A sample may be an unverified sample lacking a confirmed label, a queried sample selected for HITL review, a predicted sample associated with a model-generated prediction, a positive predicted sample indicating a predicted presence of a target event, a verified sample confirmed by a human reviewer, a true positive sample, or a false positive sample.

The OAL-CF/IF circuitry 113 can be configured to perform online active learning with corrective feedback. In particular, the OAL-CF/IF circuitry 113 can select informative samples for annotation, coordinate HITL queries, process feedback, and update the detection model based on both active learning queries and corrective feedback. The OAL-CF/IF circuitry 113 may implement ranking algorithms, adaptive query budget logic, and iterative training procedures.

The HITL reviewer interface circuitry 114 can be configured to manage communication with the HITL reviewer network node device 161. The HITL reviewer interface circuitry 114 can generate HITL requests, such as a first HITL request 183 and a second HITL request 187, and can receive corresponding HITL responses, such as a first HITL response 185 and a second HITL response 189. These requests and responses may include data identifying samples to be reviewed and verification inputs provided by human reviewers.

The network interface circuitry 125 can be configured to transmit and receive data over the network 141. The network interface circuitry 125 may include wired or wireless communication components, such as Ethernet interfaces, Wi-Fi modules, cellular transceivers, or other communication subsystems. The network interface circuitry 125 can enable the network node device 101 to receive unverified samples 181 from the client network node device 151 and to exchange HITL requests and responses with the HITL reviewer network node device 161.

The client network node device 151 can be configured to generate or provide unverified samples 181 to the network node device 101. In some embodiments, the client network node device 151 can include sensor or media capture components configured to collect audio, video, or other data streams. For example, the client network node device 151 may include a microphone configured to capture audio in an environment, a camera configured to capture video, or other sensors configured to detect environmental conditions.

The unverified samples 181 may include audio clips, video segments, or other data samples in which a target event may occur. In some embodiments, each unverified sample 181 can correspond to a fixed-duration segment, such as a five-second audio clip. In other embodiments, the unverified samples 181 may correspond to variable-length segments such as defined by detected activity or event boundaries.

The HITL reviewer network node device 161 can be configured to perform an HITL review process. The HITL reviewer network node device 161 may include a user interface that presents samples and associated predictions to a human reviewer, and input mechanisms that allow the reviewer to provide verification responses. For example, the reviewer may indicate whether a sample contains a target event, thereby generating the first HITL response 185 or the second HITL response 189.

In operation, the network node device 101 can receive unverified samples 181 from the client network node device 151 via the network interface circuitry 125. The OAL-CF/IF circuitry 113 can process the unverified samples 181 by ranking the samples based on an informativeness criterion and selecting a subset of samples for HITL review. The HITL reviewer interface circuitry 114 can generate a first HITL request 183 that is transmitted to the HITL reviewer network node device 161. The HITL reviewer can provide verification responses, which are received as the first HITL response 185 and used by the detection model circuitry 112 and the OAL-CF/IF circuitry 113 to update the detection model.

An informativeness criterion refers to a quantitative or qualitative measure used to evaluate how useful a given sample is expected to be for improving a detection model if additional information, such as a human-provided label, is obtained for that sample. The informativeness criterion is used to rank unverified samples so that a subset of samples that are most likely to improve model performance can be selected for HITL review. In this manner, the informativeness criterion enables efficient allocation of limited annotation resources by prioritizing samples that are expected to yield the greatest reduction in model error, uncertainty, or bias.

In some embodiments, the informativeness criterion is based on prediction uncertainty generated by the detection model. For example, the detection model may output a probability score indicating the likelihood that a sample contains a target event. Samples having probability scores near a decision boundary, such as approximately 0.5 in a binary classification setting, may be considered highly informative because the model is uncertain about their classification. In one example, an audio sample with a predicted probability of 0.52 for containing a target language may be ranked higher than a sample with a probability of 0.95, because the latter is already confidently classified.

In other embodiments, the informativeness criterion is based on entropy or confidence dispersion associated with model outputs. For instance, in a multi-class setting, a sample for which the model assigns similar probabilities across multiple classes may have high entropy and therefore be considered informative. As an example, a video segment in which the model assigns 0.34 probability to class A, 0.33 to class B, and 0.33 to class C may be more informative than a segment where one class has a dominant probability.

In further embodiments, the informativeness criterion is based on an expected model change. In such embodiments, samples are evaluated based on how much the model parameters would change if the sample were labeled and used for training. For example, a sample that produces a large gradient during backpropagation may be considered highly informative because incorporating its label would significantly alter the model.

In some embodiments, the informativeness criterion is based on expected error reduction. In such embodiments, the system estimates how much the overall classification error would decrease if the sample were labeled and incorporated into training. For example, if labeling a particular sensor data segment is predicted to significantly reduce false negatives in a rare-event detection scenario, that segment may be prioritized.

In other embodiments, the informativeness criterion incorporates diversity or representativeness. In such embodiments, samples that are dissimilar to already labeled samples or that represent underrepresented regions of the data distribution may be prioritized. For example, if previously labeled samples primarily include speech recorded in quiet environments, an audio sample recorded in a noisy industrial environment may be considered highly informative because it expands coverage of the feature space.

In further embodiments, the informativeness criterion includes density-weighted measures, in which both uncertainty and data distribution density are considered. For example, a sample that is both uncertain and located in a dense region of the feature space may be more informative than an outlier that is uncertain but rarely encountered.

In some embodiments, the informativeness criterion incorporates temporal or contextual information. For example, in a streaming audio application, samples occurring immediately before or after a detected target event may be assigned higher informativeness scores due to temporal correlation. Similarly, a sequence of consecutive samples exhibiting gradual changes may be prioritized to capture transitions in the data stream.

In other embodiments, the informativeness criterion is based on class imbalance considerations. For example, if the target event is rare, samples that are more likely to contain the target event, even with moderate confidence, may be assigned higher informativeness scores to improve detection sensitivity. Conversely, samples that are likely to be false positives may also be prioritized to refine model precision.

In certain embodiments, the informativeness criterion incorporates historical feedback signals, such as prior HITL verification responses. For example, if recent iterations indicate that the model is frequently misclassifying a particular type of sample, similar samples may be assigned higher informativeness scores.

In some embodiments, the informativeness criterion is a composite metric that combines multiple factors, such as uncertainty, diversity, class balance, and expected model change. For example, a weighted scoring function may be used to compute an informativeness score for each sample, where weights are dynamically adjusted based on model performance or system objectives.

In operation, the informativeness criterion may be computed for each unverified sample, and the samples may be ranked based on their respective informativeness scores. A query subset is then selected from the ranked samples based on an adaptive query budget. By selecting samples that are most informative according to the chosen criterion, the system can improve model performance more efficiently than random or exhaustive sampling approaches.

The detection model circuitry 112 can then process remaining unverified samples 181 to generate prediction results. The OAL-CF/IF circuitry 113 can identify a subset of samples predicted to contain the target event and generate a second HITL request 187 for corrective feedback. The HITL reviewer network node device 161 can provide a second HITL response 189 indicating which predicted samples are true positives and which are false positives. The detection model circuitry 112 can update the model based on this corrective feedback.

In some embodiments, the system 100 can include multiple HITL reviewer network node devices 161, and the HITL reviewer interface circuitry 114 can route requests to different reviewers based on expertise, workload, or confidence thresholds. In other embodiments, multiple reviewers may evaluate the same sample, and responses may be aggregated using consensus mechanisms or weighted voting.

In further embodiments, the system 100 may include adaptive thresholding mechanisms that adjust classification thresholds based on observed performance metrics, such as false positive rate or class prevalence. The system 100 may also include mechanisms for managing the adaptation pool of labeled samples, including pruning outdated samples or weighting samples based on recency.

In still further embodiments, the system 100 may operate in a distributed architecture in which different components are implemented across multiple devices or cloud-based systems. For example, the detection model circuitry 112 and OAL-CF/IF circuitry 113 may be executed on a server, while the client network node device 151 and HITL reviewer network node device 161 operate remotely.

The system 100 thus provides a flexible and scalable architecture for training and applying detection models in streaming environments. By integrating active learning and corrective feedback through the OAL-CF/IF circuitry 113, the system 100 enables efficient adaptation to evolving data distributions while minimizing annotation cost and improving detection accuracy.

Figure 2:
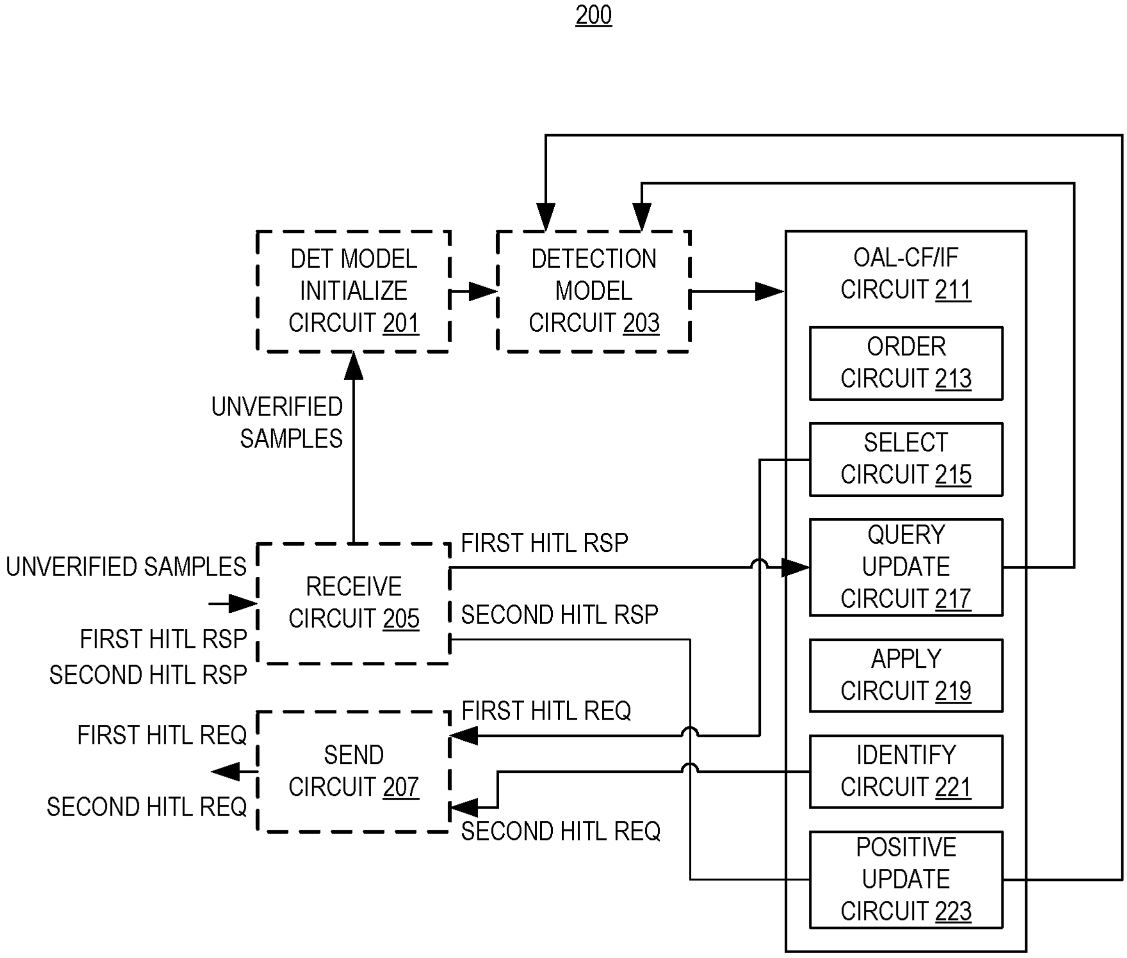
FIG. 2 illustrates one embodiment of a network node device in accordance with various aspects as described herein.

FIG. 2 illustrates one embodiment of a network node device 200 in accordance with various aspects as described herein. In FIG. 2, the device 200 implements various functional means, units, or modules, such as via the processing circuitry 301 of FIG. 3, via the processing circuitry 501 of FIG. 5, via software code, or via a combination thereof. In one embodiment, these functional means, units, modules, or circuits may correspond to blocks of the method 400 of FIG. 4 and may include, for instance, a detection model initialize circuit 201 operable to initialize trainable parameters of a detection model based on a set of verified samples that includes a representation of the target event; a detection model circuit 203 operable to store, execute, and apply the detection model to unverified samples so as to obtain prediction results and to cooperate with model-update operations; a receive circuit 205 operable to receive unverified samples, first HITL responses, second HITL responses, and other incoming information; a send circuit 207 operable to send first HITL requests, second HITL requests, and other outgoing information; an OAL-CF/IF circuit 211 operable to coordinate online active learning with corrective feedback across one or more iterations; an order circuit 213 operable to order, based on an informativeness criterion associated with the target event, the set of unverified samples to obtain an ordered set of unverified samples; a select circuit 215 operable to select, based on an adaptive query budget and the ordered set of unverified samples, a query subset of unverified samples for HITL review; a query update circuit 217 operable to update the trainable parameters of the detection model based on the HITL verification responses for the query subset; an apply circuit 219 operable to apply the updated detection model to remaining unverified samples other than the query subset to obtain prediction results; an identify circuit 221 operable to identify, from the prediction results, a positive predicted subset predicted to include the target event; and a positive update circuit 223 operable to update the trainable parameters of the detection model based on the true positive subset and the false positive subset; or the like.

Figure 3:
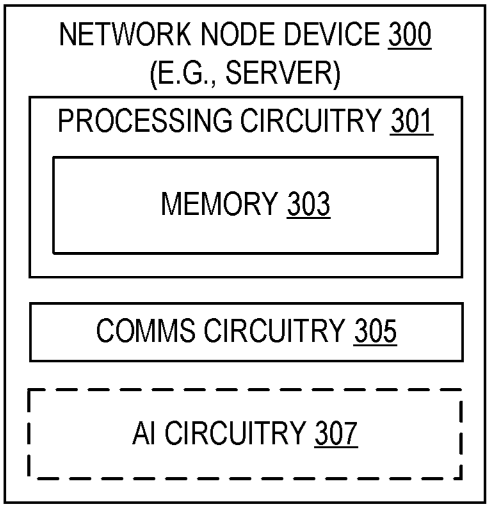
FIG. 3 illustrates another embodiment of a network node device in accordance with various aspects as described herein.

FIG. 3 illustrates another embodiment of a network node device 300 in accordance with various aspects as described herein. In FIG. 3, the device 300 can include processing circuitry 301 operably coupled to one or more of the following: a memory 303, a network communications circuitry 305, an AI circuitry 307, the like, or any combination thereof. The network communications circuitry 305 can be configured to transmit and/or receive information to and/or from one or more network node devices via any communication technology. The processing circuitry 301 can be configured to perform processing described herein, such as by executing instructions stored in the memory 303. The processing circuitry 301 in this regard may implement certain functional means, units or modules. The AI circuitry 307 can be operable to execute a detection model as described herein. In some embodiments, the AI circuitry 307 can be configured to execute inference operations associated with the detection model, including applying the detection model to unverified samples to obtain prediction results, identifying a positive predicted subset, and supporting updates to trainable parameters of the detection model. In some embodiments, the AI circuitry 307 can include hardware and software components analogous to those described for AI circuitry 509 of FIG. 5.

Figure 4:
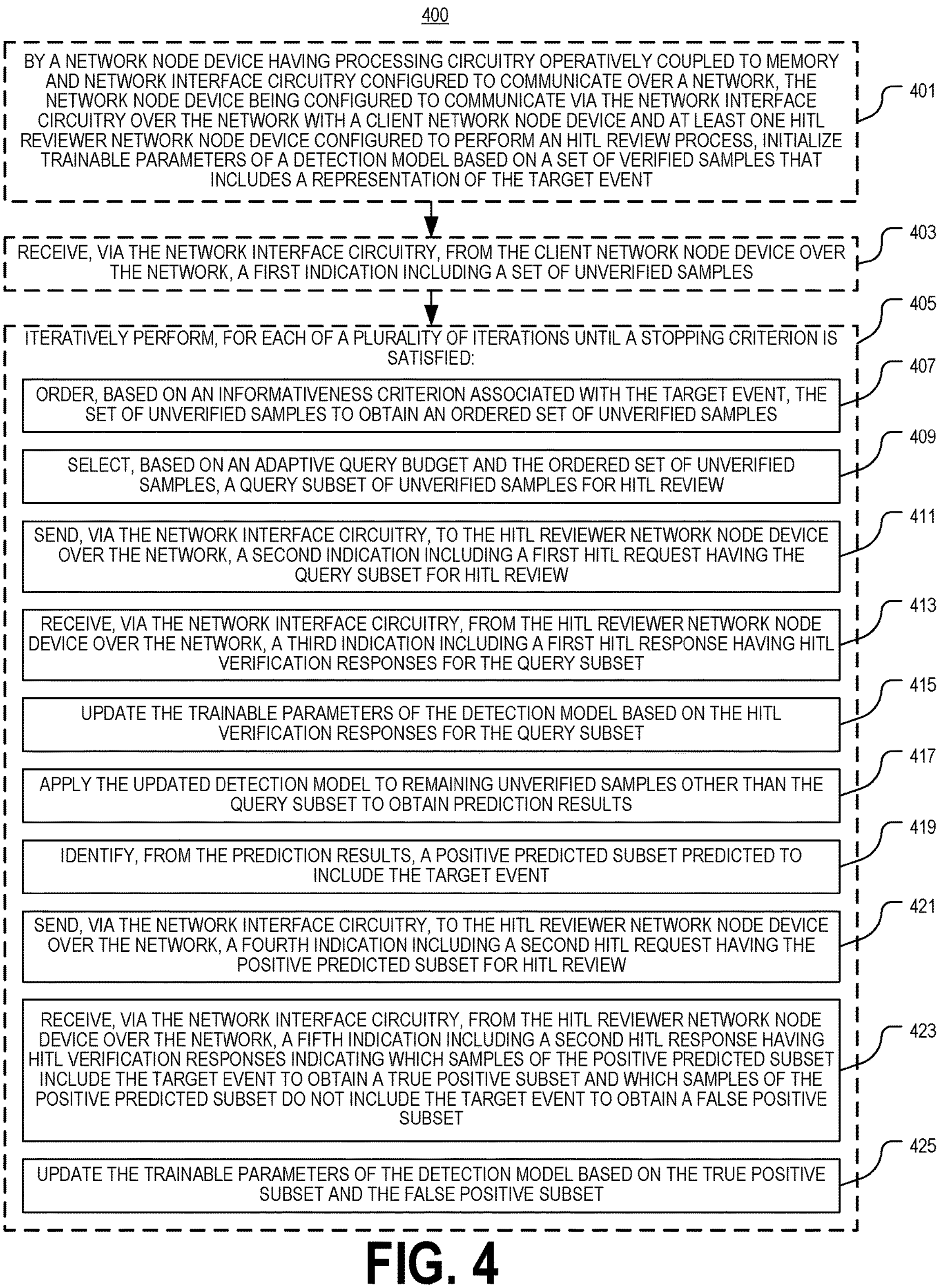
FIG. 4 illustrates one embodiment of a method of performing online active learning with corrective and iterative feedback for streaming data classification in a distributed network in accordance with various aspects as described herein.

FIG. 4 illustrates one embodiment of a method 400 performed by a network node device of performing online active learning with corrective and iterative feedback for streaming data classification in a distributed network in accordance with various aspects as described herein. In FIG. 4, the method 400 may start, for instance, at block 401, where it can include initializing trainable parameters of a detection model based on a set of verified samples that includes a representation of a target event. In some embodiments, the verified samples can include a bootstrap corpus including both target and non-target samples to enable the detection model to initially discriminate between classes. In other embodiments, the bootstrap corpus may be imbalanced to reflect expected class prevalence in an operational environment. In still further embodiments, initialization at block 401 may include transfer learning from a pre-trained model trained on a related domain, followed by fine-tuning using the verified samples.

The method 400 can further include receiving, via the network interface circuitry, from the client network node device, a set of unverified samples, as shown at block 403 of FIG. 4. The unverified samples may be received as part of a streaming data pipeline, in buffered batches, or asynchronously transmitted segments. In some embodiments, the samples can comprise fixed-length segments, such as audio clips of predetermined duration. In other embodiments, the samples may comprise variable-length segments defined by detected events, timestamps, or sliding windows.

The method 400 can include iteratively performing a sequence of operations for each of a plurality of iterations until a stopping criterion is satisfied, as indicated at block 405 of FIG. 4. The stopping criterion may include reaching a predefined number of iterations, satisfying a performance threshold such as a target false negative rate, detection cost function, or interactive machine learning metric, exhausting an annotation budget, convergence of model parameter updates, stabilization of prediction distributions, or detection of diminishing returns in informativeness scores. In some embodiments, the stopping criterion at block 405 can be dynamically adjusted during execution based on observed model performance, annotation cost, or system constraints such as latency or computational resources.

Within each iteration, the method 400 can include ranking the unverified samples based on an informativeness criterion associated with the target event to obtain an ordered set of unverified samples, as shown at block 407 of FIG. 4. The informativeness criterion may include uncertainty sampling, such as selecting samples with prediction probabilities near a decision boundary. In other embodiments, the informativeness criterion may include diversity-based selection, density-weighted metrics, expected model change, or expected error reduction. In further embodiments, the ranking at block 407 can incorporate temporal context, such that samples adjacent in time to previously identified target events are assigned higher informativeness scores. The ranking may also be weighted based on class imbalance considerations or historical annotation outcomes.

The method 400 can further include selecting, based on an adaptive query budget and the ordered set of unverified samples, a query subset of unverified samples for HITL review, as illustrated at block 409 of FIG. 4. The adaptive query budget may be fixed or dynamically adjusted. In some embodiments, the query budget can increase when model uncertainty is high and can decrease as model confidence improves. In other embodiments, the query budget can be allocated across multiple classes or prioritized based on predicted impact on model performance, such as reducing false negatives or addressing underrepresented classes.

The method 400 can include sending, via the network interface circuitry, to one or more HITL reviewer network node devices, a request including the query subset for review, as shown at block 411 of FIG. 4, and receiving corresponding HITL verification responses, as shown at block 413 of FIG. 4. In some embodiments, a single reviewer performs all annotations. In other embodiments, multiple reviewers are used and requests are routed based on reviewer expertise, workload balancing, or specialization associated with particular types of target events. In certain embodiments, low-confidence samples can be routed to highly experienced reviewers, while higher-confidence samples can be routed to less specialized reviewers. In further embodiments, multiple reviewers may annotate the same sample, and the system may reconcile differing annotations using consensus mechanisms, weighted voting, or trust scores associated with each reviewer. In still further embodiments, different reviewers or reviewer groups may handle active learning queries and corrective feedback.

The method 400 can include updating the detection model based on the HITL verification responses for the query subset, as indicated at block 415 of FIG. 4. The update may be performed incrementally using gradient-based optimization techniques, or periodically using retraining over a labeled adaptation pool. In some embodiments, the adaptation pool is stored in memory and includes labeled samples accumulated across iterations. The adaptation pool may be managed using memory constraints, such as retaining recent samples, pruning low-value samples, or weighting samples based on recency or importance.

The method 400 can include applying the updated detection model to remaining unverified samples to obtain prediction results, as shown at block 417 of FIG. 4. These prediction results may include probabilities, confidence scores, or classification outputs. The method 400 can include identifying, from the prediction results, a positive predicted subset as those samples predicted to include the target event, as shown at block 419 of FIG. 4. In some embodiments, identification of the positive predicted subset at block 419 can be based on a confidence threshold. The confidence threshold may be fixed or dynamically adjusted based on class prevalence, desired false positive rate, or operational constraints. In further embodiments, multiple thresholds can define different confidence regions, such as a high-confidence region in which predictions are accepted without review, a medium-confidence region in which predictions are subject to corrective feedback, and a low-confidence region in which samples are prioritized for active learning queries.

The method 400 can further include sending the positive predicted subset to one or more HITL reviewer network node devices for review, as shown at block 421 of FIG. 4, and receiving verification responses indicating which samples include the target event and which do not, as shown at block 423 of FIG. 4. This enables identification of a true positive subset and a false positive subset. In some embodiments, all predicted positive samples can be reviewed. In other embodiments, only a subset is reviewed based on confidence levels or resource constraints. In further embodiments, corrective feedback may include additional metadata, such as reviewer confidence scores, partial annotations, or temporal boundaries within a sample.

The method 400 can include updating the detection model based on the true positive subset and the false positive subset, as shown at block 425 of FIG. 4. This corrective feedback refines model decision boundaries and reduces false positive error rates. In some embodiments, corrective feedback may be applied iteratively within a single session, enabling multiple rounds of prediction and correction before proceeding to subsequent data.

In some embodiments, the method 400 can be performed across multiple sessions of streaming data, with each session corresponding to a batch of samples. The adaptation pool grows across sessions, enabling continuous improvement of the detection model. In other embodiments, iterative corrective feedback may be applied within a single session to accelerate model convergence.

In certain implementations, the network node device coordinates all aspects of the method 400, including sample selection, model training, and communication with HITL reviewers. In other implementations, these functions are distributed across multiple devices, including edge devices and cloud-based systems. The detection model may include a neural network, a contrastive learning model, a transformer-based model, or combinations thereof, and may operate on features derived from audio, video, sensor data, or multimodal inputs.

The described embodiments provide a technical improvement in machine learning systems by enabling efficient adaptation to streaming data through coordinated use of active learning and corrective feedback. By leveraging both machine-initiated queries and human-driven corrections, the method 400 reduces annotation cost while improving detection accuracy, particularly in environments characterized by concept drift, class imbalance, and limited labeled data.

Figure 5:
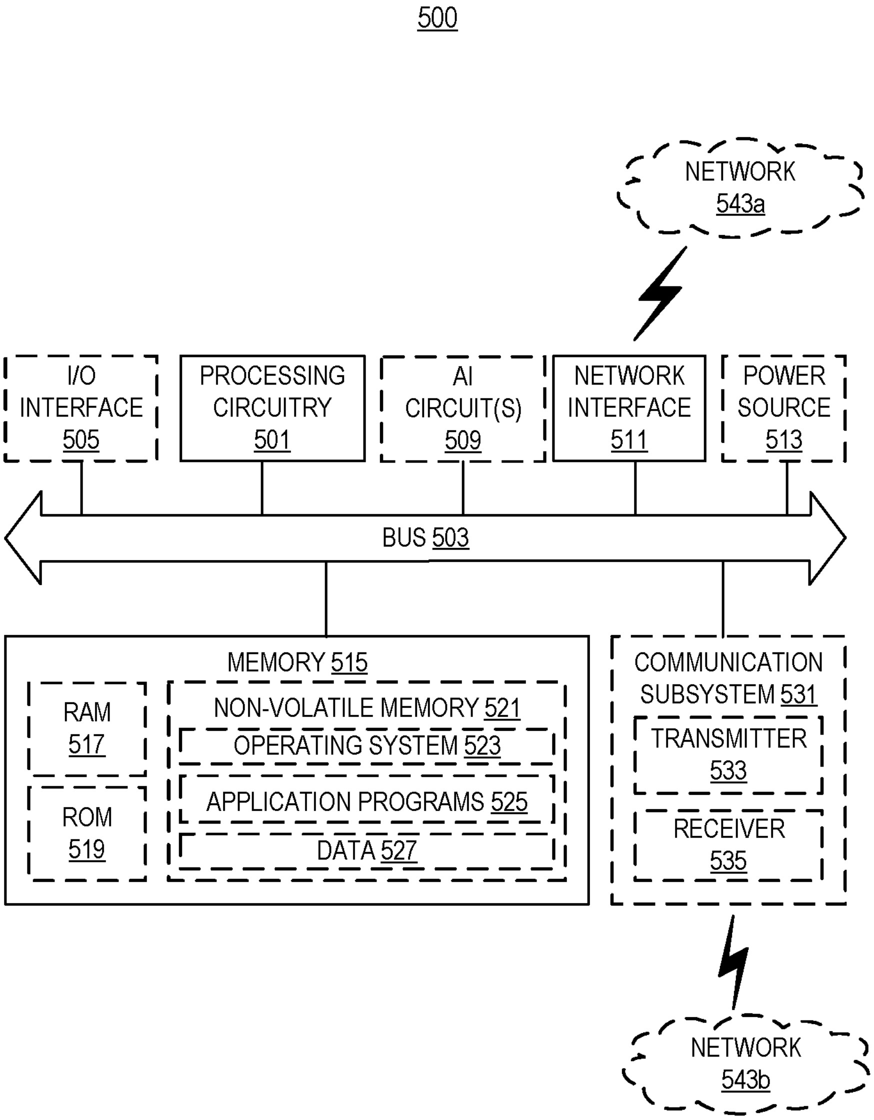
FIG. 5 illustrates another embodiment of a network node device in accordance with various aspects as described herein.

FIG. 5 illustrates another embodiment of a network node device 500 in accordance with various aspects as described herein. In FIG. 5, device 500 includes processing circuitry 501 that is operatively coupled to input/output interface 505, AI circuitry 509, network interface circuitry 511, a local interconnect or bus 503, power source 513, memory 515 including random access memory (RAM) 517, read-only memory (ROM) 519, and storage medium 521 or the like, communication subsystem 531, or any other component, or any combination thereof. In some embodiments, the network node device 500 implements the network node device 101 or another network node device of FIG. 1.

The input/output interface 505 may be configured to provide a communication interface to an input device, output device, or input and output device. The device 500 may be configured to use an input/output device via input/output interface 505 such as the location device (e.g., GPS module) and the display device (e.g., touchscreen). An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor (e.g., a digital camera, a digital video camera, a web camera, etc.), a location device, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, the like, or any combination thereof. In other embodiments, storage medium 521 may include other similar types of information.

Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the AI circuitry 509 may be configured to execute one or more machine learning models by considering examples and learned model parameters. In some embodiments, the network node device 500 includes AI circuitry 509 that is operable to execute a detection model as described herein. As illustrated in FIG. 5, the AI circuitry 509 can be operatively coupled to processing circuitry 501, memory 515, and local interconnect or bus 503 so that the detection model can be invoked as part of the online active learning with corrective feedback operations described herein. The AI circuitry 509 can be configured to receive input samples, feature data, model control signals, or other data from processing circuitry 501 or from other network node devices via network interface circuitry 511, apply the detection model using model parameters stored in memory 515, and generate corresponding prediction results, confidence values, classification outputs, or other inference results. In some embodiments, the AI circuitry 509 is further operable to participate in HITL review workflows by processing unverified samples, query subsets, positive predicted subsets, and reviewer feedback associated with one or more iterations of the online active learning with corrective feedback process.

In some embodiments, the AI circuitry 509 may be configured to cooperate with processing circuitry 501 to initialize trainable parameters of the detection model based on verified samples, such as bootstrap samples that include representations of a target event and non-target samples. In some embodiments, the AI circuitry 509 may further support transfer learning, fine-tuning, incremental retraining, or other update techniques using verified samples, HITL verification responses, true positive samples, false positive samples, or combinations thereof.

In some embodiments, the AI circuitry 509 may further support generation or processing of feature representations for samples to be classified by the detection model. For example, the AI circuitry 509 may be configured to generate, receive, or process numerical representations corresponding to audio samples, video samples, sensor samples, or multi-modal samples. In some embodiments, the AI circuitry 509 may further process contextual information associated with neighboring samples, such as prior samples and subsequent samples in a data stream, so that classification of a current sample is informed by temporal or sequential context.

In certain implementations, the AI circuitry 509 can include an accelerator subsystem that provides specialized hardware support for tensor operations associated with the detection model. The accelerator subsystem may include one or more graphics processing units (GPUs), tensor processing units (TPUs), neural processing units (NPUs), digital signal processors, or other matrix-multiply engines that are optimized to perform inference and training operations for the detection model. The accelerator subsystem can be coupled to a model parameter store, such as high-bandwidth memory, GDDR memory, or a dedicated portion of memory 515 mapped for relatively low-latency access, so that forward passes, backpropagation operations, and parameter updates can be performed efficiently.

In some examples, the AI circuitry 509 can further include a feature processing pipeline configured to receive input samples and generate or transform feature data consumable by the detection model. The feature processing pipeline may include circuitry configured to segment input data into samples, normalize feature values, concatenate feature vectors associated with neighboring samples, reduce sequence outputs to fixed-size vectors, or otherwise prepare input data for the detection model. On the output side, the feature processing pipeline may generate class scores, probabilities, confidence values, threshold comparisons, or other outputs that are usable by processing circuitry 501 in performing ordering, selection, identification, or update operations.

The core model execution logic of the detection model can be implemented by an inference engine within AI circuitry 509. The inference engine can orchestrate execution of one or more model layers, blocks, or subnetworks associated with the detection model. In some embodiments, the detection model may include a contrastive network and a classifier network, and the inference engine may process one or more input samples through a feature extraction stage, a contrastive stage, and a classification stage so as to produce a prediction. In other embodiments, the detection model may include another neural-network architecture, a probabilistic classifier, a support vector machine, or another trainable model architecture.

In certain embodiments, AI circuitry 509 can additionally include a runtime controller that manages lifecycle aspects of detection model execution. The runtime controller can track active inference sessions, can allocate and release memory resources for input samples, feature buffers, and model states, can enforce latency or throughput budgets associated with streaming data processing, and can schedule concurrent requests originating from different sessions or iterations of the online learning process. The runtime controller may further coordinate execution of model initialization operations, query update operations, apply operations, identify operations, and positive update operations corresponding to the circuits and blocks described herein.

To support interaction with other network node devices and HITL reviewer devices, AI circuitry 509 may cooperate with processing circuitry 501 and network interface circuitry 511 to exchange model-related data and review-related data. For example, AI circuitry 509 may provide prediction results or confidence values that are used to generate first HITL requests including a query subset or second HITL requests including a positive predicted subset. AI circuitry 509 may also receive, directly or indirectly, HITL verification responses indicating labels for query subsets or indicating which samples of a positive predicted subset include a target event and which do not include the target event. Results derived from such HITL responses can then be incorporated into subsequent model updates.

In some implementations, AI circuitry 509 can further incorporate a policy or constraint module or circuitry. The policy or constraint module may perform one or more of: enforcing threshold constraints on prediction outputs, enforcing query budget constraints, applying class balance constraints to training data, filtering or prioritizing candidate samples for HITL review, or restricting update operations according to system-defined rules. In some examples, the policy or constraint module may also employ auxiliary models or supporting logic executed using the same accelerator subsystem or on separate processing elements.

In yet other embodiments, AI circuitry 509 can include a model configuration and adaptation module that manages multiple configurations of the detection model and supports fine tuning, incremental adaptation, or parameter reconfiguration. The configuration module can load different sets of model parameters, adaptation settings, threshold values, or feature-processing settings into memory 515 to support different tasks, environments, or operating modes. In some examples, the configuration module can also manage quantization parameters, precision settings, or sampling-related parameters so that the same physical accelerator resources can efficiently serve different performance and capacity configurations.

Although FIG. 5 depicts AI circuitry 509 as a discrete block, in some embodiments part or all of the AI circuitry 509 may be implemented by processing circuitry 501 executing stored program instructions from memory 515. For example, portions of the feature processing pipeline, runtime controller, or model configuration and adaptation module may be realized as software modules, while an accelerator subsystem and parameter store can be provided by one or more discrete accelerator devices. In other examples, AI circuitry 509 may be implemented as a system-on-chip including embedded CPU cores, accelerator cores, and on-die memory regions forming a monolithic integrated circuit within the network node device 500. In each case, AI circuitry 509 can be operable to execute a detection model in that it is configured to receive input samples or feature data, perform inference using stored model parameters, cooperate with other circuitry to obtain and incorporate HITL verification responses, and return model outputs that drive ordering, selection, prediction, identification, and update operations described herein.

The network interface circuitry 511 may be configured to provide a communication interface to network 543*a*. The network 543*a* may encompass wired or wireless networks such as a local-area network (LAN), a wide-area network (WAN), a computer network, a wireless network, a telecommunications network, another like network or any combination thereof. For example, network 543*a* may comprise a Wi-Fi network. The network interface circuitry 511 may be configured to include a receiver and a transmitter interface used to communicate with one or more other devices over a communication network according to one or more communication protocols, such as Ethernet, TCP/IP, SONET, ATM, or the like. The network interface circuitry 511 may implement receiver and transmitter functionality appropriate to the communication network links (e.g., optical, electrical, and the like). The transmitter and receiver functions may share circuitry components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 or receiver 535 to implement transmitter or receiver functionality, respectively, appropriate to the RAN links (e.g., frequency allocations and the like). Further, transmitter 533 and receiver 535 of each transceiver may share circuitry components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired or wireless networks such as a local-area network (LAN), a wide-area network (WAN), a computer network, a wireless network, a telecommunications network, another like network or any combination thereof. For example, the network 543*b* may be a cellular network, a Wi-Fi network, or a near-field network. The power source 513 may be configured to provide alternating current (AC) or direct current (DC) power to components of the device 500.

The features, benefits or functions described herein may be implemented in one of the components of the device 500 or partitioned across multiple components of the device 500. Further, the features, benefits, or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a computer-implemented method is provided for training a detection model to detect a target event using HITL verification. The method may be performed by a network node device having processing circuitry operatively coupled to memory and network interface circuitry configured to communicate over a network. The network node device may be configured to communicate via the network interface circuitry over the network with a client network node device and at least one HITL reviewer network node device configured to perform an HITL review process. The method includes initializing trainable parameters of a detection model based on a set of verified samples that includes a representation of the target event. The method further includes receiving, via the network interface circuitry, from the client network node device over the network, a first indication including a set of unverified samples. The method further includes iteratively performing, for each of a plurality of iterations for the set of unverified samples until a stopping criterion is satisfied, a plurality of operations.

The plurality of operations includes ordering, based on an informativeness criterion associated with the target event, the set of unverified samples to obtain an ordered set of unverified samples. The plurality of operations further includes selecting, based on an adaptive query budget and the ordered set of unverified samples, a query subset of unverified samples for HITL review. The plurality of operations further includes sending, via the network interface circuitry, to the HITL reviewer network node device over the network, a second indication including a first HITL request having the query subset for HITL review. The plurality of operations further includes receiving, via the network interface circuitry, from the HITL reviewer network node device over the network, a third indication including a first HITL response having HITL verification responses for the query subset. The plurality of operations further includes updating the trainable parameters of the detection model based on the HITL verification responses for the query subset.

The plurality of operations further includes applying the updated detection model to remaining unverified samples other than the query subset to obtain prediction results. The plurality of operations further includes identifying, from the prediction results, a positive predicted subset predicted to include the target event. The plurality of operations further includes sending, via the network interface circuitry, to the HITL reviewer network node device over the network, a fourth indication including a second HITL request having the positive predicted subset for HITL review. The plurality of operations further includes receiving, via the network interface circuitry, from the HITL reviewer network node device over the network, a fifth indication including a second HITL response having HITL verification responses indicating which samples of the positive predicted subset include the target event to obtain a true positive subset and which samples of the positive predicted subset do not include the target event to obtain a false positive subset. The plurality of operations further includes updating the trainable parameters of the detection model based on the true positive subset and the false positive subset. The method further includes, responsive to satisfaction of the stopping criterion, receiving, via the network interface circuitry, from the client network node device over the network, a subsequent indication including a subsequent set of unverified samples.

In another exemplary embodiment, the method further includes receiving, via the network interface circuitry, from the client network node device over the network, a sixth indication including a subsequent set of unverified samples, applying the updated detection model to the subsequent set of unverified samples to obtain subsequent prediction results, and identifying, from the subsequent prediction results, a subsequent positive predicted subset predicted to include the target event.

In another exemplary embodiment, the informativeness criterion is based on a prediction confidence value generated by the detection model for each unverified sample, and ordering the set of unverified samples includes ordering the unverified samples based on uncertainty associated with the prediction confidence values.

In another exemplary embodiment, the adaptive query budget is determined based on at least one of a target event prevalence estimate associated with the set of unverified samples, a quantity of samples in the positive predicted subset, a confidence distribution of prediction results generated by the detection model, or whether a prior iteration identified at least one sample including the target event.

In another exemplary embodiment, updating the trainable parameters of the detection model based on the HITL verification responses for the query subset includes adding the query subset and corresponding HITL verification responses to a labeled adaptation pool stored in the memory and retraining or fine-tuning the detection model using the labeled adaptation pool.

In another exemplary embodiment, updating the trainable parameters of the detection model based on the true positive subset and the false positive subset includes adding the true positive subset and the false positive subset to the labeled adaptation pool stored in the memory and retraining or fine-tuning the detection model using the labeled adaptation pool.

In another exemplary embodiment, applying the updated detection model to the remaining unverified samples includes generating, for each remaining unverified sample, a feature representation and a corresponding prediction score, and identifying the positive predicted subset includes selecting samples having prediction scores that satisfy a target-event threshold.

In another exemplary embodiment, the stopping criterion is based on at least one of a predetermined number of iterations, an error metric associated with the detection model, a determination that no additional true positive samples were identified in a most recent iteration, or exhaustion of the adaptive query budget.

In another exemplary embodiment, the set of verified samples and the set of unverified samples comprise audio segments, and the target event comprises a spoken-language event or a live-speech event represented within the audio segments.

In another exemplary embodiment, the network node device stores, in the memory, data identifying the query subset, the HITL verification responses for the query subset, the positive predicted subset, the true positive subset, and the false positive subset, and the trainable parameters of the detection model are updated using the stored data from multiple iterations.

In one exemplary embodiment, a network node device is provided. The network node device includes processing circuitry operatively coupled to a memory and network interface circuitry. The network node device is configured to communicate via the network interface circuitry over a network with a client network node device and at least one HITL reviewer network node device configured to perform an HITL review process. The memory stores instructions executable by the processing circuitry whereby the processing circuitry is configured to initialize trainable parameters of a detection model based on a set of verified samples that includes a representation of the target event, receive, via the network interface circuitry, from the client network node device over the network, a first indication including a set of unverified samples, and iteratively perform, for each of a plurality of iterations for the set of unverified samples until a stopping criterion is satisfied, operations to: order, based on an informativeness criterion associated with the target event, the set of unverified samples to obtain an ordered set of unverified samples; select, based on an adaptive query budget and the ordered set of unverified samples, a query subset of unverified samples for HITL review; send, via the network interface circuitry, to the HITL reviewer network node device over the network, a second indication including a first HITL request having the query subset for HITL review; receive, via the network interface circuitry, from the HITL reviewer network node device over the network, a third indication including a first HITL response having HITL verification responses for the query subset; update the trainable parameters of the detection model based on the HITL verification responses for the query subset; apply the updated detection model to remaining unverified samples other than the query subset to obtain prediction results; identify, from the prediction results, a positive predicted subset predicted to include the target event; send, via the network interface circuitry, to the HITL reviewer network node device over the network, a fourth indication including a second HITL request having the positive predicted subset for HITL review; receive, via the network interface circuitry, from the HITL reviewer network node device over the network, a fifth indication including a second HITL response having HITL verification responses indicating which samples of the positive predicted subset include the target event to obtain a true positive subset and which samples of the positive predicted subset do not include the target event to obtain a false positive subset, and updating the trainable parameters of the detection model based on the true positive subset and the false positive subset; and receive, responsive to satisfaction of the stopping criterion, via the network interface circuitry, from the client network node device over the network, a subsequent indication including a subsequent set of unverified samples.

In another exemplary embodiment, the processing circuitry is further configured to receive, via the network interface circuitry, from the client network node device over the network, a sixth indication including a subsequent set of unverified samples, apply the updated detection model to the subsequent set of unverified samples to obtain subsequent prediction results, and identify, from the subsequent prediction results, a subsequent positive predicted subset predicted to include the target event.

In another exemplary embodiment, the processing circuitry is further configured to order the set of unverified samples based on prediction confidence values generated by the detection model for respective unverified samples, and to order the set of unverified samples based on uncertainty associated with the prediction confidence values.

In another exemplary embodiment, the adaptive query budget is determined based on at least one of a target event prevalence estimate associated with the set of unverified samples, a quantity of samples in the positive predicted subset, a confidence distribution of the prediction results, or whether a prior iteration identified at least one sample including the target event.

In another exemplary embodiment, the processing circuitry is further configured to update the trainable parameters of the detection model based on the HITL verification responses for the query subset by adding the query subset and corresponding HITL verification responses to a labeled adaptation pool stored in the memory, and retraining or fine-tuning the detection model using the labeled adaptation pool.

In another exemplary embodiment, the processing circuitry is further configured to update the trainable parameters of the detection model based on the true positive subset and the false positive subset by adding the true positive subset and the false positive subset to the labeled adaptation pool stored in the memory, and retraining or fine-tuning the detection model using the labeled adaptation pool.

In another exemplary embodiment, the processing circuitry is further configured to apply the updated detection model to the remaining unverified samples by generating, for each remaining unverified sample, a feature representation and a corresponding prediction score, and to identify the positive predicted subset by selecting samples having prediction scores that satisfy a target-event threshold.

In another exemplary embodiment, the stopping criterion is based on at least one of a predetermined number of iterations, an error metric associated with the detection model, a determination that no additional true positive samples were identified in a most recent iteration, or exhaustion of the adaptive query budget.

In another exemplary embodiment, the set of verified samples and the set of unverified samples comprise audio segments, and the target event comprises a spoken-language event or a live-speech event represented within the audio segments.

In one exemplary embodiment, a system is provided for training a detection model to detect a target event using HITL verification. The system includes a client network node device, at least one HITL reviewer network node device configured to perform an HITL review process, and a network node device comprising processing circuitry operatively coupled to memory and network interface circuitry. The network node device is configured to communicate via the network interface circuitry over a network with the client network node device and the at least one HITL reviewer network node device. The memory stores instructions executable by the processing circuitry to cause the processing circuitry to: initialize trainable parameters of a detection model based on a set of verified samples that includes a representation of the target event; receive, from the client network node device over the network, a first indication including a set of unverified samples, and iteratively, for each of a plurality of iterations for the set of unverified samples until a stopping criterion is satisfied, perform operations to: order, based on an informativeness criterion associated with the target event, the set of unverified samples to obtain an ordered set of unverified samples; select, based on an adaptive query budget and the ordered set of unverified samples, a query subset of unverified samples for HITL review; send, to the at least one HITL reviewer network node device over the network, a second indication including a first HITL request having the query subset for HITL review; receive, from the at least one HITL reviewer network node device over the network, a third indication including a first HITL response having HITL verification responses for the query subset; update the trainable parameters of the detection model based on the HITL verification responses for the query subset; apply the updated detection model to remaining unverified samples other than the query subset to obtain prediction results; identify, from the prediction results, a positive predicted subset indicating a predicted presence of the target event; send, to the at least one HITL reviewer network node device over the network, a fourth indication including a second HITL request having the positive predicted subset for HITL review; receive, from the at least one HITL reviewer network node device over the network, a fifth indication including a second HITL response indicating which samples of the positive predicted subset include the target event to obtain a true positive subset and which samples of the positive predicted subset do not include the target event to obtain a false positive subset; update the trainable parameters of the detection model based on the true positive subset and the false positive subset; and receive, from the client network node device over the network, responsive to satisfaction of the stopping criterion, a subsequent indication including a subsequent set of unverified samples.

In the era of Large Language Models (LLMs) and foundation models, the focus of the Machine Learning (ML) community has tended toward large neural networks trained on massive amounts of annotated data. This approach to ML is referred to as Passive Machine Learning (PML), since the neural network is provided with a set of pre-determined training data rather than contributing as an active participant in the learning process. A visual comparison of conventional PML to the OAL-CF paradigm is illustrated in FIG. 1. Because of the high level of expressivity that comes with the billions of parameters contained in these neural architectures, as well as the vast array of data used to train them, PML-trained networks have been shown to perform well on a wide variety of tasks in many different environments, even without further updates to the classifier after deployment.

However, despite their popularity and the fact that they are highly effective in many use cases, these algorithms fail to generalize to conditions that are dissimilar from those seen in the training set. As such, these PML approaches fail to address certain real-world challenges of ML, including processing evolving data streams, adapting to unseen or unexpected variations in operational data, learning from limited labeled training data, handling extreme class sparsity and imbalance, and integrating user feedback. Fortunately, alternative learning paradigms, such as Online Active Learning (OAL), have been designed to address these challenges.

OAL addresses the practical issues of PML by introducing two fundamental changes to the learning paradigm: (1) the data are presented as a data stream rather than a static pool, and (2) the samples that are labeled and used for training are selected by the machine. Thus, in the OAL paradigm, an ML classifier is trained sequentially in online fashion, with the intention of adapting directly to the data stream on which the algorithm operates. This goal is achieved by allowing the algorithm to pose a limited number of active queries about samples observed in the data stream to a human operator who can provide accurate class labels. The classifier learns from these labels and subsequently classifies the unlabeled portion of the data stream. This process of querying, learning, and classifying is repeated throughout the data stream to give the algorithm a mechanism to adapt to distribution shifts in the data stream, or concept drift.

Since the data are presented in a stream in OAL, the annotated data pool available for training and adapting the classifier grows over time. This adaptation pool starts out as a small number of initialization samples, and then it grows as more data from the stream are annotated via active queries. Online processing presents a number of challenges that are not addressed by the PML paradigm. First and foremost, the volume of labeled data is much more limited, which makes it difficult to train a robust classifier. Second, data streams are not independent and identically distributed (i.i.d.), so the class imbalance becomes both more varied over time and more extreme than a static data pool. Finally, online training poses the question of which samples and how many samples should be annotated for training to achieve both the lowest error rate and the lowest annotation cost.

In the OAL paradigm, rather than relying on a data scientist to curate the training data, the machine becomes an active participant in the data selection process. An Active Learning (AL) sample selection strategy is employed in an attempt to determine which data points would be the most valuable to the training process if the associated labels were known. Then, the selected data are assigned labels by some oracle—in this disclosure, a domain expert who also performs the task—after which the labeled data are made available to the classifier for training.

Existing OAL methods have been applied to a wide variety of tasks in both batch-based and sample-by-sample contexts. Applications include spam email detection, text classification, object classification, object detection, and various other process monitoring tasks. In each application, AL query selection methods are applied to a streaming data problem to predict which samples are the most informative for training and adaptation. These methods are strictly limited to AL queries for obtaining user input, however. If the training process were allowed to be guided by active human input, the classifier could be better attuned to the particular needs of the user, even when training data is limited or the task is not formally defined before deployment.

Figure 6:
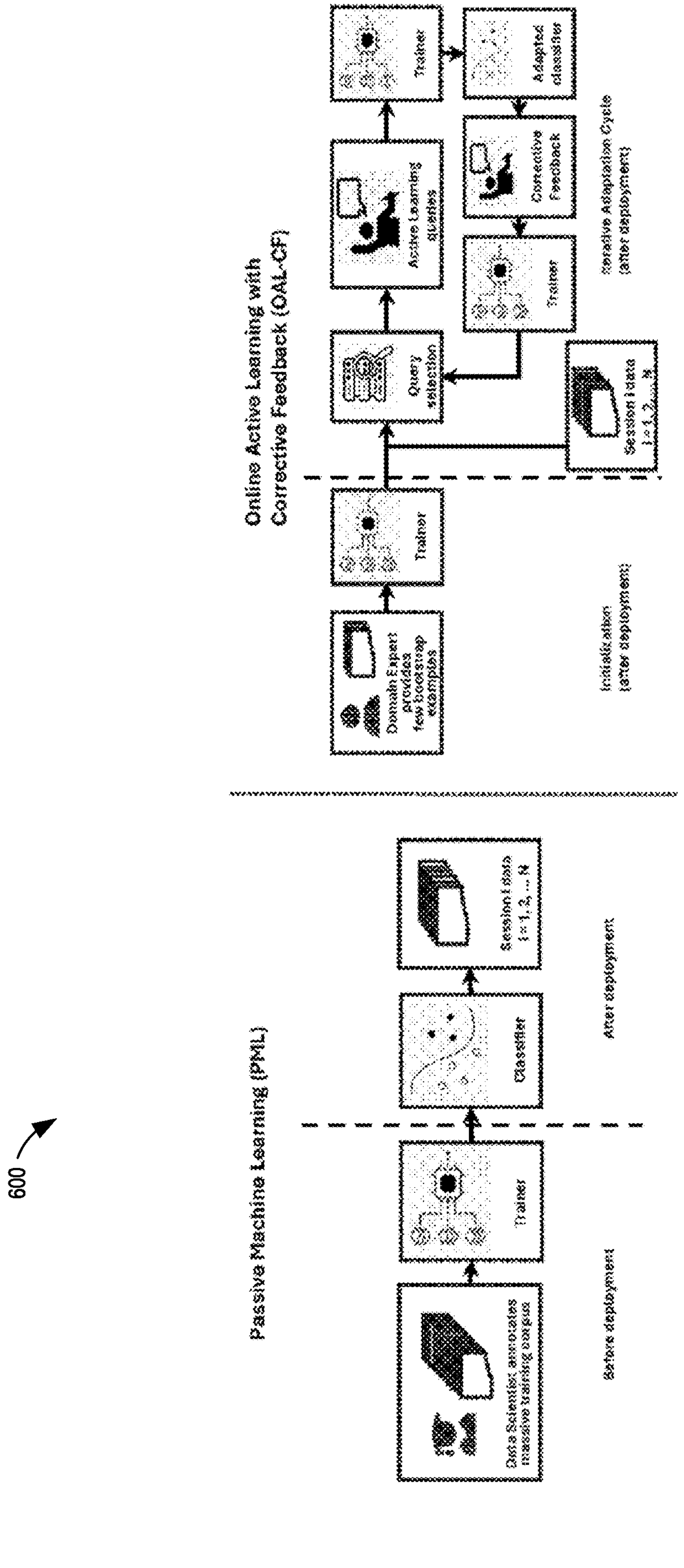
FIG. 6 illustrates a comparison between passive machine learning and online active learning with corrective feedback.

In this disclosure, Corrective Feedback (CF) is introduced as a second channel of interaction between the expert and the machine classifier in the OAL paradigm. This new formulation may be referred to as the Online Active Learning with Corrective Feedback (OAL-CF) paradigm, as illustrated in FIG. 6. The objective of OAL is also redefined and clarified as a method for a domain expert, i.e., a human user with expertise in a specific task, to train a reliable ML tool that can aid him or herself without becoming a significant distraction from his or her normal workflow. In other words, the objective of OAL is to minimize jointly the classification error and annotation cost for a specialized task in a specific operating environment. Without the aid of a machine classifier, the expert's only recourse would be to review every sample in the data stream. Therefore, a machine classifier that reliably eliminates some of the uninformative samples in the stream can increase the expert's efficiency and reduce his or her cognitive burden.

OAL-CF is a superior method for optimizing this objective, with a 53% relative reduction in cost compared to OAL without CF. Detailed analysis of the behavior of OAL-CF explains its success. In short, although it may be counter-intuitive, the addition of CF has proven to lower the overall cost of annotation effort and error, as measured by the Interactive Machine Learning Metric (IMLM). This is possible because the resulting error reduction from CF samples is significant enough that the additional validation effort becomes objectively worthwhile. Note that CF does not incur a hidden cost-every false positive error, including those that are later corrected by the expert, is counted equal to an AL query by the IMLM cost.

In the OAL-CF paradigm, CF is defined as the introduction of additional class labels obtained based on the expert's response to interaction with the classifier's predictions. Conceptually, CF is an important addition to the OAL pipeline because it provides a complementary information channel to AL. AL allows the machine to ask the expert questions; CF allows the expert to point out errors in the machine's predictions. Without both of these channels, communication between the machine and the expert becomes one-sided and even dangerously inefficient. For example, one commonly-cited challenge in online learning and AL algorithms is the classifier becoming overly confident in its own predictions. This is especially dangerous when the relevant underlying statistics change slowly. If the classifier fails to detect these changes, it will make confident decisions that are incorrect.

CF is also powerful because, unlike AL, it does not require additional work beyond the expert's normal workflow. In any application where the expert performs downstream analysis or other processing using the output of the classifier, the classifier acts as a sieve that separates informative data from useless data. An imperfect classifier reduces the amount of useless data that need to be processed, but does not completely eliminate it. As such, a necessary part of the expert's workflow includes reviewing all target predictions to separate true positive predictions from false positives. CF takes advantage of this part of the workflow and obtains labels from this review process. AL queries, on the other hand, add extra steps to the expert's workflow.

The original motivation for this disclosure was to find adaptable solutions for previously undefined tasks that involved detecting specific events in audio streams. Such tasks include, but are not limited to, detecting target audio in surveillance applications where a human observing the audio stream is searching for information pertinent to potential threats or security risks. Considering this original motivation, the applications explored in this disclosure may be defined to be binary detection or verification tasks in the audio domain where the detection or verification target is some specified rare audio event. Specifically, experiments and analysis are performed primarily on the Spoken Language Verification (SLV) task and later extended to the task of Voice-Type Discrimination (VTD). The goal in these applications, like the goal of OAL, is to perform the task as well as possible while simultaneously minimizing the number of annotations required for classifier training. As such, the success of the algorithms evaluated may be determined with a set of evaluation metrics that consider both annotation cost and error rate.

Various approaches relating to online active learning and HITL machine learning have been developed, although prior work in this area has been relatively limited. In particular, different methods have been proposed to adjust or extend the OAL paradigm, as well as to incorporate forms of corrective feedback.

OAL has been extended in various ways to address specific challenges. One such challenge is that of drifting or time-varying data streams. Even with expert guidance, OAL systems require additional functionality to navigate concept drift that is inherent in many data streams. Concept drift may be addressed by introducing a drift detection mechanism and adjusting the OAL algorithm when such drift is detected. Some approaches allocate additional active learning queries to portions of the data stream where drift is more likely, some initiate training of a new classifier that replaces a pre-drift classifier, and others apply weighting schemes in which predictions from a dynamic classifier are combined with predictions from a more stable classifier.

Another challenge that is particularly significant in OAL is imbalanced class representation. This issue is exacerbated by the fact that data streams are not independent and identically distributed, as well as by the presence of extreme class sparsity in many real-world applications. Some methods address class imbalance in a manner similar to offline algorithms, for example by oversampling a minority class or undersampling a majority class. Other methods operate more directly on the classification process, such as by learning a lower-dimensional representation that improves discrimination for the minority class or by utilizing a loss function with non-uniform weightings to compensate for imbalance.

Additional challenges arise from the possibility that responses to active learning queries may not always be clear, accurate, or timely. For example, certain approaches incorporate multiple expert annotations and reconcile differing inputs to determine how to incorporate such annotations. Other approaches treat the annotator as only partially reliable and develop methods to account for label noise. Still other approaches address delayed annotations, in which the algorithm must continue operating without immediate access to updated labels.

Many HITL machine learning algorithms have been developed, although only some explicitly utilize the human as a source of corrective feedback. In some cases, the human acts as an active selector and annotator of important samples prior to training, while in other cases the human provides guidance to the training process. Certain algorithms allow a human operator to correct classification errors after predictions have been made, including approaches within interactive machine learning and reinforcement learning frameworks.

Interactive machine learning may be defined as an interaction paradigm in which a user or group of users iteratively builds and refines a mathematical model through cycles of input and review. Many interactive machine learning systems emphasize user interface design rather than the underlying learning algorithm or corrective feedback mechanisms. However, some systems incorporate corrective feedback in various forms, such as allowing manipulation of a classifier's confusion matrix to influence system behavior, enabling control over data and annotation processes, or allowing feature selection to indirectly adjust model performance.

Reinforcement learning algorithms actively interact with an environment to optimize a reward function. Corrective feedback has been incorporated into reinforcement learning as a mechanism by which a human participant can guide the learning process and influence system behavior. Inverse reinforcement learning extends this concept by learning the reward function itself based on observed demonstrations of a task. Such approaches are often used in apprenticeship learning and imitation learning contexts, where corrective feedback may be provided in the form of additional demonstrations or guidance.

In most ML classification algorithms, a classifier is trained by being presented with many examples comprised of pairs of features (x) and labels (y). Through some mathematical process, the classifier learns the mapping of features to labels, f(x)=y. A critical assumption of these Machine Learning algorithms is that the features extracted from the training data are from the same distribution as the operational data. The learning paradigms of PML, OAL, and OAL-CF each train classifiers in this way; the difference lies in the way the examples are collected and presented. As described herein, OAL is a machine learning paradigm that trains a classifier on a data stream. The classifier learns from samples obtained directly from the data stream in the form of periodic active queries posed by the machine to the user for annotation. From this definition, OAL differs fundamentally from PML in that it is both online and active.

The OAL process begins when the classifier is initially trained on a small bootstrap corpus of target and non-target samples prepared by a domain expert, who is also the operational user. In one implementation, the bootstrap corpus contains only four samples from each class, and it comes from an environment that differs from the target environment in the data stream. The bootstrap corpus data then become the first samples added to the adaptation pool, which is the growing reserve of annotated samples used to adapt the classifier.

After initialization, one batch of the data stream is presented at a time to the algorithm, beginning a session of processing. In one implementation, the batch is defined as 720 samples or approximately one hour of audio. Within each session, the OAL algorithm completes three steps. First, a small sample of data from the current batch is selected by the machine, labeled by the expert, and added to the adaptation pool as active learning queries. Second, the classifier is adapted by fine-tuning on all labeled data available in the adaptation pool. Third, the classifier makes predictions about each sample in the session, and the predictions are presented to the expert. After these three steps, the next batch of data is loaded from the stream and the next session begins. This process is repeated for all data in the stream.

Figure 7:
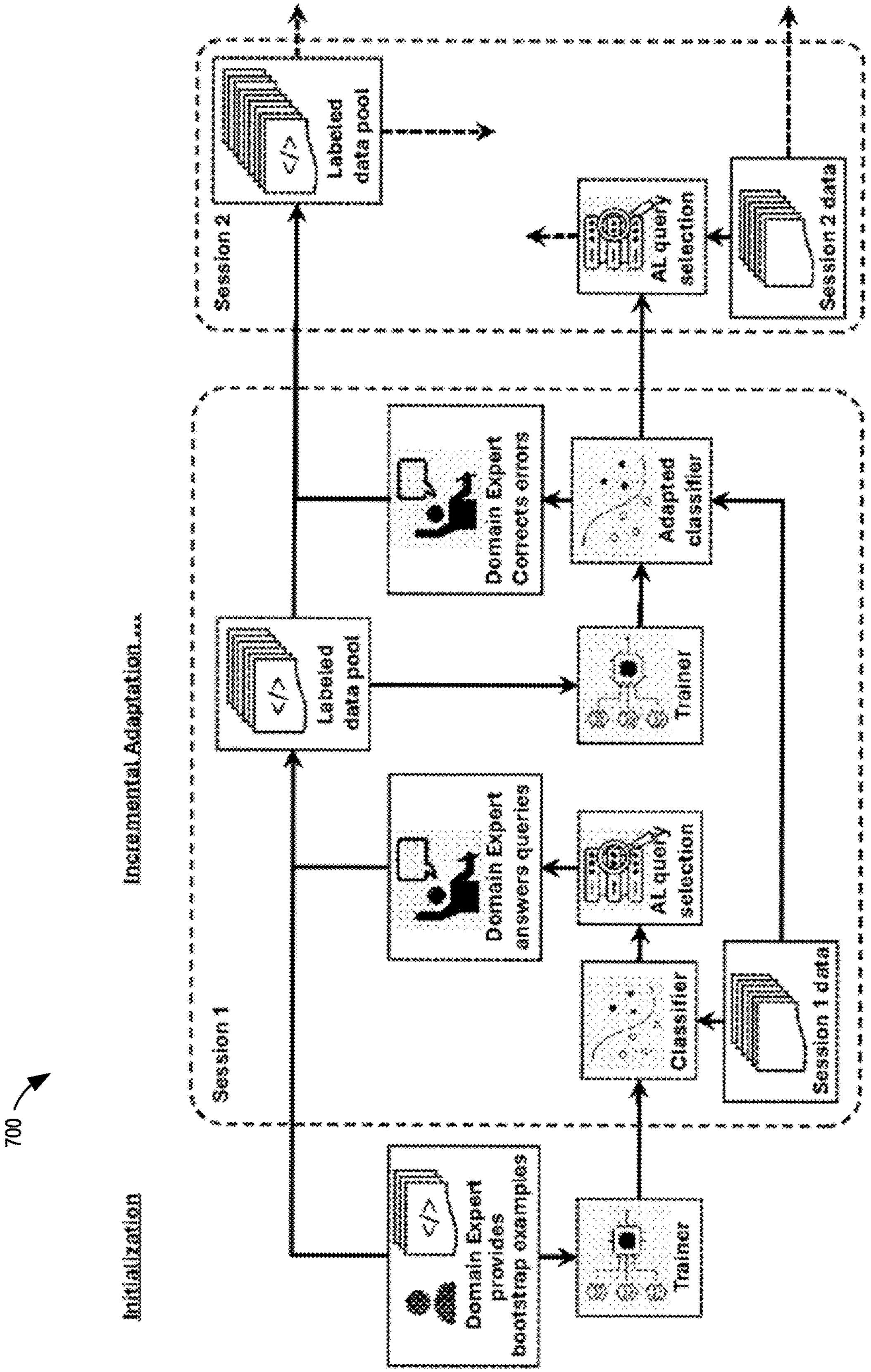
FIG. 7 illustrates an example system architecture for online active learning with corrective feedback.

OAL-CF, like OAL, is also an online algorithm that actively identifies informative samples for labeling, as illustrated in FIG. 7. The important difference between OAL and OAL-CF is the addition of CF. When the CF block is removed, this becomes the OAL paradigm (without CF). For both paradigms, the classifier is first initialized with a small bootstrap corpus and then introduced to the data stream. Within each online session, the expert annotates a small number of AL samples, the classifier is updated, and class predictions are made for all current session data. CF is provided for the predictions in the OAL-CF paradigm, and the labels derived from CF are added to the training pool for the next session.

Conceptually, CF is crucial to making OAL efficient and reliable in real operation. CF takes advantage of the expected workflow of the expert by obtaining labels from downstream analysis on the classifier's predictions. Since the expert will analyze these samples regardless of whether or not the algorithm collects CF, additional ground-truth class information can be gleaned from that analysis without adding any additional task to the expert's workflow. Thus, compared to AL queries, CF acquisition takes advantage of an existing part of the expert's workflow, but CF annotations can only be applied to sessions after the session in which the annotations were acquired.

In terms of technical algorithmic details, the addition of CF means two additional steps after the predictions are reviewed by the expert. The first additional step is to acquire CF labels. In one implementation, the expert will only review and classify samples that the machine has predicted to be from the target class. This means that all positive predictions, i.e., false positives and true positives, in the session get labels. CF is defined in this way because it aligns with the expert's workflow, as target samples contain information that will be used in downstream tasks, and all non-target samples are considered uninformative and will be discarded. Additionally, there is no way to find false negative errors other than listening to the entire data stream, which is the baseline cost of manually looking for the target class without the help of technology. The model is strongly dependent on the already learned samples, in much the same way that speaker verification separates the target from potential impostors, i.e., non-targets, which is the primary purpose of CF.

The second additional step that comes with CF is to adapt the classifier again after the CF samples have been added to the adaptation pool. This is necessary because the classifier should be up-to-date before AL queries are selected in the next session.

In some embodiments, the disclosed paradigm is further extended to provide OAL-IF, in which multiple rounds of active learning, prediction, corrective feedback, and model updating are performed for a same batch of data before advancing to a subsequent batch. In this manner, OAL-IF generalizes OAL-CF by enabling repeated within-batch adaptation when additional iterations are expected to improve detection performance.

In an OAL-IF configuration, the network node device can initialize the classifier with a class-balanced bootstrap corpus and can then load a batch of samples from the data stream. The device can pose active learning queries to the expert, update the classifier based on responses to the active learning queries, classify the current batch, receive corrective feedback from the expert concerning one or more predicted samples, and update the classifier again. Rather than immediately proceeding to the next batch, the network node device can iterate through the active learning, prediction, corrective feedback, and model update operations one or more additional times for the same batch until a stopping criterion is satisfied.

The iterative feedback loop can be beneficial for reducing false negative errors, including missed detections of rare target events. For example, a first iteration may fail to identify one or more target samples in a batch, while a later iteration, after incorporation of active learning labels and corrective feedback, may identify previously missed target samples. In this regard, iterative feedback can provide additional opportunities to recover target samples whose absence from the prediction results of an earlier iteration would otherwise persist until a later session or remain undetected.

In some embodiments, the stopping criterion may include a fixed iteration count. For example, the device can terminate the within-batch iteration after two, three, or four iterations. In other embodiments, the stopping criterion may include a condition in which no additional true positive samples are confirmed by corrective feedback during a most recent iteration. In still other embodiments, the stopping criterion may be based on one or more of annotation budget exhaustion, convergence of model updates, stabilization of prediction results, latency constraints, computational budget, or diminishing performance improvement across successive iterations.

In some embodiments, the OAL-IF configuration further includes active learning budget management for iterative operation. Because repeated iterations can otherwise increase annotation cost, the network node device can restrict active learning query volume during some iterations or batches. For example, the device can perform a single round of active learning queries for a batch while allowing multiple rounds of corrective feedback for the same batch. As another example, the device can reduce the number of active learning queries for a batch that is preliminarily predicted not to contain any target samples, while still permitting at least a limited number of queries to reduce a risk that scarce target samples remain undiscovered.

In further embodiments, the network node device can determine an adaptive query budget for iterative feedback based on target prevalence, model confidence, a quantity of predicted target samples, recent annotation outcomes, or estimated value of additional annotations. Thus, in a batch predicted to contain rare but high-value target events, the device can increase query allocation and iteration depth, whereas in a batch predicted to contain no target events, the device can reduce query allocation while still preserving an ability to detect unexpected target occurrences.

In some embodiments, the network node device further includes iteration control circuitry configured to maintain an iteration state for a current batch. The iteration state may include an iteration count, a current query budget state, a quantity of target predictions identified in a current iteration, a quantity of newly confirmed true positive samples identified in the current iteration, a quantity of false positive samples identified in the current iteration, one or more model confidence statistics, one or more convergence statistics, one or more latency or resource consumption values, or any combination thereof.

In some embodiments, upon loading a batch from the data stream, the iteration control circuitry initializes the iteration state and causes execution of a first within-batch iteration comprising: selecting active learning queries, receiving active learning verification responses, updating the detection model, applying the updated detection model to at least a remaining portion of the batch, identifying a positive predicted subset, receiving corrective feedback for the positive predicted subset, and updating the detection model based on the corrective feedback. After completion of the first within-batch iteration, the iteration control circuitry evaluates whether an iteration stop condition is satisfied and, if not satisfied, causes execution of a subsequent within-batch iteration for the same batch.

In some embodiments, the iteration stop condition is evaluated using a deterministic decision function applied to the iteration state. In one example, the deterministic decision function causes continuation of iteration while the iteration count is less than a maximum permitted count and while at least one of: (i) a newly confirmed true positive sample was identified in a most recent iteration, (ii) a confidence distribution has not converged, (iii) a model output delta exceeds a threshold, (iv) an estimated false negative burden exceeds a threshold, or (v) a remaining query budget exceeds a threshold. In another example, the deterministic decision function causes termination when no newly confirmed true positive sample is identified in a most recent corrective-feedback cycle.

In some embodiments, the active query budget is controlled by query budget circuitry that determines, for each batch and for each iteration within the batch, a permitted number of active learning queries. The permitted number may be determined based on at least one of: a target prevalence estimate associated with the batch, a quantity of samples in the positive predicted subset, a confidence distribution generated by the detection model, whether a prior iteration identified at least one sample including the target event, a recent false negative estimate, a recent false positive estimate, an annotation cost estimate, or a remaining session level or batch level resource budget.

In some embodiments, the query budget circuitry operates in a corrective feedback-only mode in which only a first iteration for the batch includes active learning queries and one or more subsequent iterations omit active learning queries while still performing corrective feedback review and corresponding model updates. In some embodiments, the query budget circuitry operates in a non-target limiting mode in which the system first generates preliminary predictions for the batch and, responsive to determining that none of the preliminary predictions indicate the target event or that a target presence score fails to satisfy a threshold, reduces the number of active learning queries for the batch relative to a batch predicted to include one or more target samples.

In some embodiments, the target presence score is based on at least one of: a maximum target probability across samples of the batch, an aggregate target probability statistic across samples of the batch, a quantity of samples satisfying a target event threshold, or a prevalence estimate generated by a prevalence estimation model. In one example, if the target presence score fails to satisfy a threshold, the permitted number of active learning queries is reduced from a first value to a second, smaller non-zero value. In another example, if the target presence score satisfies the threshold, the permitted number of active learning queries is maintained or increased.

In some embodiments, the network node device stores, for each iteration of a batch, iteration state data identifying: active learning query samples, active learning responses, positive predicted samples, corrective feedback responses, model update parameters, and post-update prediction metrics. Such stored iteration state data may be used to retrain the model, to select later query budgets, to determine later stopping conditions, to generate trend data, or to generate one or more narrative or diagnostic records associated with learning behavior of the detection model over time.

In some embodiments, the network node device is configured to perform the foregoing iteration control and budget control in a distributed architecture in which the detection model is executed by server-side processing circuitry, the streaming samples are provided by a client network node device, and HITL verification responses are provided by one or more reviewer network node devices over a network. In other embodiments, part or all of the iteration control, budget control, and model execution are performed by edge processing circuitry.

The disclosed iterative feedback framework may be applied to a variety of streaming classification tasks, including Spoken Language Verification (SLV), Voice-Type Discrimination (VTD), audio event detection, video event detection, and multimodal event verification. In one example, the target event may correspond to a specified target language occurring in an audio sample. In another example, the target event may correspond to live speech occurring within an audio stream. In further examples, the target event may correspond to a visual activity, a sensor anomaly, or another event of operational interest.

In some embodiments, evaluation of iterative feedback may include pre-iteration, intermediate-iteration, and post-iteration performance tracking. For example, the system can determine one or more metrics before a first within-batch update, after a first iteration, after a second iteration, and after a final iteration. Such metrics can include an Interactive Machine Learning Metric (IMLM), a Detection Cost Function (DCF), a false negative rate, a false positive rate, annotation cost, or combinations thereof. Tracking these values across iterations can indicate how rapidly the model improves within a batch and whether additional iterations are justified.

Accordingly, OAL-IF can provide a technical improvement over single-iteration online learning approaches by enabling faster within-batch adaptation, improved recovery of rare target events, and more stable learning in streaming environments. By selectively balancing additional annotation effort against reduction of false negative and false positive errors, the disclosed systems can optimize model adaptation for challenging operating environments characterized by sparse targets, class imbalance, and evolving data distributions.

This disclosure describes example metrics and a pipeline that may be used to evaluate the disclosed learning paradigms. Such evaluation is important because of the inherent difficulty of evaluating online HITL algorithms, and because the evaluation method employed herein differs from methods commonly used in other work. One challenge in evaluating such algorithms stems from the need to account simultaneously for both the labor required to obtain annotations for classifier training and the error rates incurred by the classifier. Furthermore, it is difficult to compare the online learning paradigms described herein because the subset of samples used for training may vary from experiment to experiment. The methods described herein are configured to address these challenges.

To address the unique challenges of evaluating HITL algorithms, an Interactive Machine Learning Metric (IMLM) may be employed as a primary evaluation metric. In addition, a Detection Cost Function (DCF), False Negative Rate (FNR), and False Positive Rate (FPR) may be tracked as secondary diagnostic metrics. The IMLM is particularly useful for fair comparison of different learning paradigms because it considers annotation cost in addition to error cost. In order to combine these different types of costs across modalities, such as number of annotations and error rates, both may be converted into units of time. For this conversion, it may be assumed that a single annotation costs approximately the same amount of time as review of a machine prediction and classification of that prediction as a false positive. False negatives may be assigned a greater cost than false positives or annotations because false negatives are more rare and more damaging to the detection or verification operation. False negatives are also less likely to be identified by a domain expert who is attending only to samples predicted by the machine to contain the target.

Accordingly, false positive classifications and annotations may be assigned the same cost, while false negatives may be assigned a higher cost. In one formulation, N represents the total number of samples in the data stream, Nann represents the total number of explicit annotations made by the expert, including bootstrap samples, active learning queries, and false positives, and $N_{fn}$, $N_{fp}$, and $N_{target}$ represent false negatives, false positives, and target samples, respectively. Because the denominator associated with false negatives is less than the denominator associated with false positives and annotations, such that $N_{target}$ is much smaller than N, the cost of false negative errors is relatively amplified. In some implementations, the level of amplification is inversely proportional to the prevalence of the target class.

$$IMLM = \frac{N_{ann} + N_{fp}}{N} + \frac{N_{fn}}{N_{target}}$$

The IMLM may be tracked across all sessions and reported as a single value calculated from accumulated errors and annotations across an entire run. The IMLM may be understood intuitively in that values less than 1.0 are more time-efficient than manual analysis, and values greater than or equal to 1.0 are equally or less efficient than manual analysis.

The DCF may be used as an additional metric for evaluating performance on detection and verification tasks. The DCF may be defined as a weighted combination of FNR and FPR, where FNR is weighted more heavily than FPR. This formulation ensures that false negatives, which may be more detrimental but less common than false positives because of the relative scarcity of the target class, are not overlooked. This makes DCF advantageous relative to classification evaluation metrics such as accuracy, F-measure, Equal Error Rate (EER), or Area Under the Receiver Operating Characteristic Curve (AUC), which may not account for scenarios in which the target class is more important and often more rare than the non-target class, and which may not force the algorithm to choose an operational threshold. In this disclosure, the standard DCF calculation is shown as follows:

$$DCF = (1 - \xi)P_{fp} + \xi P_{fn},$$

where $P_{fn}$ and $P_{fp}$ are FNR and FPR, respectively, and $\xi=0.75$. While DCF, FNR, and FPR are informative, such measures do not capture annotation cost for the expert. Thus, these measures may be treated as secondary to IMLM. DCF, FNR, and FPR may also be tracked across all sessions and reported as cumulative values.

Figure 8:
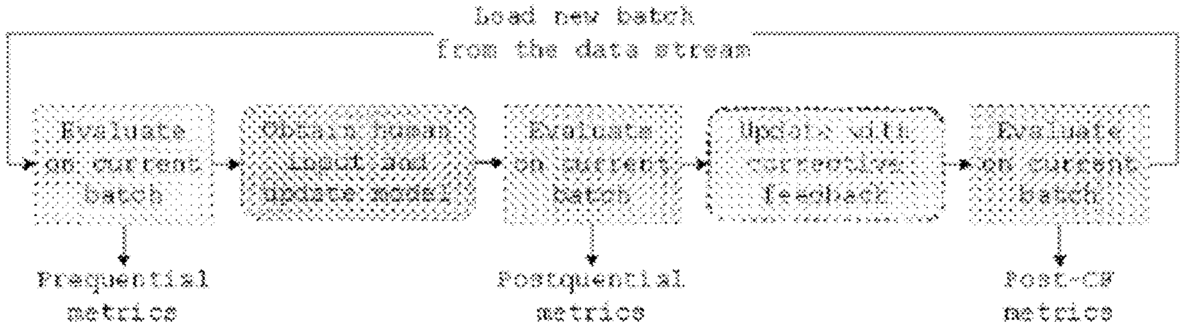
FIG. 8 illustrates the order of prequential evaluation and postquential evaluation in a pipeline of the OAL-CF paradigm.

FIG. 8 illustrates the order of prequential evaluation and postquential evaluation in the pipeline of the OAL-CF paradigm. Online HITL algorithms such as OAL are often evaluated prequentially, meaning that evaluation is performed on a full batch of new data immediately after receipt of the batch and before the classifier has adapted to the new batch. This allows evaluation to be performed on the entire data stream before the classifier has seen any ground-truth labels for a given batch, thereby simplifying comparison across algorithms. However, prequential evaluation does not reflect how well the classifier adapted to the current session, nor does it provide an accurate representation of the final prediction of the classifier after adaptation.

Accordingly, postquential evaluation may be employed after the adaptation step to provide a more realistic representation of classifier performance. Postquential evaluation has historically received limited attention because many factors, including model choice, initialization, random seed, and learning parameters, can lead to varying selections of annotated data points. These variations can in turn lead to different effective training and evaluation sets, making it difficult to compare results across experiments that are exposed to different unlabeled test samples. This issue may be addressed by tallying costs for both errors and annotation labor for all samples from the data stream, including samples that were annotated or corrected by the expert, and then evaluating total cost using IMLM.

Traditionally, evaluating all samples, including samples that have been annotated, might be characterized as testing on the training data because the classifier is exposed to annotated test samples during training. However, for training paradigms such as OAL, querying the expert may be treated as an integral part of the algorithm and as a method for obtaining data labels that is equally viable as algorithmic prediction, albeit more expensive. Under this framework, and because IMLM reflects the cost of querying the oracle, IMLM may be used to compare two OAL runs with different query budgets and query sample selections and, therefore, with different subsets of unseen samples from the data stream. This aspect of IMLM is useful for evaluating online HITL learning algorithms.

In addition to prequential and postquential evaluation metrics, evaluation metrics may also be calculated after the classifier has been updated with corrective feedback samples from a current session. Such post-corrective-feedback metrics may serve as indicators of whether the classifier absorbs the information provided by corrective feedback. These metrics may also indicate the rate at which error would decline if the corrective feedback step were repeated multiple times within the same session.

This disclosure describes example experimental configurations that may be used to evaluate the disclosed learning paradigms. The goal of such experiments may be to highlight the advantages of OAL-CF and to provide insight into the operation of the paradigm for further analysis. In one implementation, the experiments include running PML, OAL, and OAL-CF paradigms on real data, observing their behavior, and comparing their performance. Additional experiments may also be performed in which independent variables include active learning query budget allotment and data stream order of presentation. Primary experiments and analysis may be performed on the SLV task, and the paradigms may also be applied to a secondary task, VTD, to verify the findings. Example tasks and corpora, classifier architecture, and learning parameters are described below.

The tasks used to evaluate the OAL-CF paradigm, along with associated corpora, may satisfy several organizational requirements for data processed by an OAL algorithm. First, the volume of data being evaluated may be sufficiently large such that it can be broken down into batches of reasonable size. Second, the data may have some consistency in the manner in which it was recorded, such as by a single microphone in a fixed location or by a common audio collection system. Third, the data may be presented in a set order, preferably in the order in which it was collected if such information is available. In one implementation, a first dataset used for the SLV task is organized to satisfy these criteria, and a second dataset used for the VTD task also satisfies these criteria without requiring further organization.

Spoken Language Verification (SLV) is a binary classification task in which a determination is made as to whether speech in an audio clip contains a specified target language. This differs from a multi-class Language Identification (LID) task in which an objective is to predict which language, out of a list of enrolled languages, is being spoken in a given utterance. SLV also differs from language detection, which involves detecting a target language in an audio stream with potential overlap from other languages. A closer analogue to SLV is Automatic Speaker Verification (ASV), which, while focusing on speaker identity rather than the language being spoken, discriminates utterances produced by a target speaker from utterances produced by other individuals.

In one implementation, data for the SLV task come from Mozilla's Common Voice Corpus. Common Voice is a large speech corpus with ongoing data collection from multiple geographic locations. The annotations for Common Voice may denote, among other metadata, the language spoken in each utterance and the location where the utterance was recorded. Using these annotations, the data may be sorted into corpora according to geographic region. In one example, corpora contain utterances from languages found in four regions: African Continent (AC), Caucasus Region (CR), Southeast Asia (SEA), and South Asia (SA). Each corpus may be divided into training, validation, and test splits according to splits defined in the Common Voice corpus. Experimental results may be recorded for the test splits only, while the training split may be used for bootstrap corpus formation and PML training, and the validation split may be used for PML validation. The corpus sizes are shown in Table I below.

TABLE I

SLV Corpora Split Sizes in Terms of Number of Utterances

| Split | AC | CR | SEA | SA |
|---|---|---|---|---|
| Train | 982,800 | 666,720 | 1,363,680 | 797,040 |
| Val | 51,840 | 112,719 | 112,320 | 66,240 |
| Test | 56,880 | 114,480 | 90,720 | 68,400 |

In an effort to investigate rare target classes, target languages may be selected as languages having approximately 1% to 5% prevalence in their respective corpora. The class breakdown for the test splits of the four corpora can be found in Table II below. Each language has an associated abbreviation that is displayed in the tables.

TABLE II

Prevalence of All Target Languages in the SLV Corpora.

| Language | Abbr. | Corpus (duration) | % of test split |
|---|---|---|---|
| Basaa | bas | AC (82 hours) | 0.95 |
| Hausa | ha | | 1.16 |
| Yoruba | yo | | 1.75 |
| Armenian | by-AM | CR (162 hours) | 3.74 |
| Central Kurdish | ckb | | 4.60 |
| Chuvash | cv | | 1.13 |
| Kurmanji Kurdish | kmr | | 3.41 |
| Kyrgyz | ky | | 1.41 |
| Serbian | sr | | 1.34 |
| Tatar | tt | | 4.33 |
| Cantonese | yue | SEA (146 hours) | 2.86 |
| Indonesian | id | | 3.97 |
| Vietnamese | vi | | 1.39 |
| Hakha Chin | cnh | SA (119 hours) | 1.11 |
| Dhivehi | dv | | 3.22 |
| Hindi | hi | | 4.59 |
| Malayam | ml | | 1.03 |
| Marathi | Mr | | 2.55 |
| Odia | or | | 1.47 |
| Saraiki | skr | | 1.47 |

Figure 9:
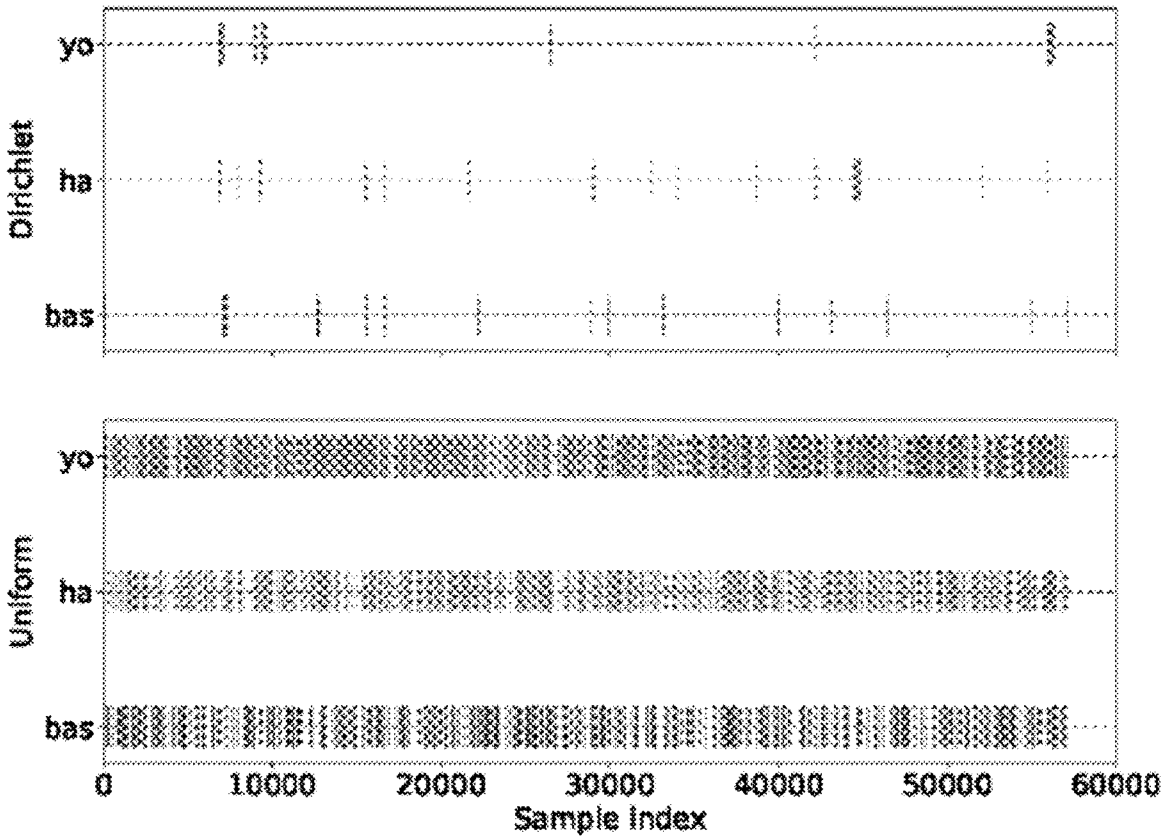
FIG. 9 illustrates different orderings of samples, including a Dirichlet ordering and a uniform ordering.

Because data from Common Voice are not intended for online tasks, such data may not have a predefined order in which samples are presented. To satisfy requirements for datasets used in this work, a fixed ordering may be defined for such corpora. In one implementation, the ordering is determined using a Dirichlet distribution. In contrast to an independent and identically distributed arrangement, which would mix samples of all classes together uniformly, a Dirichlet distribution may simulate a non-independent and non-identically distributed distribution that exhibits class clustering over time. This type of class clustering is typical of real-world data, makes the task more challenging, and provides a characteristic of online learning that can be exploited for later improvements. Differences between independent and non-independent ordering may be observed in a visualization of class distribution, such as that shown in FIG. 9. In FIG. 9, different orderings of the AC-SLV Corpus test split: (top) Dirichlet ordering, and (bottom) uniform ordering. Note that the samples are evenly dispersed in the uniform ordering and clustered into larger groups in the Dirichlet ordering.

Voice-Type Discrimination (VTD) is a task of identifying regions in audio recordings that contain live speech. Live speech may be defined as speech produced spontaneously in physical proximity to a recording device. Accordingly, media speech, including pre-recorded or broadcast speech played through a loudspeaker into the recording device, is not considered live speech. For VTD, the detection target may include all samples containing live speech, including samples that contain both live speech and media speech. Any sample that does not contain live speech may be considered to be non-target. In one implementation, samples are predefined as abutting audio segments having a duration of five seconds. An operating environment for the VTD task may correspond to a particular microphone. A session may be defined as one hour long, which results in 720 samples per session. The order in which samples are presented to the online learning algorithms may be consistent with the temporal order in which the samples appear in the recordings.

In one implementation, data for the VTD task come from two corpora, namely an SRI corpus collected by SRI International and a Lionbridge corpus. The SRI corpus may be composed of recordings made in four rooms, recorded from five microphone-pair locations in each room, resulting in twenty operating environments. The Lionbridge corpus may include recordings made in three rooms using seven microphone locations in each room, resulting in twenty-one operating environments. Between the two corpora, there may be 4,583 hours of data split into forty-one environments of varying length. The corpora may contain 896 hours of live speech audio produced by seventy-five unique speakers in English, Mandarin Chinese, Spanish, and Russian.

For the purposes of one implementation, only one microphone may be used for each room, resulting in seven different environments. The microphone for each room may be intentionally chosen to be the most disadvantaged microphone, such as a microphone positioned behind furniture or walls, or far from areas where conversations might occur. Table III below shows which microphones were used in each room for reference.

TABLE III

List of Selected Microphones and the Associated Target Prevalence for Each Room of the VTD Task.

| Corpus | Room name | Microphone | % target |
|---|---|---|---|
| SRI | Room 1 | Mic 20 | 11.62 |
| | Room 2 | Mic 16 | 12.48 |
| | Room 4 | Mic 20 | 8.80 |
| LB | Apartment | Mic 19 | 24.76 |
| | Hotel | Mic 19 | 23.47 |
| | Office | Mic 13 | 25.02 |

Target samples may be relatively uncommon in such sessions, with overall target class prevalence of 18.85%. Target samples may also be clustered in time rather than distributed uniformly throughout the data stream, such that some sessions contain no target occurrences while other sessions contain relatively high target prevalence.

The two application tasks may use different features as inputs to the system, and such features may be derived from pre-trained numerical representation models. For purposes of this disclosure, the numerical representation models may be frozen and may not be trained end-to-end with the classifier network. Even where such models are sequence-to-sequence models, an output sequence may be reduced to a single vector by calculating a mean vector over the sequence.

For the SLV task, the feature used may include numerical representations from an ECAPA-TDNN network trained to perform Spoken Language Identification on the VoxLingual07 dataset. In one implementation, these features use 256-dimensional vectors to represent each sample. The VoxLingual07 dataset may include nine of twenty target languages, including Hausa, Yoruba, Serbian, Tatar, Indonesian, Vietnamese, Hindi, Malayalam, and Marathi.

For the VTD task, the selected feature may include a concatenation of x-vectors and WavLM numerical representations. X-vectors, which are a form of speaker numerical representation, may be utilized to exploit the realistic nature of the VTD corpora, since live speech being detected often comes from the same few individuals, and detection of speech from those individuals is useful. WavLM may provide a more generic representation of speech that performs well across a large number of speech tasks. In one implementation, both types of numerical representations are extracted using pre-trained numerical representation models. The x-vector numerical representations may have 512 dimensions, and the WavLM numerical representations may have 1,024 dimensions, resulting in 1,536 total dimensions per sample.

It was found empirically that including context in the input features improved classifier performance significantly for these tasks. Accordingly, in one implementation, features with context are generated by concatenating the features for a sample in question with the features for three preceding samples and three following samples, resulting in a total of seven samples' worth of features. This concatenated feature may be used only to classify the sample in question at the center of the feature vector. This concatenation method may be used for both training and inference in all learning paradigms.

The classifier used in OAL paradigms may be lightweight, easy to adapt, and capable of achieving very low error in the operating environment given sufficient adaptation data. In one implementation, the chosen model is the neural network depicted in FIG. 10. This architecture is composed of a contrastive network and a classifier network. The contrastive network may be a Siamese network configured to project the input features into two distinct clusters using a contrastive loss based on cosine distance, $\mathcal{L}_{contrast}$. The contrastive loss may be calculated based on pairs of training samples, where y=1 when two points being compared come from a same class and y=0 when the two points come from different classes, $D_{cos} \in [0,1]$ is the cosine distance between the two points, and m=1 is a margin parameter.

$$\mathcal{L}_{contrast} = yD_{cos}^2 + (1-y)(m-D_{cos})^2$$

The classifier network then classifies the projected features into target and non-target classes. The classifier portion may be trained with a weighted negative log likelihood loss, $\mathcal{L}_{contrast}$, that defines the cost of each class based on inverse class frequency (ICF). In one formulation of the ICF weighting formulation below, $w_y$ is the weight of class y, N is the total number of training samples, $N_y$ is the number of samples that belong to class y, and C is the total number of classes, where C=2 in binary classification.

$$W_y = \frac{N}{CN_y}$$

To emphasize the importance of target samples, the inverse class frequency weight for the target class may be multiplied by an additional factor of ten (10).

The contrastive loss and classifier loss may be combined into a total loss as a linear combination with a mixing parameter ψ. In one implementation, it was found empirically that setting the mixing parameter to ψ=0.09 works well for these experiments.

Many of the learning parameters are shared across the three paradigms in this disclosure. Table IV below shows the parameters that are common across all three paradigms.

TABLE IV

Default Shared Learning Parameters for All Experiments.

| Parameter(s) | Value/Setting |
|---|---|
| Optimizer | Adam |
| Learning rate | $10^{-4}$ |
| Weight decay | $10^{-5}$ |
| Batch size | 256 |
| Early stopping patience | 15 epochs |
| Early stopping margin | $10^{-3}$ |

Unless otherwise specified, both online paradigms may use a default active learning query budget of 8 samples per session. The bootstrap corpus may be composed of 8 samples, including 4 samples from each class. Each session may consist of 720 samples, which represents approximately one hour of audio when the samples are about 5 seconds apiece on average.

For simplicity, there may be no memory limitation for any paradigm. Accordingly, the online paradigms may always have access to all samples that have been added to the labeled adaptation pool.

It should also be noted that, because of the large number of training cycles required by the online paradigms, denormal numbers may appear in model parameters. To avoid adverse effects associated with denormal numbers, parameters having denormal values may be set to zero (0).

Results and analysis of the SLV and VTD experiments are described herein. In one implementation, the analysis begins with a primary experiment comparing the three paradigms for the SLV task, followed by additional analyses and evaluation of the paradigms on the VTD task.

With respect to paradigm performance comparison, the primary SLV results may be represented by postquential performance scores for each paradigm. In one implementation, the OAL-CF paradigm performs best in every category other than FPR, followed by the OAL paradigm and then the PML paradigm. Statistical testing may further indicate that, in terms of IMLM, DCF, and FNR, OAL performs significantly better than PML, and OAL-CF performs significantly better than OAL. Although PML may achieve a marginally lower FPR than the online paradigms, it may do so at the cost of rejecting a relatively large volume of valuable target samples.

TABLE V

Primary SLV Performance Results for Each Paradigm. OAL-CF Achieves the Best Performance Using Nearly All Metrics.

| Paradigm | IMLM | DCF | FNR | FPR |
|---|---|---|---|---|
| PML | 10.286 | 0.189 | 0.252 | 0.001 |
| OAL | 0.105 | 0.069 | 0.091 | 0.002 |
| OAL-CF | 0.049 | 0.027 | 0.035 | 0.002 |

It should be noted that the IMLM of the PML paradigm may be relatively high. This is because the number of annotations, Nann, used to train and validate the network in the PML framework may be very large. It is also worth noting that, even if those annotations from outside the data stream were not considered, such that $N_{ann}=0$, the IMLM would still be 0.253, which is worse than either of the online paradigms. The other paradigms are more efficient with regard to IMLM because they are designed to adapt to the data stream by using a relatively small number of examples taken directly from the operating environment. This mitigates the common problem of mismatch between test data and training data. The addition of CF makes OAL-CF more efficient than OAL in terms of overall cost of annotation and errors.

Figure 11A:
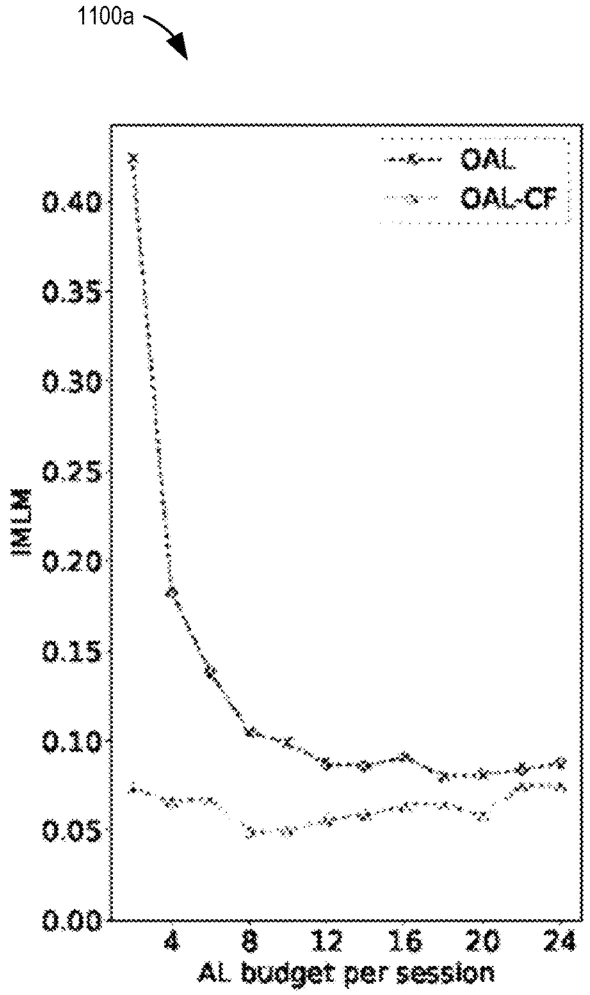
FIGS. 11A and 11B illustrate OAL and OAL-CF performance in terms of respective IMLM and DCF for a range of active learning budgets.
Figure 11B:
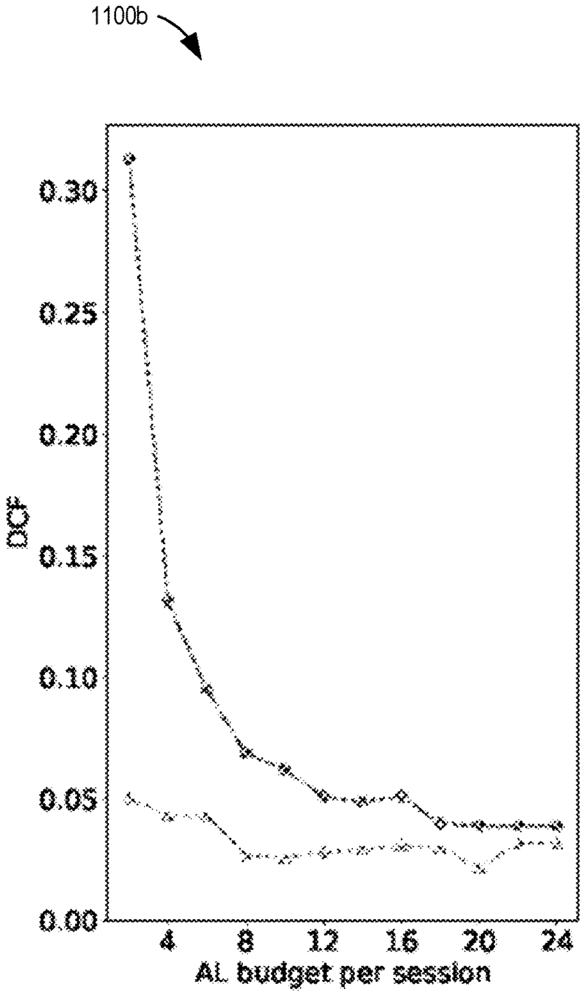

The primary experiment indicates that the addition of CF is beneficial to the OAL paradigm. Further experimentation with different active learning budget allocations may elucidate how the two interaction channels, namely AL and CF, operate when both are present. In one implementation, FIGS. 11A and 11B illustrate the respective IMLM and DCF achieved by the two paradigms with increasingly large AL budgets ranging from two (2) to twenty-four (24) AL samples per session. FIG. 11 further illustrates that OAL and OAL-CF performance in terms of IMLM and DCF varies as a function of AL budget, with IMLM being minimized at eighteen (18) samples per session for OAL and eight (8) samples per session for OAL-CF. As shown, OAL-CF consistently outperforms OAL across the range of AL budgets.

First, it may be noted that the results from OAL-CF are better than those from OAL for all active learning query budgets. In terms of IMLM specifically, the worst IMLM result for OAL-CF may be lower than the best IMLM result for OAL. Such dominant performance further confirms the importance of adding CF. Second, both curves may have a similar trajectory in which increasing the query budget yields lower IMLM and DCF up to a point, after which further improvement ceases. While the gap between the paradigms may narrow with increasing query budgets, OAL-CF may achieve substantially better performance than OAL with relatively few active learning queries. Third, the IMLM and DCF of the OAL paradigm may be minimized when the active learning budget is set to eighteen (18) queries per session. For OAL-CF, DCF may be lowest at twenty (20) queries per session, while IMLM may indicate that a budget of eight (8) queries is superior because it achieves a low error rate using fewer annotations. This highlights an additional advantage of OAL-CF, namely that performance may be optimized with relatively little additional required annotation effort.

Trend analysis may be used to evaluate cost accumulated as a function of time for the two online paradigms. In one implementation, the plots described herein display the metrics cumulatively over time, meaning that each point on a curve represents the IMLM or DCF resulting from all errors and annotations for all languages up to and including the associated session indicated on the horizontal axis. Because some corpora may be shorter than others, languages from shorter corpora may contribute to the cumulative metrics only until their last session. For example, languages from the AC-SLV corpus may have a length of seventy-nine (79) sessions and therefore contribute to cumulative error and annotation counts only for the first seventy-nine (79) sessions.

Figure 12:
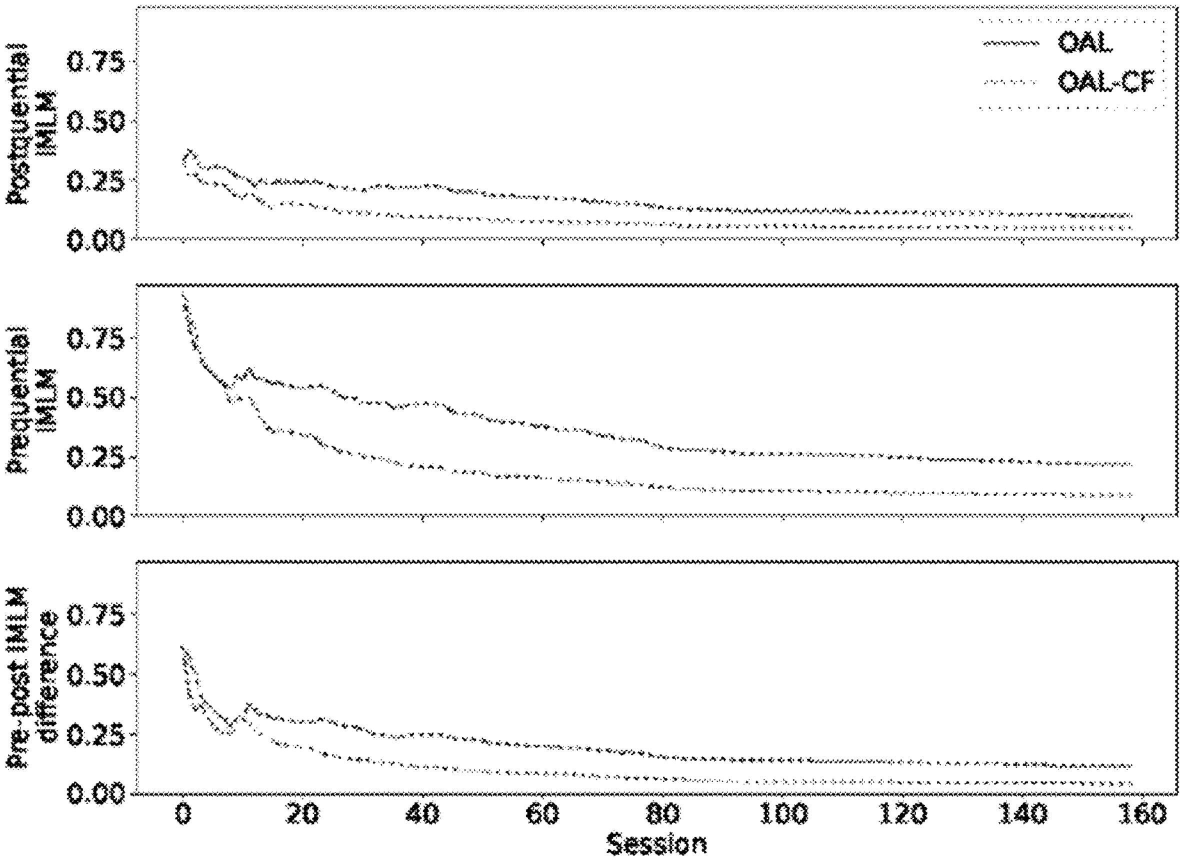
FIG. 12 illustrates trends across time for postquential IMLM, prequential IMLM, and a difference between prequential and postquential IMLM, and further illustrates that OAL-CF consistently achieves better results than OAL.

In one implementation, postquential scores of the classifier are primarily considered. The top panel of FIG. 12 may illustrate the postquential IMLM for OAL and OAL-CF. As shown, the two paradigms may begin at approximately the same point and may initially exhibit a similar inconsistent downward trend. This initial inconsistency may be understood as a minimally initialized classifier struggling to adapt to the environment. However, the OAL-CF curve may trend downward more quickly than the OAL curve, while maintaining a notably lower IMLM throughout the run. Because the primary difference between these paradigms is the presence or absence of CF, the additional annotations from CF may provide OAL-CF with this advantage. FIG. 12 further illustrates trends across time for postquential IMLM (top), prequential IMLM (middle), and a difference between prequential and postquential IMLM (bottom), wherein OAL-CF consistently achieves better results than OAL.

The middle panel of FIG. 12 may illustrate corresponding trends for prequential evaluation. The prequential trends may be significant because they represent a traditional method of evaluating online algorithms, and because they isolate the impact of annotations gathered in previous sessions from annotations acquired via active learning queries for a current session. In contrast to what may be observed in the postquential trend plots, OAL may track OAL-CF very closely until session ten (10), indicating that the limited informative samples acquired via active learning queries may be more advantageous for early adaptation than CF samples. This condition may not persist, however, and OAL-CF may take the lead after session ten (10). This transition may occur because the CF samples quickly reach a critical mass of adaptation samples required for the classifier to make significant improvements in performance.

The bottom panel of FIG. 12 may illustrate a difference between the prequential and postquential trends. This difference trend may indicate how much the algorithm benefits from active learning queries over time. The closer to zero (0) the curve becomes, the more the classifier may rely on previously gathered annotations rather than the newest active learning queries. After the initial confusion associated with the first few samples, OAL-CF may exhibit a consistently smaller difference between prequential and postquential IMLM than OAL. This may be expected because CF provides the OAL-CF paradigm with a substantially larger pool of annotations from previous sessions as compared to OAL. Understanding this difference may be useful for increasing efficiency of the algorithm, since algorithms that do not rely heavily on active learning queries may reduce query budget and thereby reduce IMLM.

Figure 13:
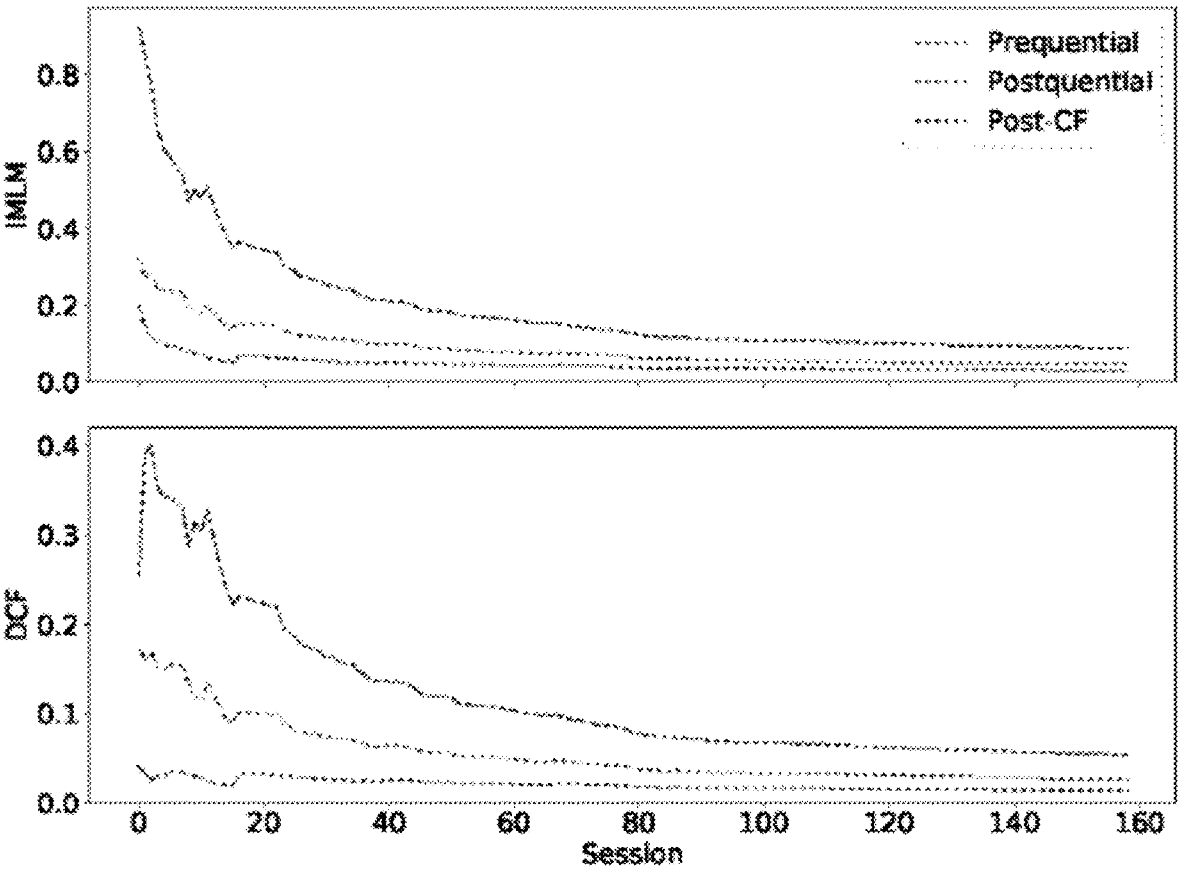
FIG. 13 illustrates IMLM and DCF trends across time for prequential, postquential, and post-CF evaluation of OAL-CF, and further illustrates that results improve as more relevant training data becomes available.

The score trends after the classifier has been updated with new CF samples, referred to herein as a post-CF trend, may also be compared to the prequential and postquential trends of the OAL-CF paradigm. In one implementation, FIG. 13 illustrates prequential, postquential, and post-CF curves for the OAL-CF paradigm in terms of both IMLM and DCF. By way of example, an overall post-CF IMLM score may be 0.032, while a postquential score may be 0.049, which may represent a significant difference. FIG. 13 further illustrates IMLM and DCF trends across time for prequential, postquential, and post-CF evaluation of OAL-CF. As expected, results improve as more relevant training data becomes available.

As expected, the added information about the current session from CF may be highly influential, causing the post-CF curve to fall well below even the postquential curve. Although using the CF information in the same session from which it was acquired may not be part of the baseline OAL-CF paradigm, this behavior confirms that the information gained through CF is utilized effectively in the training process. It also indicates that repeated iteration of active learning and CF steps within a single session can reduce error rate sufficiently that the added effort required of the expert becomes worthwhile.

Figure 14:
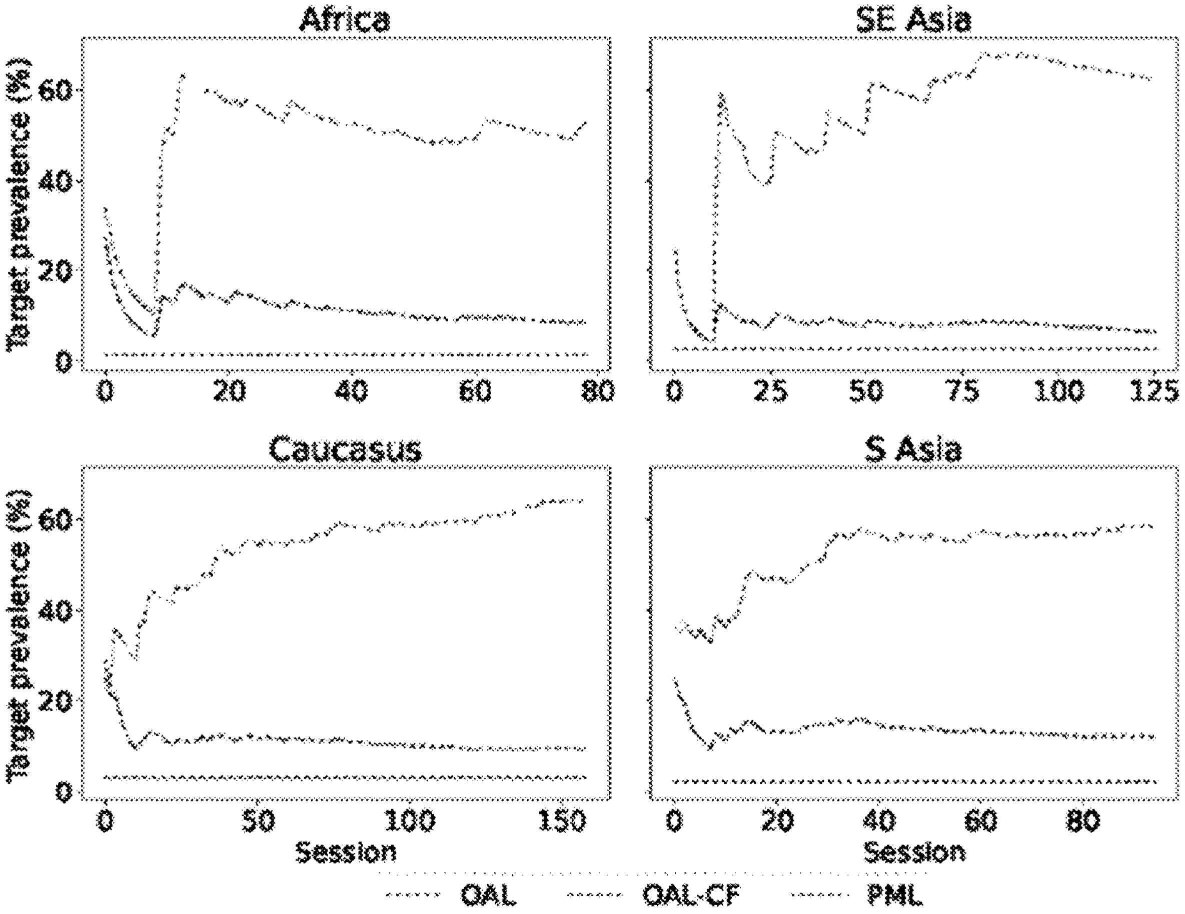
FIG. 14 illustrates prevalence of a target class in an adaptation pool over time for multiple paradigms in each SLV corpus, and further illustrates that OAL-CF achieves close to fifty percent target samples and fifty percent non-target samples for a majority of sessions.

Class balance analysis may also be used to evaluate performance of the disclosed paradigms. It has been recognized that class imbalance in a training set can be detrimental to performance, particularly in online learning scenarios. As illustrated in FIG. 14, which shows target class prevalence in the training data throughout the data stream, OAL-CF consistently maintains a target sample prevalence close to 50% in the adaptation pool, while the other paradigms remain consistently lower. OAL-CF naturally maintains this balance because CF collects both false positives, which correspond to non-target samples, and true positives, which correspond to target samples. This is conceptually distinct from other approaches for achieving balanced classes, such as decimation or repetition of training samples. This feature of OAL-CF may be an additional reason for its low error rate. FIG. 14 further illustrates prevalence of the target class in the adaptation pool over time for all paradigms in each SLV corpus. As shown, OAL-CF achieves close to 50% target and 50% non-target samples for a majority of sessions, whereas the other paradigms do not.

Figure 15:
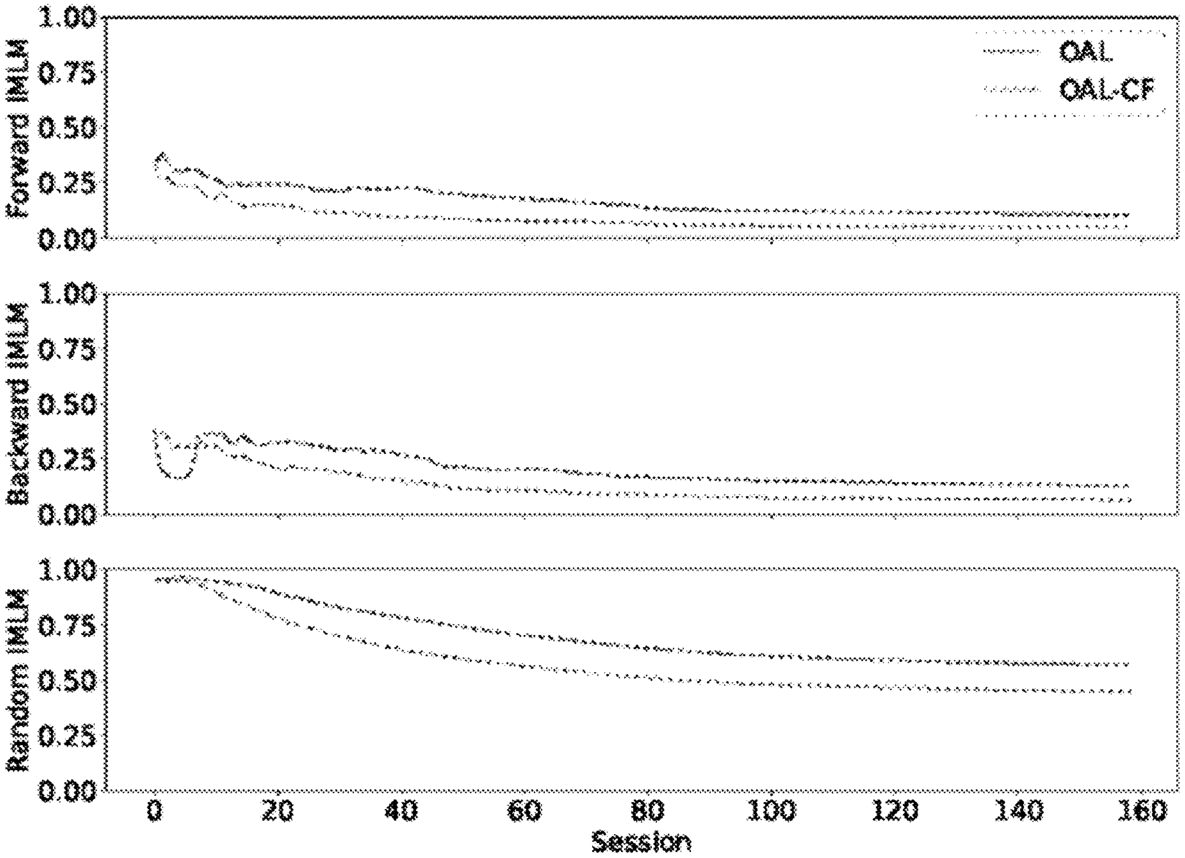
FIG. 15 illustrates postquential IMLM trends for the OAL and OAL-CF paradigms applied to SLV corpora in normal, reverse, and random orders, and further illustrates that normal and reverse orders exhibit similar behaviors while random ordering causes learning to slow down.

Order analysis may be used to evaluate an effect of presentation order on classifier performance. In one implementation, a baseline order is used for experiments, and additional analysis is performed using a reverse order and a uniformly distributed random order. The postquential trends for the different orders may be displayed in FIG. 15. FIG. 15 illustrates postquential IMLM trends for the OAL and OAL-CF paradigms applied to SLV corpora in normal, reverse, and random orders. As shown, the normal and reverse orders exhibit similar behaviors, while random ordering causes learning to slow down significantly.

Comparing the forward and backward plots, order of presentation may have an effect on performance, even when samples from each class are temporally clustered in a similar manner. In one implementation, OAL performs slightly better than OAL-CF at the beginning of the backward plot, and the curves are located higher overall than in the forward plot. Despite this difference, the forward and backward trends may have approximately the same shape, beginning with a higher IMLM, exhibiting fluctuations during early sessions, and then gradually smoothing out.

Comparing the forward and backward trends to the random order trend, a clearer difference may be observed. The random-order plot may begin at and remain at a relatively high level, and may also remain smooth throughout the runs. The comparatively poor performance may be attributed, at least in part, to elimination of an advantage associated with using contextual information in the features. When there is no consistency in which samples are adjacent to one another, contextual information may become less meaningful. The smooth shape of the random-order trend may result from each session containing approximately the same number of target samples, thereby causing error rates and classifier state to change more consistently over time. By contrast, trends for temporally clustered distributions may be more irregular because some sessions contain no target samples while other sessions contain many target samples, such that changes in false positive rate and false negative rate from session to session are less consistent.

Accordingly, this analysis indicates that the OAL and OAL-CF algorithms described herein may be better suited for data streams having more realistic class distributions with temporal clustering, as compared to streams having more uniform class distributions. This analysis also indicates that, for a variety of class distributions, OAL-CF may outperform OAL on average.

Figure 16:
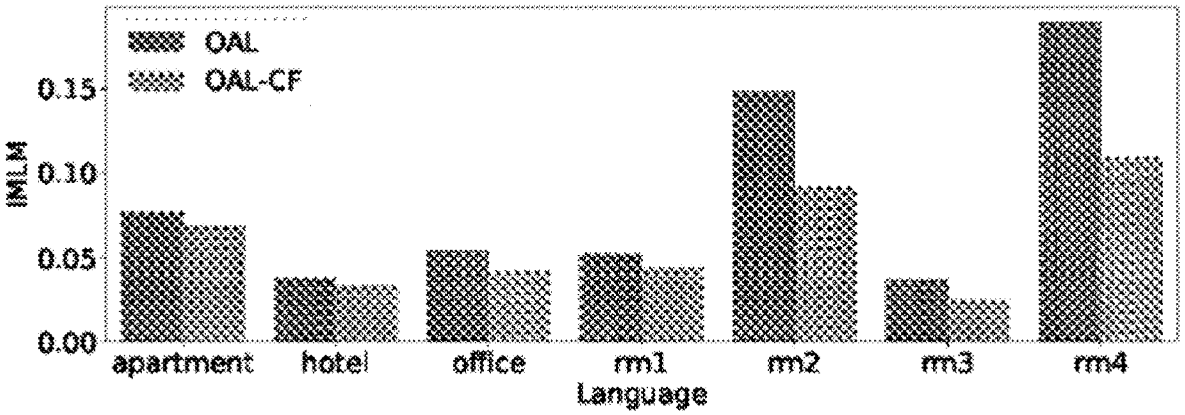
FIG. 16 illustrates a comparison of OAL and OAL-CF for each environment of the VTD corpora, and further illustrates that OAL-CF yields lower IMLM for all VTD environments shown.

In addition to SLV, the three paradigms may also be compared on the VTD task. Results of such trials may be shown in Table VI. In one implementation, OAL-CF results in the best performance, and statistical testing may further indicate that improvement over the other paradigms is significant. These results are important because they indicate that OAL-CF and the default parameter settings described herein generalize well to tasks other than SLV. Comparing the online paradigms for each environment, as illustrated in FIG. 16, further reveals that OAL-CF performs better than OAL in every environment for the VTD task.

TABLE VI

VTD Performance Results for the Three Learning Paradigms. OAL-CF Yields the Best Performance Overall for Every Metric.

| Paradigm | IMLM | DCF | FNR | FPR |
|---|---|---|---|---|
| PML | 15.569 | 0.096 | 0.101 | 0.083 |
| OAL | 0.073 | 0.039 | 0.046 | 0.019 |
| OAL-CF | 0.054 | 0.029 | 0.037 | 0.007 |

Significance testing may be used to evaluate statistical significance of performance differences between experiments. In one implementation, a single-tailed Wilcoxon signed-rank test is performed to compare cumulative IMLM and DCF values of each pair of runs across all languages. Corresponding p-values may be reported based on a hypothesis that a first paradigm yields a significantly lower value than a second paradigm for a selected metric.

Based on such p-values, it may be concluded with greater than 90% confidence that OAL is better than PML, and with greater than 99% confidence that OAL-CF is better than both OAL and PML in terms of both IMLM and DCF for both tasks. One exception may occur in a comparison of OAL and PML considering only the VTD task, which may fall just outside the 90% confidence range. This exception may be attributable to PML outperforming OAL in one of only seven environments.

FIG. 16 illustrates a comparison of OAL and OAL-CF for each environment of the VTD corpora. As shown, OAL-CF yields lower IMLM for all seven VTD environments.

TABLE VII

Significance Tests Comparing the Three Paradigms Across Various Experiments and Evaluation Metrics (the tests indicate that OAL-CF is better than the other paradigms with over 99% confidence).

| Task(s) | Para. 1 | Para. 2 | IMLM p-value | DCF p-value |
|---|---|---|---|---|
| SLV | OAL | PML | $4.4 \times 10^{-5}$ | $7.3 \times 10^{-2}$ |
| | OAL-CF | PML | $4.4 \times 10^{-5}$ | $3.1 \times 10^{-2}$ |
| | OAL-CF | OAL | $1.8 \times 10^{-3}$ | $1.8 \times 10^{-3}$ |
| VTD | OAL | PML | $9.0 \times 10^{-3}$ | $1.2 \times 10^{-1}$ |
| | OAL-CF | PML | $9.0 \times 10^{-3}$ | $2.1 \times 10^{-2}$ |
| | OAL-CF | OAL | $9.0 \times 10^{-3}$ | $9.0 \times 10^{-3}$ |
| SLV+VTD | OAL | PML | $2.8 \times 10^{-6}$ | $1.9 \times 10^{-2}$ |
| | OAL-CF | PML | $2.8 \times 10^{-6}$ | $2.1 \times 10^{-3}$ |
| | OAL-CF | OAL | $1.6 \times 10^{-4}$ | $1.9 \times 10^{-4}$ |

Furthermore, post-CF results may be compared to OAL-CF results in a similar manner. For both IMLM and DCF, the Wilcoxon test may indicate that post-CF scores are significantly better, with a p-value of $2.2\times10^{-4}$. Accordingly, it may be concluded with near certainty that applying information obtained from CF to the current session yields an improvement as compared to configurations in which CF is not applied to the current session.

Figure 17A:
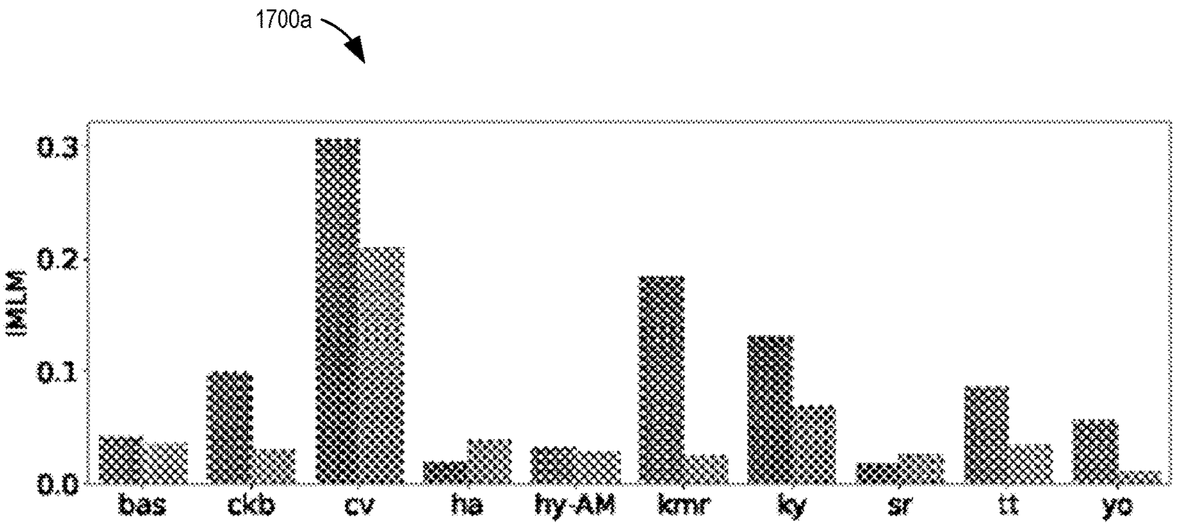
FIGS. 17A and 17B illustrate a comparison of OAL and OAL-CF for each target language in the SLV corpora, and further illustrates that OAL-CF yields lower IMLM for seventeen of twenty languages.
Figure 17B:
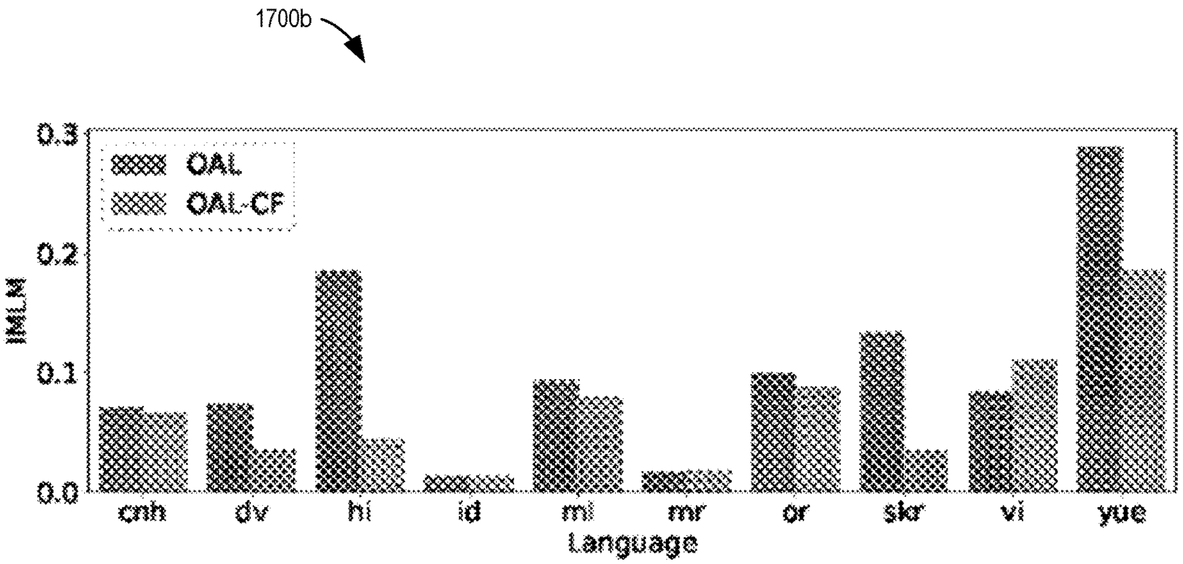

FIGS. 17A and 17B illustrate a comparison of OAL and OAL-CF for each target language in the SLV corpora. OAL-CF yields lower IMLM for seventeen (17) of the twenty (20) languages. Although OAL-CF may achieve statistically superior performance compared to OAL and PML in many implementations, the paradigm may nevertheless have certain limitations.

First, at a more granular level, FIGS. 17A and 17B illustrate that OAL-CF achieves the best score for most, but not all, individual languages in the SLV corpora as compared to OAL. In one implementation, PML results may be omitted from this figure because those results are sufficiently large that they would dwarf the online results. More specifically, OAL may outperform OAL-CF slightly for Hausa and Serbian, and more substantially for Vietnamese. The reason for this behavior may be unknown, but such behavior indicates that annotations obtained via CF do not always result in improved performance. Accordingly, more efficient use of CF samples may provide an additional area for refinement.

Second, OAL-CF may continue to exhibit information saturation when selecting active learning queries, as may occur in many active learning query selection strategies. In such circumstances, the query selection strategy may become progressively more random over time and the information obtained from the queries may diminish. This may be particularly significant for OAL-CF because the paradigm may depend on the active learning channel to identify potential anomalies in the data stream so that the classifier can adapt quickly.

Figure 10:
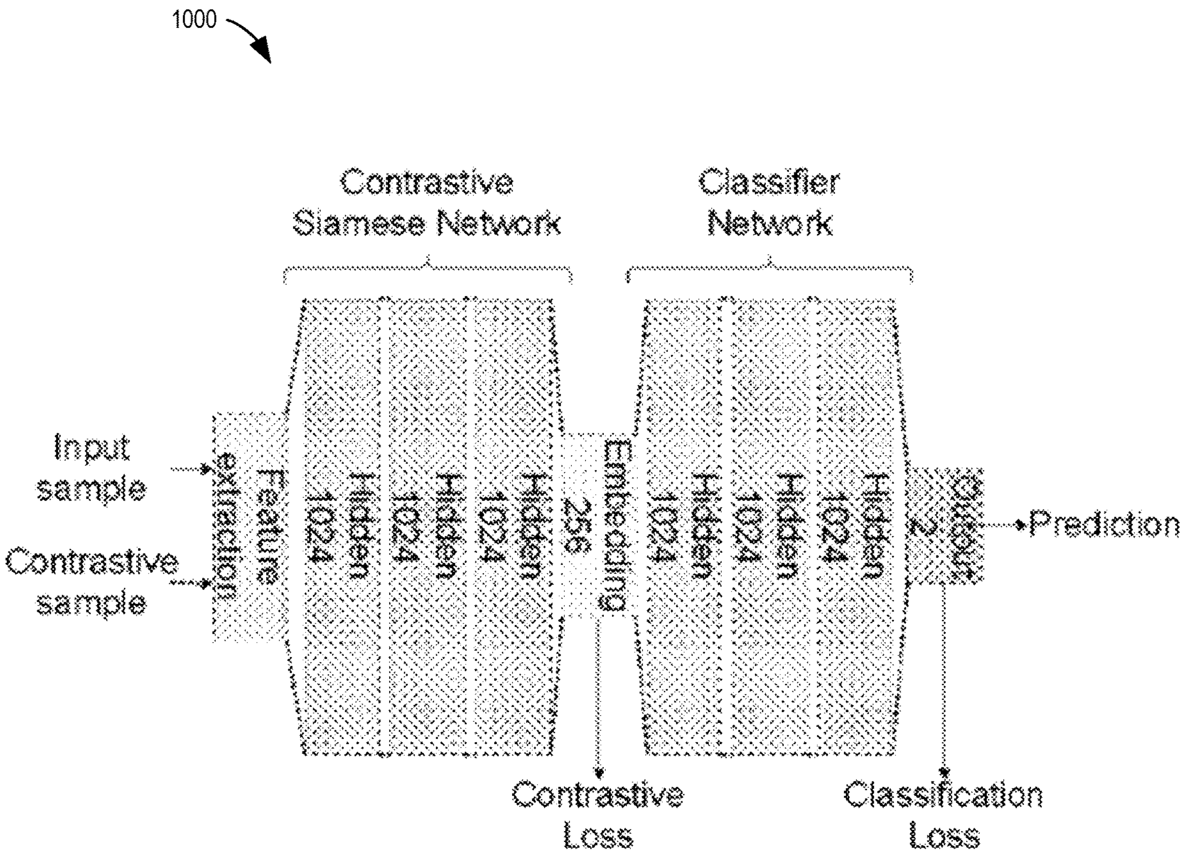
FIG. 10 illustrates the contrastive classifier architecture used for the experiments.

Third, although the addition of CF may allow an initial model to converge faster than OAL alone, the classifier may remain relatively weak during early sessions, as illustrated for example in FIGS. 7, 8, and 10.

Finally, in one implementation, only one round of CF acquisition may be permitted per session in the OAL-CF paradigm. Alternatively, CF acquisition could be performed iteratively within each session to help ensure that the classifier is as accurate as possible and that target samples are less likely to be missed. Limiting CF to a single iteration per session may reduce effort required of the expert per session, but may also limit flexibility needed for maximum efficiency. In implementations in which post-CF scores demonstrate improved performance, such behavior may indicate that iterative CF within a session can provide further benefits.

In this disclosure, a new online machine learning paradigm referred to as Online Active Learning with Corrective Feedback (OAL-CF) is introduced. This paradigm is an extension of the Online Active Learning (OAL) paradigm in which Corrective Feedback (CF) from a domain expert controlling the operation is used as an additional information channel together with Active Learning (AL) queries. In one implementation, a goal of the OAL-CF paradigm is to provide an efficient method by which the domain expert can perform an assigned task while simultaneously training a classifier to aid in that task.

Experimental results indicate that the OAL-CF paradigm provides an efficient method of operation when applied to streaming tasks including Spoken Language Verification and Voice-Type Discrimination. Performance of this paradigm may be evaluated and compared to conventional Passive Machine Learning (PML) and OAL paradigms using metrics that account for both classification error rate and required annotation effort. In one implementation, such evaluations show that OAL-CF results in a 53% decrease in cost as compared to OAL.

Additional analysis indicates that OAL-CF yields superior performance in nearly every individual trial and at multiple stages of the training process. OAL-CF may also be advantageous across varying orders of presentation of the data stream, active learning budgets, and tasks. In addition, OAL-CF may maintain a relatively even balance between classes in the pool of annotated data.

Future implementations building on this disclosure may include improvements to particular components of the pipeline, such as active learning query selection, corrective feedback sample usage, and adaptation methods. Such improvements may be directed to providing greater assurance that addition of CF causes OAL-CF to outperform OAL across a broader range of conditions. The OAL-CF paradigm may also be extended by allowing repeated iterations of annotation and adaptation within a session of data. Such improvements and extensions may further reduce error rate and improve detection of target samples.

OAL and OAL-CF are HITL ML paradigms that are designed to learn to detect events of interest in streaming media. These paradigms have been shown to be both more accurate and less labor-intensive for processing data streams compared to PML paradigms, specifically for tasks involving streaming audio.

These two paradigms are particularly effective at detecting rare events of interest in unique operating environments for two primary reasons. First, they learn directly from the operating environment, avoiding the assumption that the distribution of an outside dataset will match the distribution of the data being evaluated. Second, they are guided by feedback from a human domain expert.

In the case of OAL, the feedback channel takes the form of the expert providing labels for a few AL queries selected by the machine from the current batch. These labels can be used to update the classifier and improve performance on the rest of the current batch. The basic process for the OAL algorithm begins by initializing the classifier with a small number of bootstrap examples representing both target and non-target data. Then, the algorithm begins the adaptation cycle. In some embodiments, this is where the machine loads a batch of data from the stream, poses AL queries to the expert, updates its classification model based on the expert's responses, classifies the remaining unlabeled samples in the batch, and then moves on to the next batch in the stream.

Figure 18:
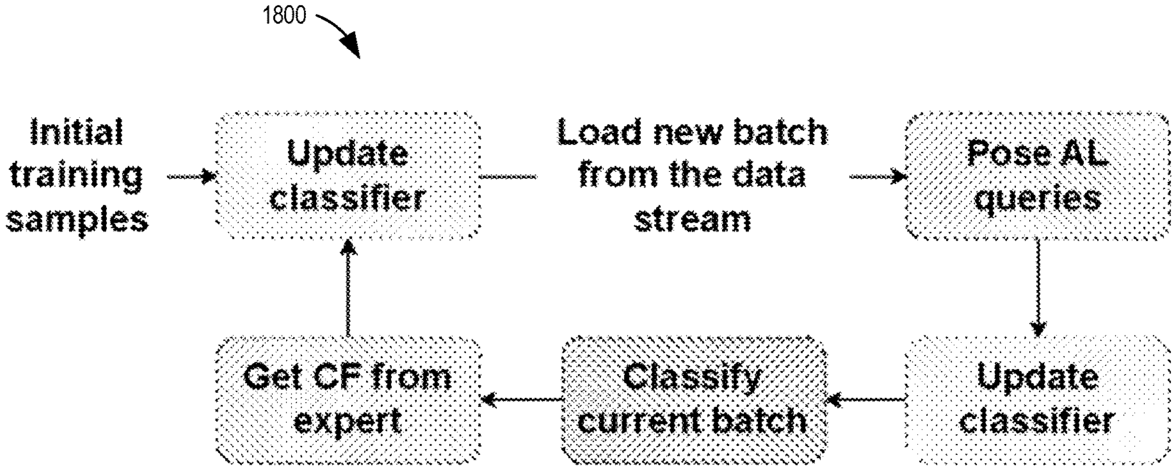
FIG. 18 illustrates the OAL-CF paradigm pipeline for classifying and learning from data streams.

In addition to the AL channel, OAL-CF also allows the expert to provide CF for any errors observed in the classifier's predictions. As shown in FIG. 18, the OAL-CF paradigm pipeline for classifying and learning from data streams includes the same steps as OAL, including posing queries, updating the model, and making predictions, plus the added steps of receiving CF from the expert and updating the model again before moving to the next batch. For each batch of data, the system poses one set of AL queries and receives one round of CF before loading the next batch. In some embodiments, it is assumed that the expert expects useful information to come only from samples predicted by the classifier to contain the target, and so only these positive predictions, composed of true positives and false positives, receive labels in the CF process.

For both OAL and OAL-CF, the goal of the algorithm is to achieve joint minimization of the error rate and annotation effort required of the expert. In some embodiments, this joint minimization is measured by an IMLM, which is used to evaluate these tasks.

In the original definition of these two paradigms, feedback from the AL and CF channels only happens one time for every batch of data. Furthermore, the CF samples obtained in the OAL-CF pipeline are only applied to batches later in the stream since the model only makes predictions once per batch. These restrictions are in place to prevent the annotation cost from growing too large.

In some embodiments, these restrictions are removed and an OAL-IF ML paradigm is introduced, where multiple rounds of feedback and model updates can be applied iteratively to the same batch of data. IF gives the OAL-IF algorithm the opportunity to discover and correct FN errors, including missed detections of the target, which are assumed to carry a high relative cost to the detection operation when the target is rare.

A potential disadvantage of IF is the possibility of incurring significantly more FP errors or raising the annotation cost in the process of recovering FNs. As such, determining how many times the algorithm should iterate and budgeting the appropriate amount of AL queries are key factors in successfully implementing OAL-IF. Other approaches have focused on AL budget allocation for the OAL paradigm, including budgets based on concept drift, or changes in the underlying data distribution over time. Such methods allow more queries to be made in batches where drift is detected, while fewer queries are made in stationary batches. In some embodiments, the present disclosure introduces stopping criteria and AL budgeting methods specific to the OAL-IF paradigm.

In some embodiments, the OAL-IF paradigm is applied to the SLV task and compared to OAL and OAL-CF. While these OAL-based paradigms can be applied to any data stream, in some embodiments the data stream contains target classes of extremely low prevalence. This can be desirable because many real-world operations perform detection on highly imbalanced data streams, low target prevalence makes the task challenging and allows for analysis of algorithmic performance in these extreme cases, and data streams with extreme class imbalance are rarely investigated in the machine learning literature.

Just as in the OAL-CF paradigm, OAL-IF training begins by initializing the classifier with a small, class-balanced bootstrap corpus, including equal parts from the target class and the non-target class. The system then processes a batch of samples from the data stream by posing AL queries, updating the classifier, making predictions, receiving CF from the expert, and updating again.

Figure 19:
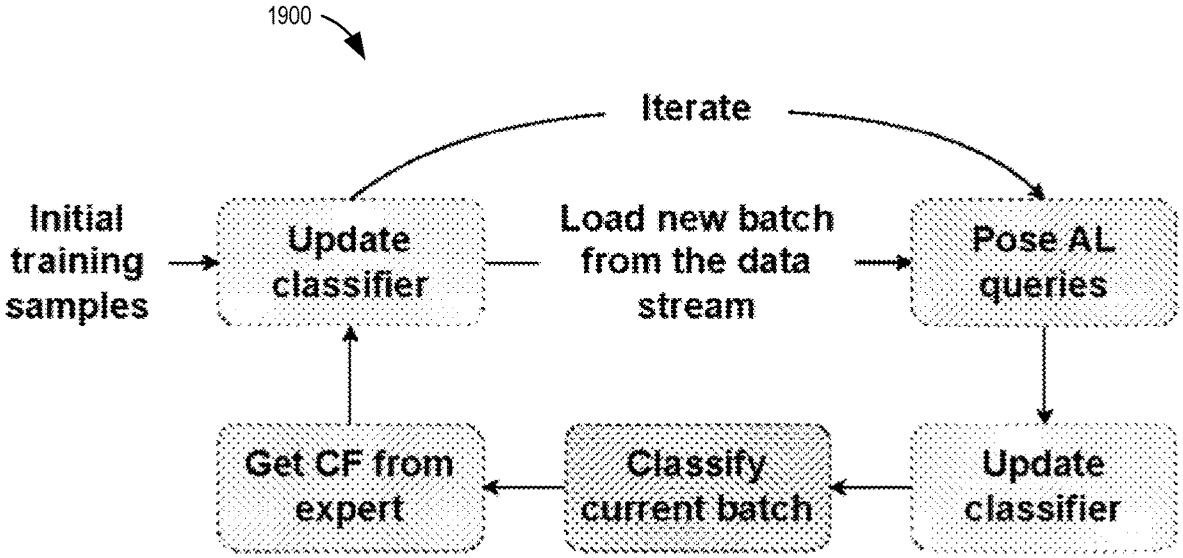
FIG. 19 illustrates the OAL-IF paradigm pipeline where iteration within the feedback loop is allowed before moving to the next batch.

OAL-IF differs from OAL-CF in that, rather than immediately moving on to the next batch, as would be done in the OAL-CF system, the OAL-IF system has the opportunity to repeat the query, prediction, feedback, and model update steps until some stopping criterion is reached. This within-batch iterating procedure is illustrated in FIG. 19.

The purpose of repeating these steps is to ensure that target samples are not missed. FNs may be much more detrimental to the operation of validation and detection tasks than FPs because the targets are so rare. Hence, giving the system extra chances to eliminate FN errors via IF can be worthwhile, as long as the total cost of extra annotation and additional FP errors is less than OAL-CF. The trade-off between decreased FNs and increased FPs plus increased annotation cost can be measured using an IMLM and optimized by adjusting the configuration of the system.

In some embodiments, the choice of the criterion for stopping the iteration cycle is a factor for optimizing the trade-off between annotation cost and error rate. In one embodiment, a Fixed Iterations (FI) criterion is used in which the system stops after iterating a specified number of times. In another embodiment, a No True Positives Detected (NTPD) criterion is used in which the system stops when no more true positive predictions are confirmed by CF. In some implementations, the FI criterion allows for controlled experimentation. In some implementations, the NTPD criterion is based on the hypothesis that CF does not significantly improve results once it has discovered all the target samples.

In some embodiments, one component of the OAL-CF algorithm that is adjusted with the addition of IF is the active query budget, which defines how many AL queries can be made per batch. AL is repeated along with CF in the IF loop and serves as a method for identifying concept drift that might go undetected by CF. In baseline OAL and OAL-CF algorithms, AL is restricted to a fixed number of queries per batch. However, in the OAL-IF paradigm, AL can quickly become costly if the number of queries per batch experiences a significant increase with additional iterations. For example, if the same number of AL queries are allowed per iteration and there are two iterations per batch, the annotation cost of AL doubles.

As such, in some embodiments, two methods are used to reduce the active query budget while retaining reasonable error rates. In one embodiment, iterative CF only is employed. One way to restrict the AL budget in the IF setting is to allow only one iteration of AL queries per batch but allow multiple iterations of CF. In this way, the AL budget is guaranteed to be the same as the baseline OAL-CF configuration while the CF restrictions are loosened. In addition to restricting the AL budget, this method is also useful for direct analytical comparison to the baseline.

In another embodiment, non-target active queries are limited. Another budgeting approach is to limit the number of queries collected when the classifier predicts that a batch contains no target samples. Thus, before the AL queries are made, the model makes predictions for each sample in the batch. If none of these predictions are target predictions, then fewer AL queries are posed to the expert than would be posed otherwise. In some embodiments, the assumption that motivates this approach is that target labels are more valuable on average than non-target labels because of the relative importance and scarcity of the target class. In one implementation, rather than limiting the number of queries for putative non-target batches to zero, the limit is set to a reduced non-zero number as a precautionary measure because completely eliminating AL queries in putative non-target batches can allow too many target samples to go undetected.

In some embodiments, experimental configurations are used to compare OAL-IF with the baseline one-iteration versions of OAL and OAL-CF. In some implementations, the configurations of OAL-IF include combinations of stopping criteria, including Fixed Iterations (FI) and No True Positives Detected (NTPD), and budget-limiting methods, including no limit, corrective-feedback-only budgeting, and non-target limiting budgeting. In some embodiments, the system is evaluated using a task, data, classifier, and evaluation methodology corresponding to the examples set forth herein.

In some embodiments, the task is a Spoken Language Verification (SLV) task in which a determination is made whether an audio recording contains a given target language.

This differs from a Language Identification (LID) task, which predicts which language from a list of languages is being spoken in an audio recording. This also differs from language detection, which involves detecting a target language in a data stream when there is potential overlap with other languages. In some implementations, the data for the SLV task come from the Common Voice corpus. The corpus contains short recordings of speech audio, and each recording is a single utterance from one speaker in only one language. Thus, no samples contain overlapping speech or multiple language classes. Language labels may be extracted from metadata provided with the corpus.

In some embodiments, four subcorpora are formed using languages from four geographic regions, including the African continent, the Caucasus region, South Asia, and Southeast Asia. In some implementations, these regions are selected for linguistic diversity and so that similar, confusable languages appear alongside each other to make the verification problem more representative of real localized collection operations. In some implementations, the data used for evaluation come from the validation and test splits of these languages, thereby increasing the size of the evaluation data relative to use of the test split alone. The subcorpus durations and languages are shown in TABLE VIII below.

TABLE VIII

Languages and Durations for the Four Common Voice Subcorpora (target languages are bolded).

| Region<br>Duration | Africa<br>136 hours | Caucasus<br>284 hours | SE Asia<br>226 hours | S Asia<br>169 hours |
|---|---|---|---|---|
| Language | **Afrikaans** | Abkhaz | Bengali | **Assamese** |
| | **Amharic** | **Armenian** | Arabic | Bengali |
| | **Basaa** | Azerbaijani | **Cantonese** | **Hakha Chin** |
| | **Dioula** | Bashkir | Mandarin | **Dhivehi** |
| | **Hausa** | Belarusian | English | English |
| | Igbo | **Central Kurdish** | French | Persian |
| | Kabyle | **Chuvash** | **Indonesian** | **Hindi** |
| | Kinyarwanda | **Erzya** | Lao | **Malayalam** |
| | Luganda | Georgian | Portuguese | **Marathi** |
| | Swahili | **Kazakh** | Tamil | **Nepali** |
| | **Tamazight** | **Kurmanji** | Thai | **Odia** |
| | **Tigre** | **Kurdish** | **Vietnamese** | **Punjabi** |
| | Tigrinya | **Kyrgyz** | | **Pashto** |
| | Twi | **Moksha** | | **Santali** |
| | **Yoruba** | Ossetian Russian | | **Saraiki** |
| | | **Serbian** | | Tamil |
| | | **Tatar** | | **Telugu** |
| | | Turkish | | **Turkmen** |
| | | Turkmen | | Urdu |
| | | Ukrainian | | Uzbek |
| | | Uzbek | | |

In some embodiments, low-prevalence languages in each subcorpus are selected as validation targets, where each chosen language is present in less than a threshold percentage of samples. These low-prevalence languages may be selected to make the task more difficult and to simulate detection of extremely scarce targets in real-world operations. The resulting target languages, abbreviations, source corpora, and overall prevalence are shown in TABLE IX below. Since the Common Voice corpus was collected asynchronously, there is no chronological order to the data. Accordingly, in some embodiments, the order in which the samples are presented is assigned according to a Dirichlet distribution. In some implementations, one random Dirichlet ordering is generated per subcorpus and these orderings are used consistently across experiments.

TABLE IX

Prevalence of All Target Languages in the SLV Corpora.

| Language | Abbr. | Corpus | % of data stream |
|---|---|---|---|
| Afrikaans | of | Africa | 0.11% |
| Amharic | am | | 0.42% |
| Basaa | bas | | 0.92% |
| Dioula | dyu | | 0.10% |
| Tamazight | zgh | | 0.15% |
| Tigre | tig | | 0.25% |
| Yoruba | yo | | 1.71% |
| Armenian | by-AM | Caucasus | 3.74% |
| Central Kurdish | ckb | | 4.63% |
| Chuvash | cv | | 1.12% |
| Erzya | myv | | 0.32% |
| Kazakh | kk | | 0.45% |
| Kurmanji Kurdish | kmr | | 3.43% |
| Kyrgyz | ky | | 1.42% |
| Moksha | mdf | | 0.07% |
| Serbian | sr | | 1.58% |
| Tatar | tt | | 3.81% |
| Cantonese | yue | SE Asia | 2.89% |
| Indonesian | id | | 3.78% |
| Vietnamese | vi | | 1.06% |
| Assamese | as | S Asia | 0.79% |
| Hakha Chin | cnh | | 1.13% |
| Dhivehi | dv | | 3.27% |
| Hindi | hi | | 4.13% |
| Malayam | ml | | 1.09% |
| Marathi | mr | | 2.61% |
| Nepali | ne-NP | | 0.31% |
| Punjabi | pa-IN | | 0.57% |
| Pashto | ps | | 0.15% |
| Santali | sat | | 0.11% |
| Saraiki | skr | | 1.58% |
| Telugu | to | | 0.07% |
| Turkmen | tk | | 0.40% |

Figure 20:
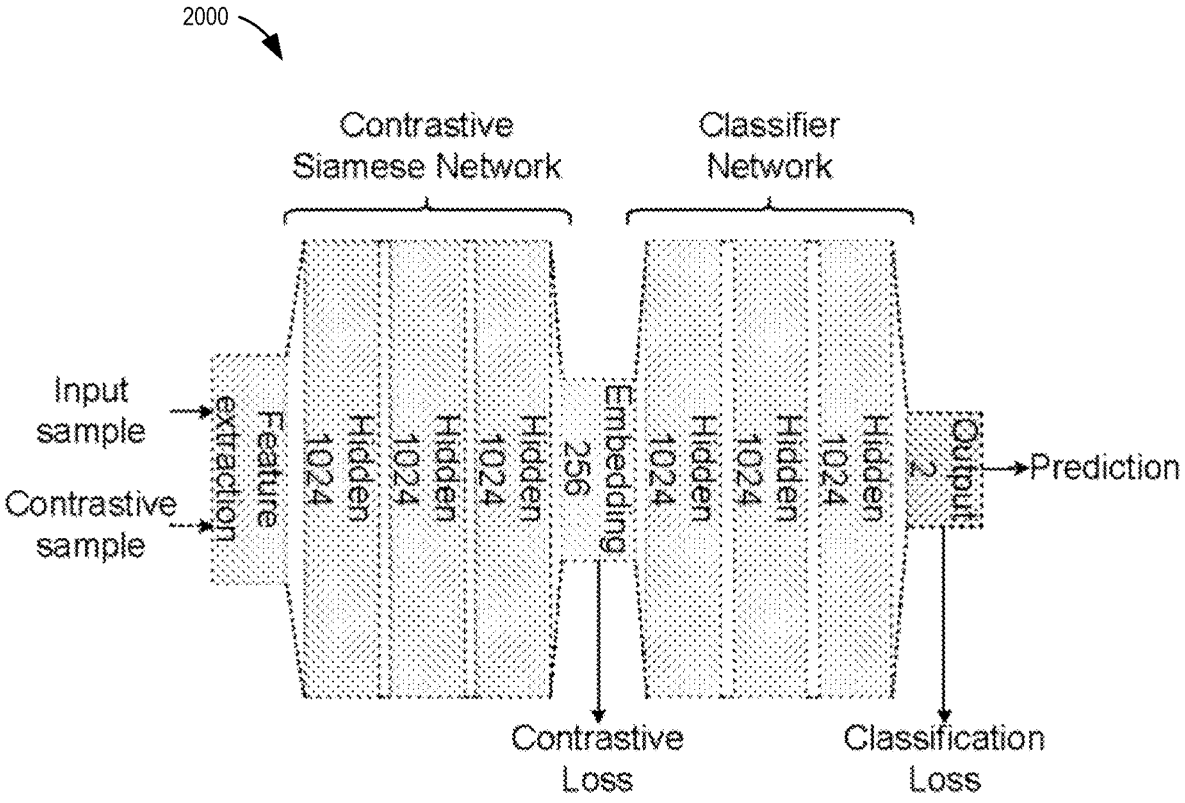
FIG. 20 illustrates another view of the contrastive classifier architecture used for the experiments.

In some embodiments, the classification model is a contrastive classifier neural network, as shown in FIG. 20, and includes a feature extractor together with two feed-forward networks, namely a contrastive Siamese network and a classifier network. FIG. 20 illustrates the contrastive classifier architecture used for the experiments. The classifier consists of a pre-trained feature extractor and two feed-forward networks for contrastive modeling and classification. In some implementations, the feature extractor is a pre-trained ECAPA-TDNN numerical-representation model trained on the LID task. The parameters of this model may be frozen such that the feature extractor is not optimized during training. Each feature may represent one sample, such as one audio recording from the Common Voice corpus, with no overlap from other samples. In some implementations, each audio recording is compressed into a 256-dimensional single-vector numerical representation. The input to the feed-forward networks may be formed by concatenating the numerical representation from the sample being classified with the numerical representations from the three samples immediately preceding and the three samples immediately following the sample to be classified. This concatenated feature provides context and may improve performance.

In some embodiments, the contrastive network separates the classes using a contrastive loss and compresses the features into a smaller numerical-representation space. In some embodiments, the classifier network optimizes a class-weighted cross-entropy loss, where class weights are inversely proportional to class prevalence. This may be referred to as Inverse Class Frequency (ICF) weighting. In some implementations, the ICF weighting is updated every time the adaptation pool is updated. In some embodiments, the contrastive loss and cross-entropy loss are combined with a weighting factor to define a total loss function.

In some embodiments, learning parameter settings are shared across experiments for comparability. Representative shared parameters are shown in TABLE X below and include optimizer, learning rate, weight decay, training batch size, early stopping patience, early stopping margin, bootstrap corpus size, and stream batch size. In some implementations, uncertainty sampling based on the output of a Softmax layer of the classifier is employed as the AL query selection strategy for all experiments. In some embodiments, model updates are made by fine-tuning the network.

TABLE X

The Shared Learning Parameters for All Experiments

| Parameter(s) | Value/Setting |
|---|---|
| Optimizer | Adam |
| Learning rate | $10^{-4}$ |
| Weight decay | $10^{-5}$ |
| Training batch size | 256 |
| Early stopping patience | 5 epochs |
| Early stopping margin | 1e−3 |
| Bootstrap corpus size | 8 samples |
| Stream batch size | 800 samples |

In some embodiments, an IMLM is used as a primary evaluation metric. IMLM represents the relative reduction in total cost that an algorithm achieves compared to manual inspection of every sample in the data stream. In some implementations, total cost is measured in time, where errors, including false negatives and false positives, and annotations each cost the expert some amount of time. This time cost is then divided by the total cost of manual inspection to form a ratio. In some embodiments, the IMLM formula includes a number of bootstrap corpus samples, a number of AL queries, a number of false positives, a number of false negatives, and a number of target samples in the data stream. In some implementations, results less than one indicate a decrease in time cost when using the algorithm, while results greater than one indicate increased time cost.

In some embodiments, a DCF is used as a secondary evaluation metric. In some implementations, DCF is a linear combination of false positive and false negative error rates, and a weighting factor is selected such that false negatives are weighted more heavily than false positives. This weighting may be intentional because false negatives are more detrimental to the operation than false positives. In some embodiments, a modified form of postquential analysis is used to track evaluation metrics over time. In this case, postquential analysis means that system performance is measured by cumulative errors and annotations accrued after the last iteration of each batch. In some implementations, the false positive and annotation counts include all false positives and AL queries accrued at the end of each iteration, while the false negative count includes all remaining undetected target samples at the end of the last iteration. In some embodiments, system performance is also tracked before and after the AL update of every iteration in each batch to identify how much impact each iteration has on overall performance.

In some embodiments, cumulative experimental results across languages and subcorpora show an advantage of using OAL-IF over either of the baselines. Representative cumulative results are shown in TABLE XI below. In some implementations, only the worst IMLM score from OAL-IF is equal to that of OAL-CF, while all other OAL-IF scores are lower, and the DCF scores are also lower than the baselines. In some embodiments, a best configuration in terms of IMLM is OAL-IF with AL budget limiting for putative non-target batches and three iterations per batch. In some implementations, the NTPD stopping criterion does not reduce IMLM as successfully as FI methods because of elevated false negative count. In some embodiments, the best system in terms of DCF is OAL-IF with no AL budget limit and four iterations per batch, indicating that lower DCF may be achieved at the cost of extra annotations.

TABLE XI

Cumulative Results for The Baselines and All Configurations of OAL-IF (FI-N refers to runs with N fixed iterations, NTPD stops after CF discovers no new target samples, and CFO and NTL are the two Al budgeting methods)

| Paradigm | AL limit | Stop Crit. | IMLM | DCF |
|---|---|---|---|---|
| OAL | 8 | FI-1 | 0.093 | 0.058 |
| OAL-CF | 8 | FI-1 | 0.044 | 0.023 |
| OAL-IF | No limit | FI-2 | 0.035 | 0.011 |
| | | FI-3 | 0.041 | 0.009 |
| | | FI-4 | 0.044 | 0.007 |
| | | NTPD | 0.030 | 0.013 |
| | CFO | FI-2 | 0.031 | 0.013 |
| | | FI-3 | 0.030 | 0.012 |
| | | FI-4 | 0.028 | 0.011 |
| | | NTPD | 0.029 | 0.012 |
| | NTL | FI-2 | 0.024 | 0.011 |
| | | FI-3 | 0.023 | 0.008 |
| | | NTPD | 0.031 | 0.017 |

In some embodiments, when comparing best scores for each paradigm, progressing from OAL to OAL-CF results in an approximately fifty percent reduction of both IMLM and DCF, and progressing from OAL-CF to a best OAL-IF configuration results in another reduction of approximately fifty percent. In some implementations, a Wilcoxon signed-rank test is performed across scores of individual languages to determine whether the improvement from OAL-CF to OAL-IF is statistically significant. In some embodiments, the resulting p-values indicate that OAL-IF is better than OAL-CF with high confidence.

Figure 21:
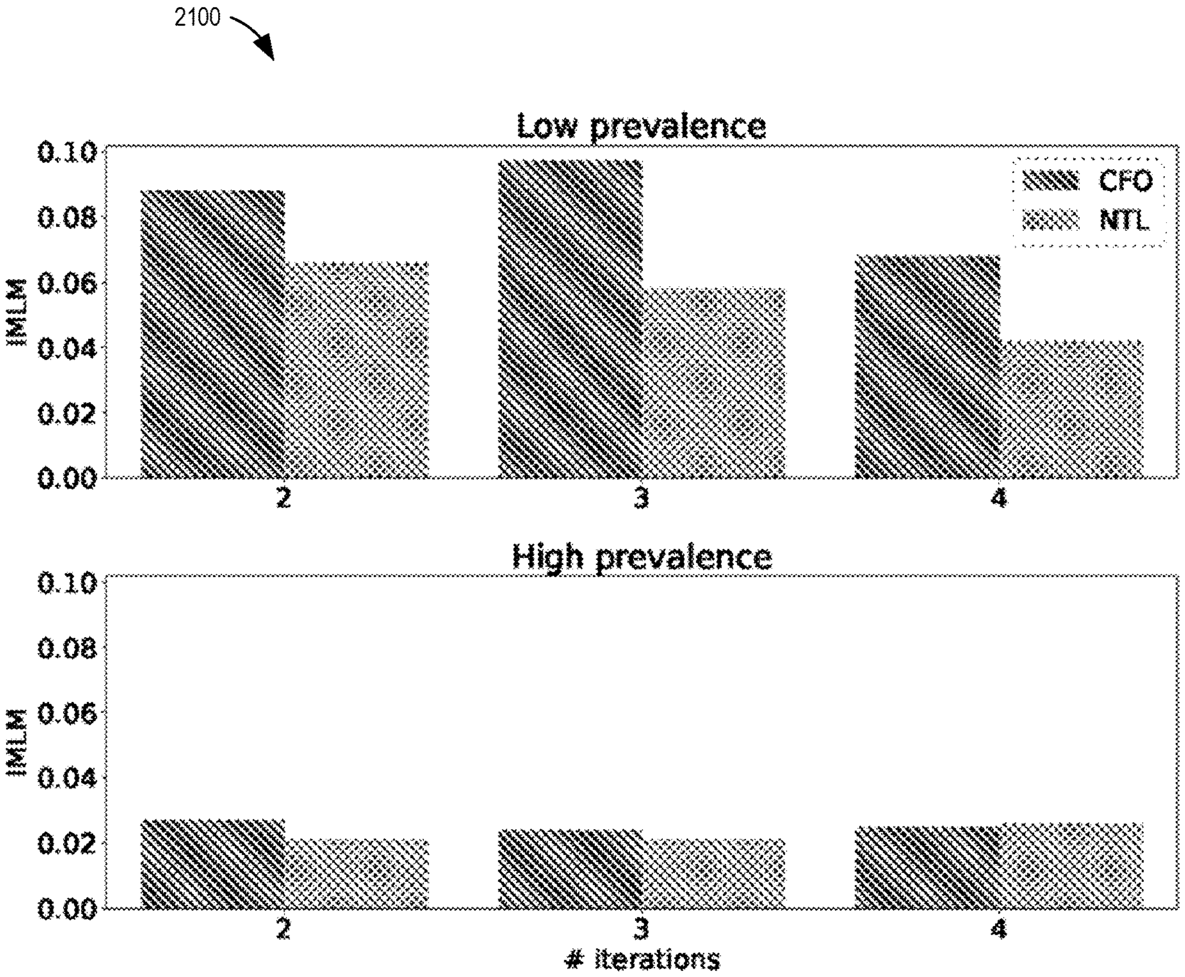
FIG. 21 illustrates IMLM scores split into the low prevalence (<1% target) and higher prevalence (>1%, <5% target) for varying numbers of iterations.

In some embodiments, prevalence-based analysis is also performed. For example, by observing the difference in IMLM scores between lowest-prevalence languages and higher-prevalence languages, it can be seen that lower-prevalence languages are more difficult to detect effectively. In some implementations, one reason is that an extremely rare target can make it difficult to provide enough examples for the classifier to learn the target distribution. In some embodiments, the optimal number of iterations differs for low-prevalence and high-prevalence languages, thereby highlighting a need for a flexible AL budget that adapts automatically to an estimate of target prevalence. FIG. 21 illustrates IMLM scores split into the low prevalence (<1% target) and higher prevalence (>1%, <5% target) for varying numbers of iterations.

Figure 22:
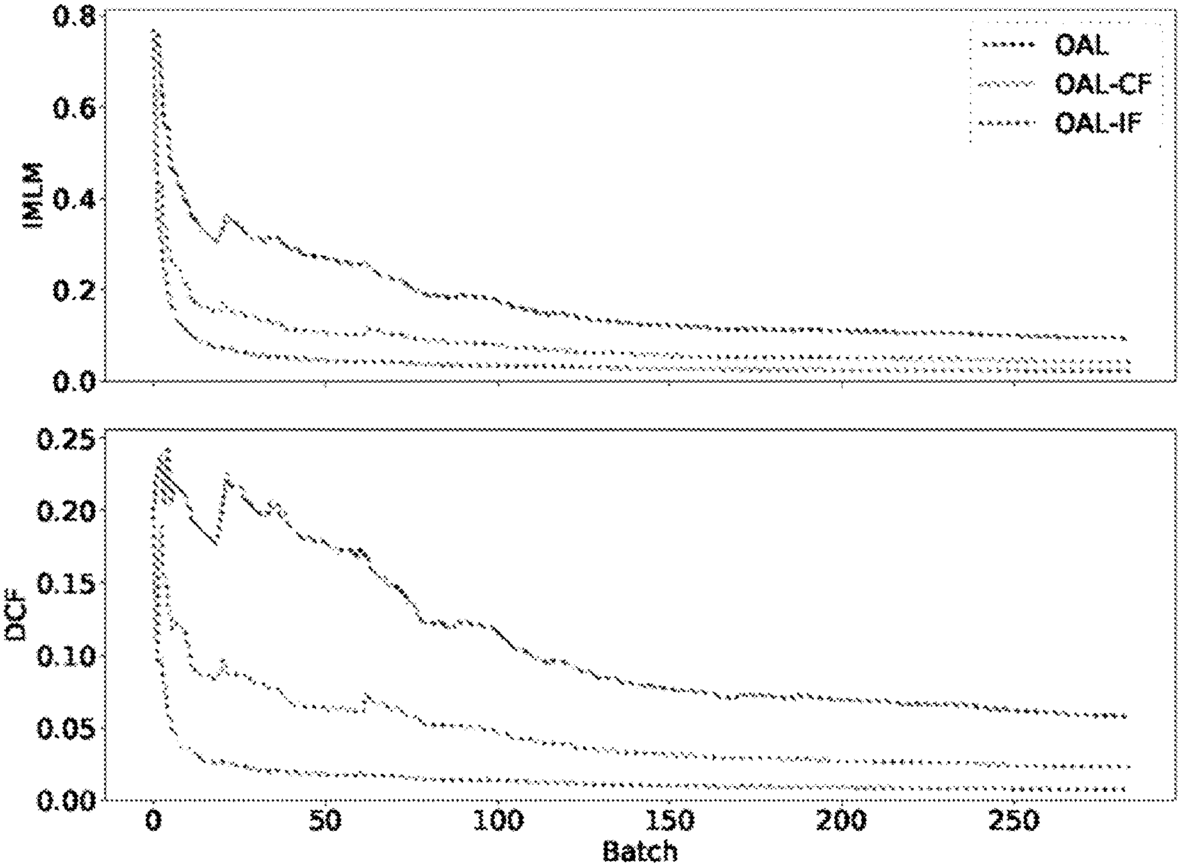
FIG. 22 illustrates the postquential trends of the OAL, OAL-CF, and OAL-IF paradigms for IMLM and DCF.
Figure 23:
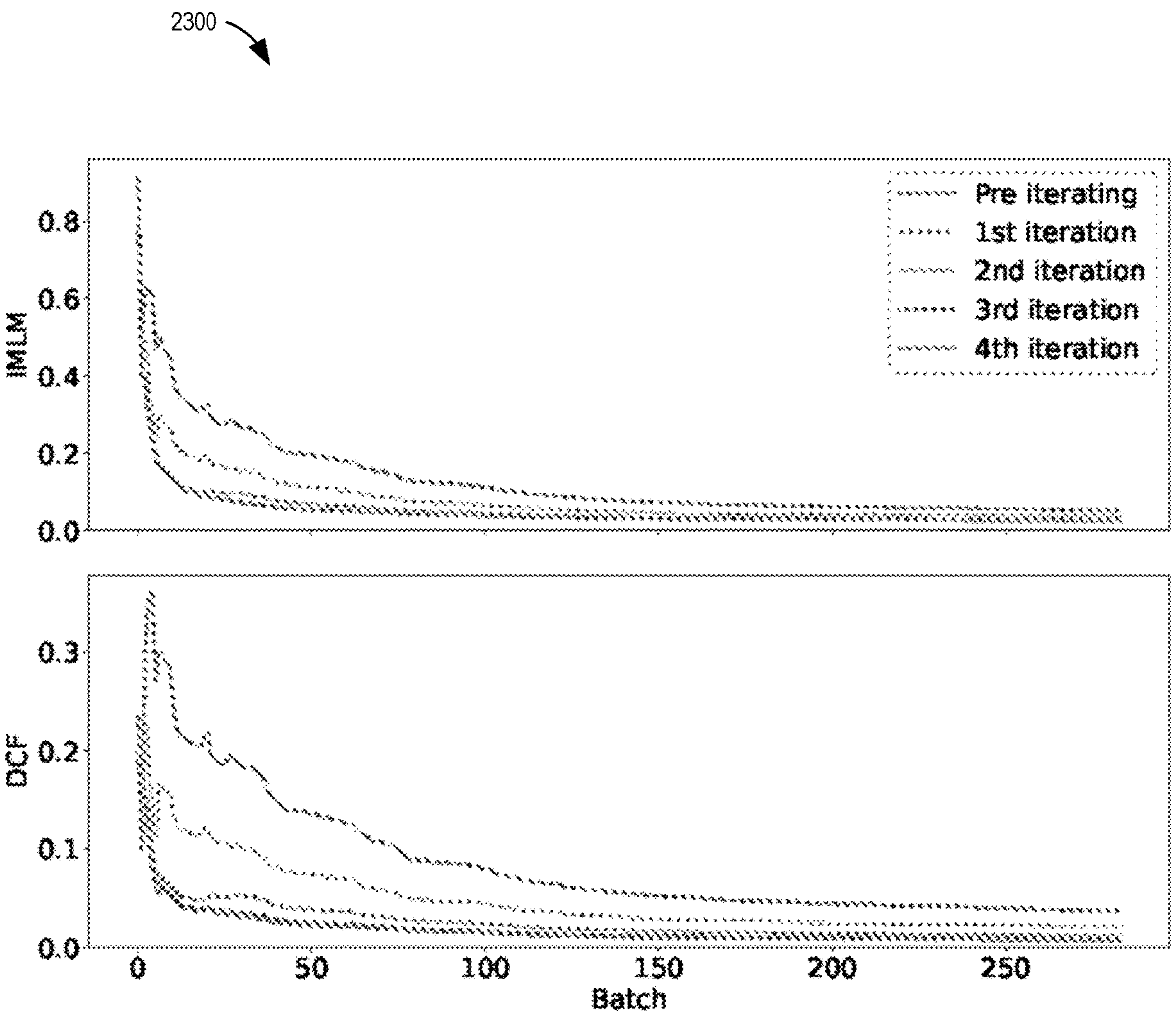
FIG. 23 illustrates the trends for IMLM and DCF before IF and after each iteration in the OAL-IF paradigm.

In some embodiments, trend analysis is used to evaluate the effect of IF over time. FIG. 22 illustrates the postquential trends of the OAL, OAL-CF, and OAL-IF paradigms for IMLM and DCF. FIG. 23 illustrates the trends for IMLM and DCF before IF and after each iteration in the OAL-IF paradigm. Improvements shrink as the iterations increase. The OAL-IF curves are always lower and smoother than the baseline curves. In some implementations, the OAL-IF curves are lower than the baseline curves for both IMLM and DCF. The early decrease of the OAL-IF curve indicates that IF helps the classifier learn the task faster. The relative smoothness of the curve indicates that IF yields more stable learning that is less affected by new information or concept drift in the data stream. In some embodiments, trends before iterating and after each iteration in a multi-iteration OAL-IF configuration show a large gap between a pre-iteration curve and a first-iteration curve, followed by progressively smaller improvements after each additional iteration. This may indicate that a larger number of iterations converges toward a best possible error rate for the system and that additional iterations recover more errors in early batches while making learning more stable.

In some embodiments, OAL-IF is therefore an extension of OAL-CF that allows multiple iterations of active queries and corrective feedback for each batch of samples from the data stream, together with active-query-budget controls that keep annotation cost relatively low. In some implementations, such configurations make a worthwhile tradeoff between additional annotations and reduced false negative errors, and may perform well when targets are extremely scarce, while also making learning faster and more stable.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A computer-implemented method for training a detection model to detect a target event using human-in-the-loop (HITL) verification, the method comprising:

by a network node device having processing circuitry operatively coupled to memory and network interface circuitry configured to communicate over a network, the network node device being configured to communicate via the network interface circuitry over the network with a client network node device and at least one HITL reviewer network node device configured to perform an HITL review process, initializing trainable parameters of a detection model based on a set of verified samples that includes a representation of the target event;

receiving, via the network interface circuitry, from the client network node device over the network, a first indication including a set of unverified samples; and iteratively performing, for each of a plurality of iterations for the set of unverified samples until a stopping criterion is satisfied:

ordering, based on an informativeness criterion associated with the target event, the set of unverified samples to obtain an ordered set of unverified samples;

selecting, based on an adaptive query budget and the ordered set of unverified samples, a query subset of unverified samples for HITL review;

sending, via the network interface circuitry, to the HITL reviewer network node device over the network, a second indication including a first HITL request having the query subset for HITL review;

receiving, via the network interface circuitry, from the HITL reviewer network node device over the network, a third indication including a first HITL response having HITL verification responses for the query subset;

updating the trainable parameters of the detection model based on the HITL verification responses for the query subset;

applying the updated detection model to remaining unverified samples other than the query subset to obtain prediction results;

identifying, from the prediction results, a positive predicted subset predicted to include the target event;

sending, via the network interface circuitry, to the HITL reviewer network node device over the network, a fourth indication including a second HITL request having the positive predicted subset for HITL review;

receiving, via the network interface circuitry, from the HITL reviewer network node device over the network, a fifth indication including a second HITL response having HITL verification responses indicating which samples of the positive predicted subset include the target event to obtain a true positive subset and which samples of the positive predicted subset do not include the target event to obtain a false positive subset; and updating the trainable parameters of the detection model based on the true positive subset and the false positive subset; and responsive to satisfaction of the stopping criterion, receiving, via the network interface circuitry, from the client network node device over the network, a subsequent indication including a subsequent set of unverified samples.

2. The method of claim 1, further comprising:

receiving, via the network interface circuitry, from the client network node device over the network, a sixth indication including a subsequent set of unverified samples;

applying the updated detection model to the subsequent set of unverified samples to obtain subsequent prediction results; and identifying, from the subsequent prediction results, a subsequent positive predicted subset predicted to include the target event.

3. The method of claim 1, wherein the informativeness criterion is based on a prediction confidence value generated by the detection model for each unverified sample, and wherein ordering the set of unverified samples comprises ordering the unverified samples based on uncertainty associated with the prediction confidence values.

4. The method of claim 1, wherein the adaptive query budget is determined based on at least one of a target event prevalence estimate associated with the set of unverified samples, a quantity of samples in the positive predicted subset, a confidence distribution of prediction results generated by the detection model, or whether a prior iteration identified at least one sample including the target event.

5. The method of claim 1, wherein updating the trainable parameters of the detection model based on the HITL verification responses for the query subset comprises adding the query subset and corresponding HITL verification responses to a labeled adaptation pool stored in the memory, and retraining or fine-tuning the detection model using the labeled adaptation pool.

6. The method of claim 5, wherein updating the trainable parameters of the detection model based on the true positive subset and the false positive subset comprises adding the true positive subset and the false positive subset to the labeled adaptation pool stored in the memory, and retraining or fine-tuning the detection model using the labeled adaptation pool.

7. The method of claim 1, wherein applying the updated detection model to the remaining unverified samples comprises generating, for each remaining unverified sample, a feature representation and a corresponding prediction score, and identifying the positive predicted subset comprises selecting samples having prediction scores that satisfy a target-event threshold.

8. The method of claim 1, wherein the stopping criterion is based on at least one of a predetermined number of iterations, an error metric associated with the detection model, a determination that no additional true positive samples were identified in a most recent iteration, or exhaustion of the adaptive query budget.

9. The method of claim 1, wherein the set of verified samples and the set of unverified samples comprise audio segments, and wherein the target event comprises a spoken-language event or a live-speech event represented within the audio segments.

10. The method of claim 1, wherein the network node device stores, in the memory, data identifying the query subset, the HITL verification responses for the query subset, the positive predicted subset, the true positive subset, and the false positive subset, and wherein the trainable parameters of the detection model are updated using the stored data from multiple iterations.

11. A network node device, comprising:

processing circuitry operatively coupled to a memory and network interface circuitry;

wherein the network node device is configured to communicate via the network interface circuitry over a network with a client network node device and at least one human-in-the-loop (HITL) reviewer network node device configured to perform an HITL review process; and wherein the memory stores instructions executable by the processing circuitry whereby the processing circuitry is configured to:

initialize trainable parameters of a detection model based on a set of verified samples that includes a representation of the target event;

receive, via the network interface circuitry, from the client network node device over the network, a first indication including a set of unverified samples; and iteratively perform, for each of a plurality of iterations for the set of unverified samples until a stopping criterion is satisfied:

order, based on an informativeness criterion associated with the target event, the set of unverified samples to obtain an ordered set of unverified samples;

select, based on an adaptive query budget and the ordered set of unverified samples, a query subset of unverified samples for HITL review;

send, via the network interface circuitry, to the HITL reviewer network node device over the network, a second indication including a first HITL request having the query subset for HITL review;

receive, via the network interface circuitry, from the HITL reviewer network node device over the network, a third indication including a first HITL response having HITL verification responses for the query subset;

update the trainable parameters of the detection model based on the HITL verification responses for the query subset;

apply the updated detection model to remaining unverified samples other than the query subset to obtain prediction results;

identify, from the prediction results, a positive predicted subset predicted to include the target event;

send, via the network interface circuitry, to the HITL reviewer network node device over the network, a fourth indication including a second HITL request having the positive predicted subset for HITL review;

receive, via the network interface circuitry, from the HITL reviewer network node device over the network, a fifth indication including a second HITL response having HITL verification responses indicating which samples of the positive predicted subset include the target event to obtain a true positive subset and which samples of the positive predicted subset do not include the target event to obtain a false positive subset; and update the trainable parameters of the detection model based on the true positive subset and the false positive subset; and receive, responsive to satisfaction of the stopping criterion, via the network interface circuitry, from the client network node device over the network, a subsequent indication including a subsequent set of unverified samples.

12. The network node device of claim 11, wherein the processing circuitry is further configured to:

receive, via the network interface circuitry, from the client network node device over the network, a sixth indication including a subsequent set of unverified samples;

apply the updated detection model to the subsequent set of unverified samples to obtain subsequent prediction results; and identify, from the subsequent prediction results, a subsequent positive predicted subset predicted to include the target event.

13. The network node device of claim 11, wherein the processing circuitry is further configured to order the set of unverified samples based on prediction confidence values generated by the detection model for respective unverified samples, and to order the set of unverified samples based on uncertainty associated with the prediction confidence values.

14. The network node device of claim 11, wherein the adaptive query budget is determined based on at least one of a target event prevalence estimate associated with the set of unverified samples, a quantity of samples in the positive predicted subset, a confidence distribution of the prediction results, or whether a prior iteration identified at least one sample including the target event.

15. The network node device of claim 11, wherein the processing circuitry is further configured to update the trainable parameters of the detection model based on the HITL verification responses for the query subset by adding the query subset and corresponding HITL verification responses to a labeled adaptation pool stored in the memory, and retraining or fine-tuning the detection model using the labeled adaptation pool.

16. The network node device of claim 15, wherein the processing circuitry is further configured to update the trainable parameters of the detection model based on the true positive subset and the false positive subset by adding the true positive subset and the false positive subset to the labeled adaptation pool stored in the memory, and retraining or fine-tuning the detection model using the labeled adaptation pool.

17. The network node device of claim 11, wherein the processing circuitry is further configured to apply the updated detection model to the remaining unverified samples by generating, for each remaining unverified sample, a feature representation and a corresponding prediction score, and to identify the positive predicted subset by selecting samples having prediction scores that satisfy a target-event threshold.

18. The network node device of claim 11, wherein the stopping criterion is based on at least one of a predetermined number of iterations, an error metric associated with the detection model, a determination that no additional true positive samples were identified in a most recent iteration, or exhaustion of the adaptive query budget.

19. The network node device of claim 11, wherein the set of verified samples and the set of unverified samples comprise audio segments, and wherein the target event comprises a spoken-language event or a live-speech event represented within the audio segments.

20. A system for training a detection model to detect a target event using human-in-the-loop (HITL) verification, the system comprising:

a client network node device;

at least one HITL reviewer network node device configured to perform an HITL review process;

a network node device comprising processing circuitry operatively coupled to memory and network interface circuitry, the network node device being configured to communicate via the network interface circuitry over a network with the client network node device and the at least one HITL reviewer network node device; and wherein the memory stores instructions executable by the processing circuitry to cause the processing circuitry to:

initialize trainable parameters of a detection model based on a set of verified samples that includes a representation of the target event;

receive, from the client network node device over the network, a first indication including a set of unverified samples; and iteratively, for each of a plurality of iterations for the set of unverified samples until a stopping criterion is satisfied:

order, based on an informativeness criterion associated with the target event, the set of unverified samples to obtain an ordered set of unverified samples;

select, based on an adaptive query budget and the ordered set of unverified samples, a query subset of unverified samples for HITL review;

send, to the at least one HITL reviewer network node device over the network, a second indication including a first HITL request having the query subset for HITL review;

receive, from the at least one HITL reviewer network node device over the network, a third indication including a first HITL response having HITL verification responses for the query subset;

update the trainable parameters of the detection model based on the HITL verification responses for the query subset;

apply the updated detection model to remaining unverified samples other than the query subset to obtain prediction results;

identify, from the prediction results, a positive predicted subset indicating a predicted presence of the target event;

send, to the at least one HITL reviewer network node device over the network, a fourth indication including a second HITL request having the positive predicted subset for HITL review;

receive, from the at least one HITL reviewer network node device over the network, a fifth indication including a second HITL response indicating which samples of the positive predicted subset include the target event to obtain a true positive subset and which samples of the positive predicted subset do not include the target event to obtain a false positive subset; and update the trainable parameters of the detection model based on the true positive subset and the false positive subset; and receive, from the client network node device over the network, responsive to satisfaction of the stopping criterion, a subsequent indication including a subsequent set of unverified samples.

* * * * *